(12) United States Patent
Iwasaki

(10) Patent No.: US 9,411,085 B2
(45) Date of Patent: Aug. 9, 2016

(54) LIGHT GUIDE PLATE

(71) Applicant: FUJIFILM Corporation, Tokyo (JP)

(72) Inventor: Osamu Iwasaki, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 114 days.

(21) Appl. No.: 14/546,396

(22) Filed: Nov. 18, 2014

(65) Prior Publication Data

US 2015/0070935 A1 Mar. 12, 2015

Related U.S. Application Data

(63) Continuation of application No. PCT/JP2013/060945, filed on Apr. 11, 2013.

(30) Foreign Application Priority Data

May 24, 2012 (JP) .................. 2012-118402

(51) Int. Cl.
*F21V 8/00* (2006.01)
*F21V 9/16* (2006.01)
*G02F 1/1335* (2006.01)

(52) U.S. Cl.
CPC ............ *G02B 6/0011* (2013.01); *F21V 9/16* (2013.01); *G02B 6/005* (2013.01); *G02B 6/0041* (2013.01); *G02B 6/0046* (2013.01);
(Continued)

(58) Field of Classification Search
CPC .. G02B 6/0041; G02B 6/0015; G02B 6/0016; G02B 6/0018; G02B 6/0046; G02B 6/0058; G02B 6/0061; F21V 9/16

USPC .............. 362/600–634, 97.1–97.4, 84
See application file for complete search history.

(56) References Cited

U.S. PATENT DOCUMENTS 5,899,552 A * 5/1999 Yokoyama ............ G02B 6/0038
349/62
6,206,535 B1 * 3/2001 Hattori ................ G02B 6/0041
362/23.16

(Continued)

FOREIGN PATENT DOCUMENTS

JP H11-153963 A 6/1999
WO 2007/058060 A1 5/2007

OTHER PUBLICATIONS

International Search Report; PCT/JP2013/060945; Jun. 25, 2013.
(Continued)

*Primary Examiner* — Evan Dzierzynski
*Assistant Examiner* — Zheng Song
(74) *Attorney, Agent, or Firm* — Studebaker & Brackett PC

(57) ABSTRACT

A large-sized thin light guide plate has a first layer on a light exit surface side and a second layer on a rear surface side containing scattering particles at a higher particle concentration than the first layer. Thicknesses of the layers in a direction substantially perpendicular to the light exit surface change to change a combined particle concentration. The scattering particles, obtained by mixing a particle group with an average particle size Ds of less than 7 μm having one or more local maximum values and a particle group with an average particle size Db of more than 7 μm having one or more local maximum values, satisfy 1 μm≤Ds<7 μm, 7 μm<Db≤12 μm and 0.3≤a≤0.5. High light use efficiency, reduction of luminance and color unevenness, a convex brightness distribution and easy manufacture can be achieved.

18 Claims, 54 Drawing Sheets

(52) U.S. Cl.
CPC ....... *G02B 6/0061* (2013.01); *G02F 1/133524* (2013.01); *G02B 6/0058* (2013.01); *G02B 6/0076* (2013.01)

(56) References Cited

U.S. PATENT DOCUMENTS

| | | | |
|---|---|---|---|
| 6,217,184 B1 | 4/2001 | Koike et al. | |
| 2003/0174396 A1* | 9/2003 | Murayama | G03B 21/625 359/453 |
| 2008/0044564 A1* | 2/2008 | Kanade | G02B 6/0041 427/203 |
| 2012/0019743 A1* | 1/2012 | Chen | G02B 6/0055 349/65 |

OTHER PUBLICATIONS

Notification of Transmittal of Translation of the International Preliminary Report on Patentability and Translation of Written Opinion of the International Searching Authority; PCT/JP2013/060945 issued on Dec. 4, 2014.

* cited by examiner

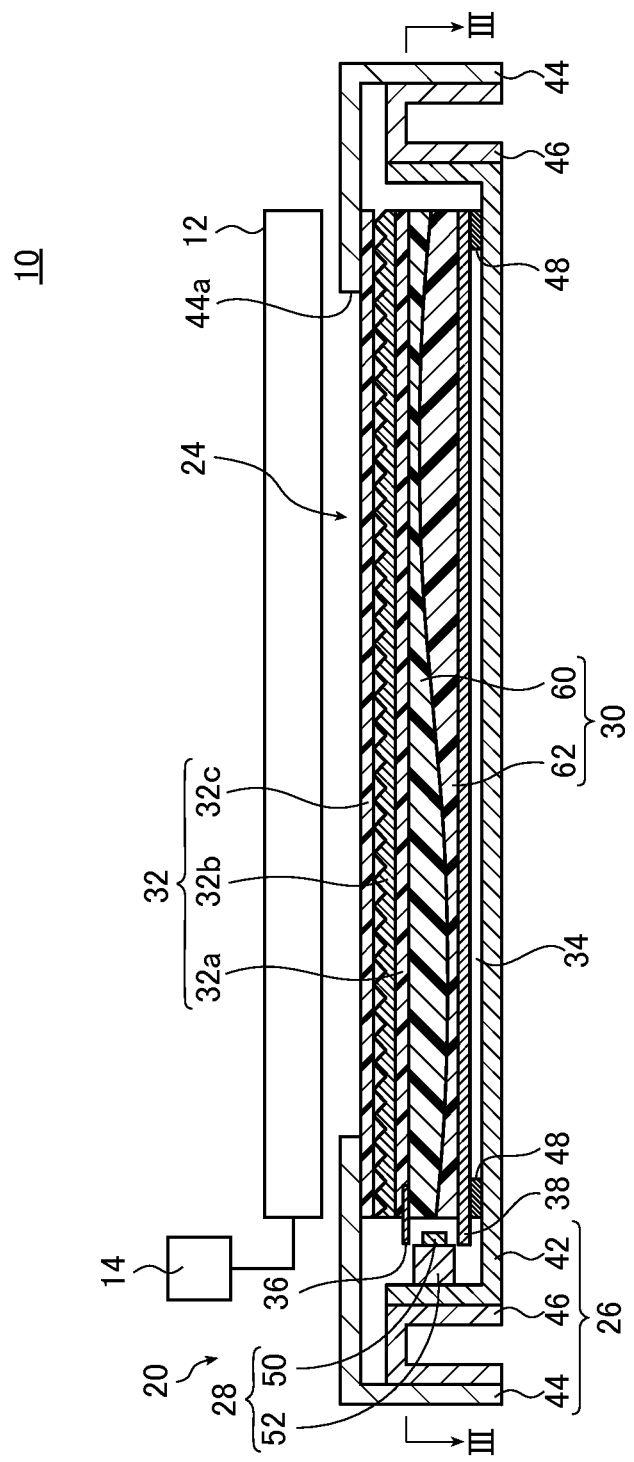

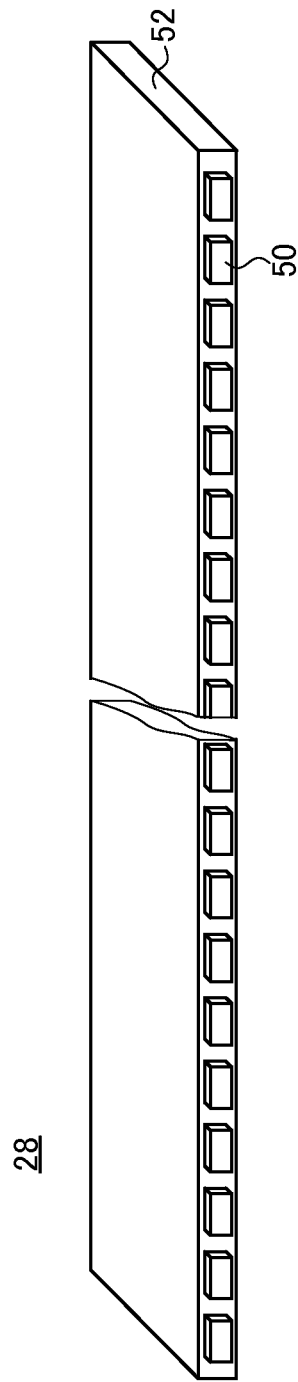
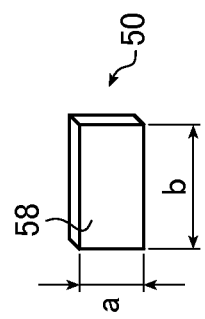

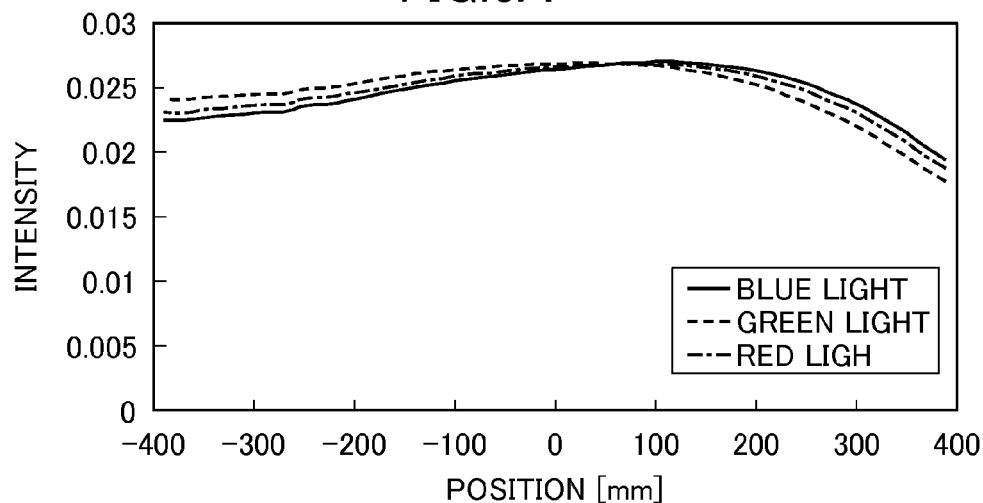
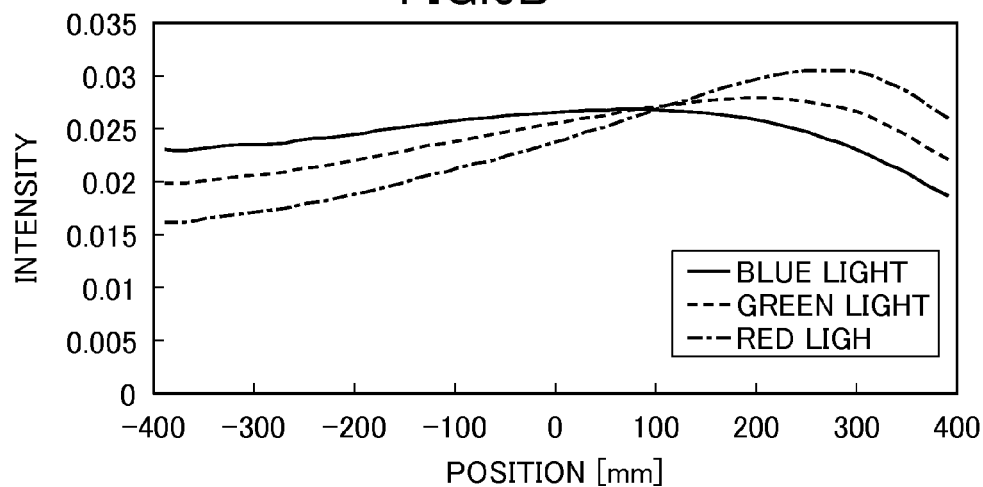
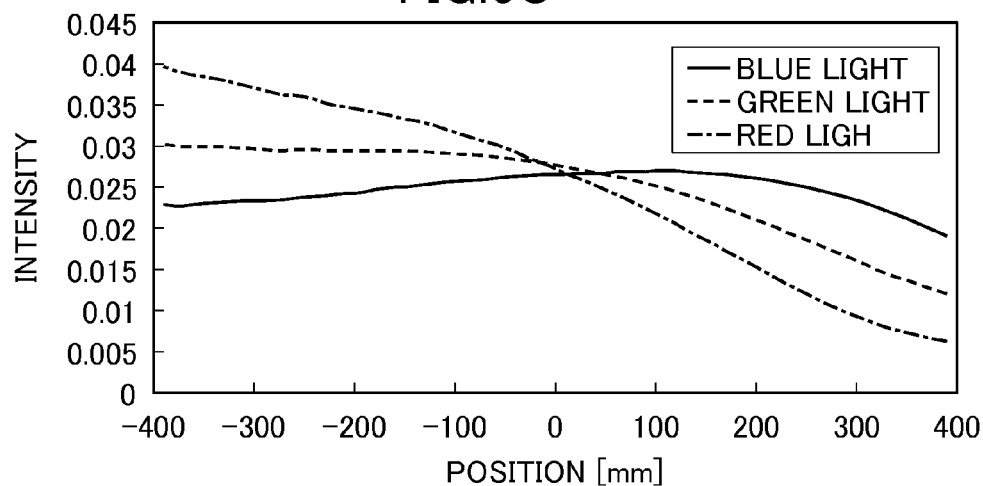

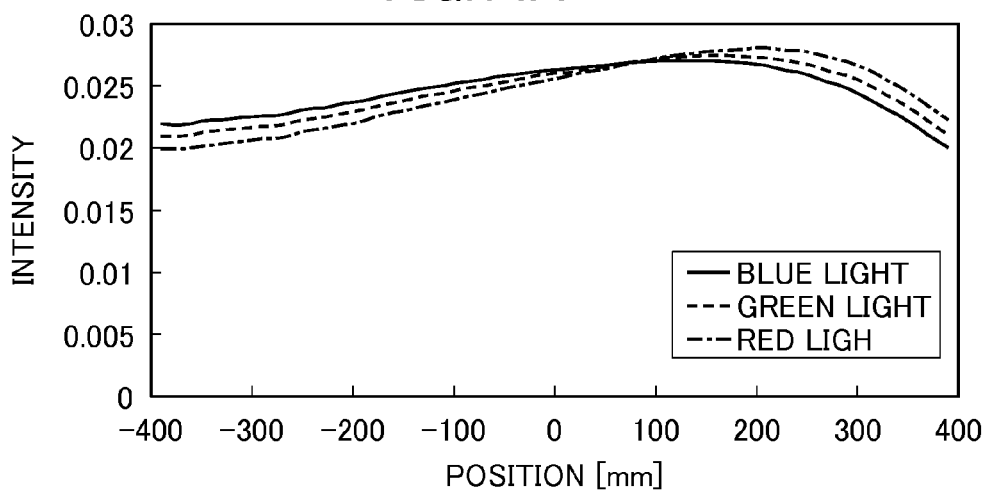
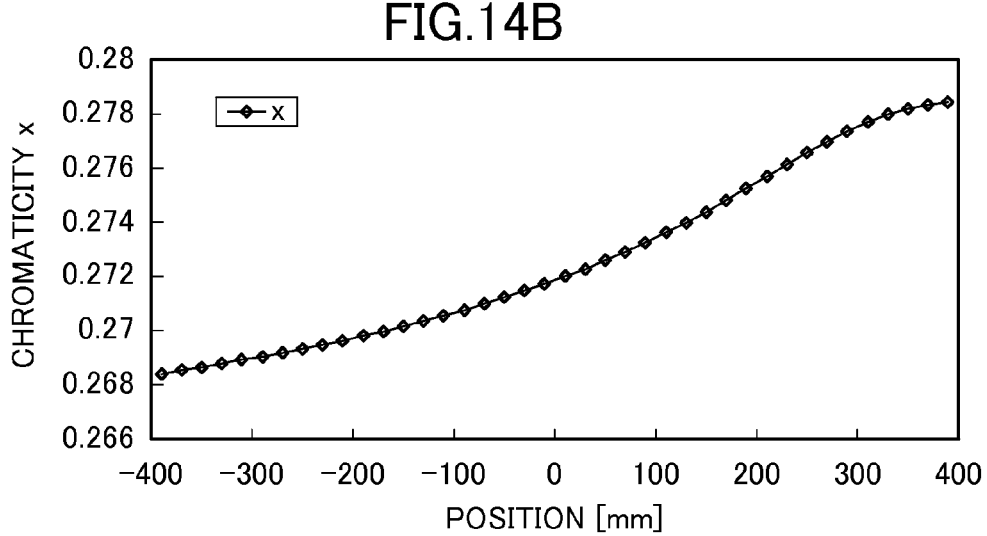
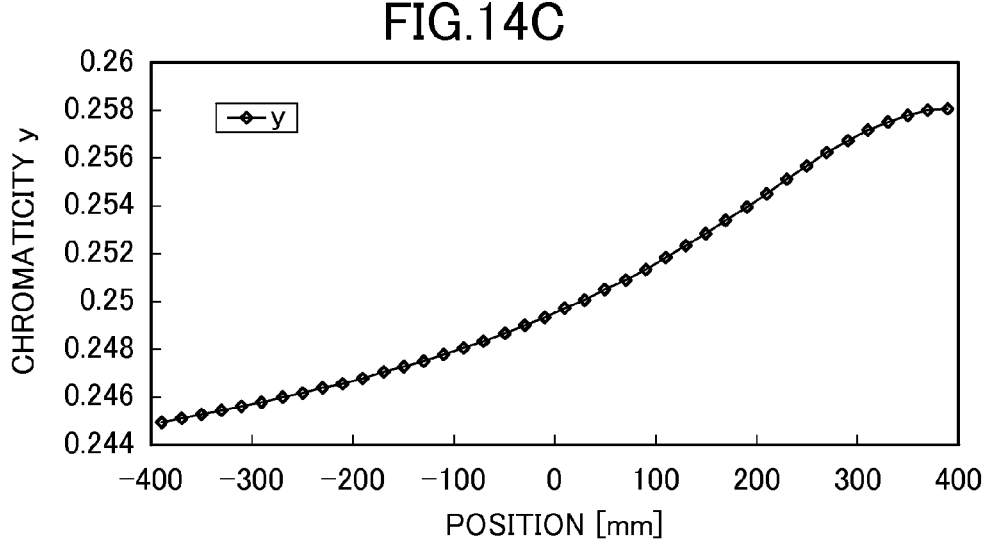

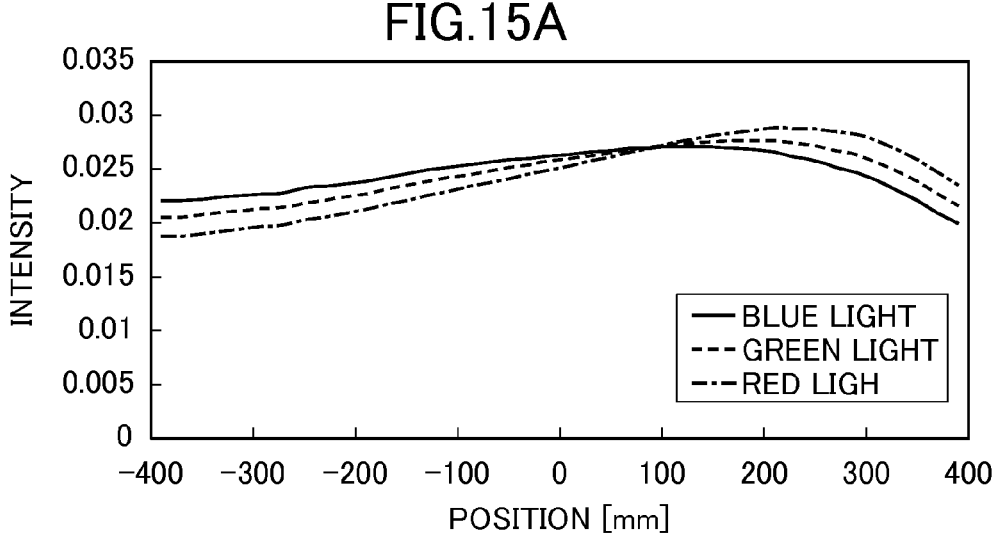
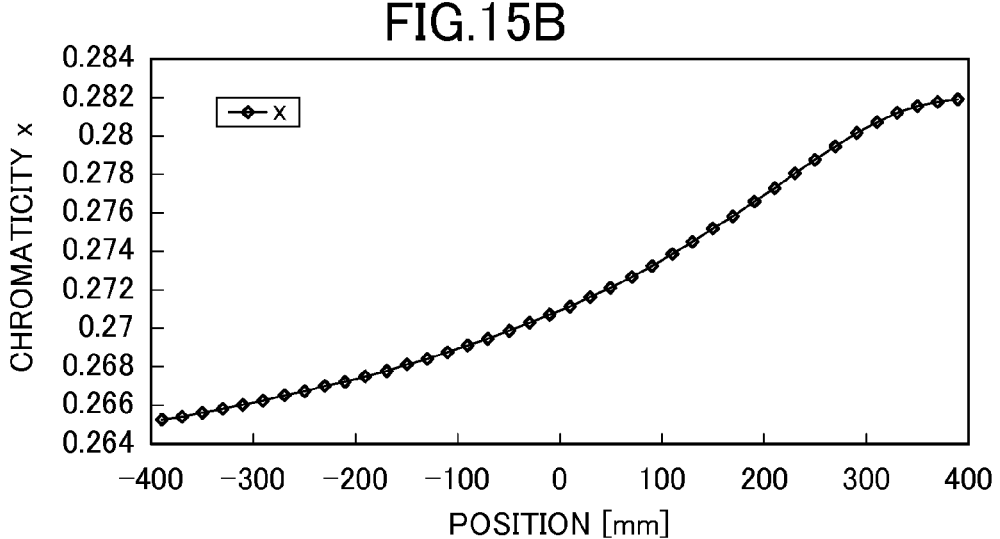
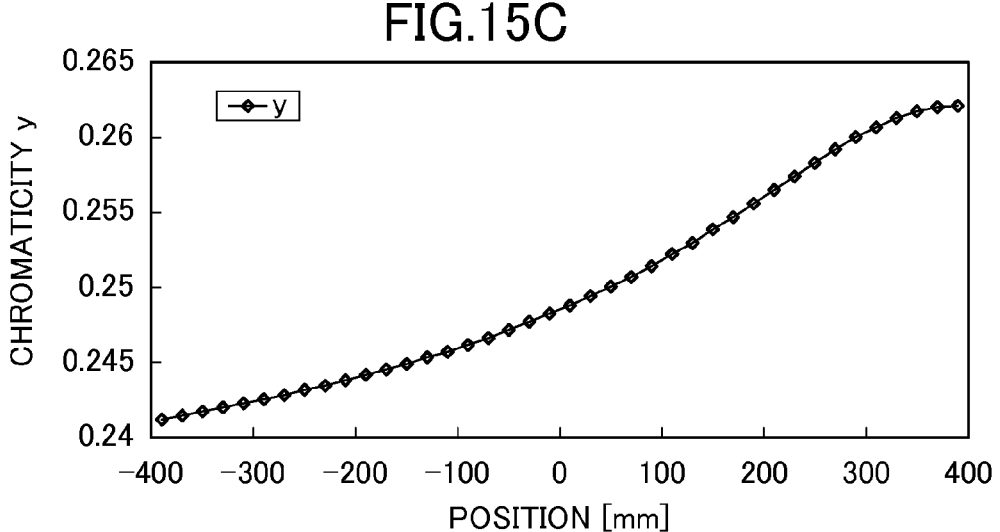

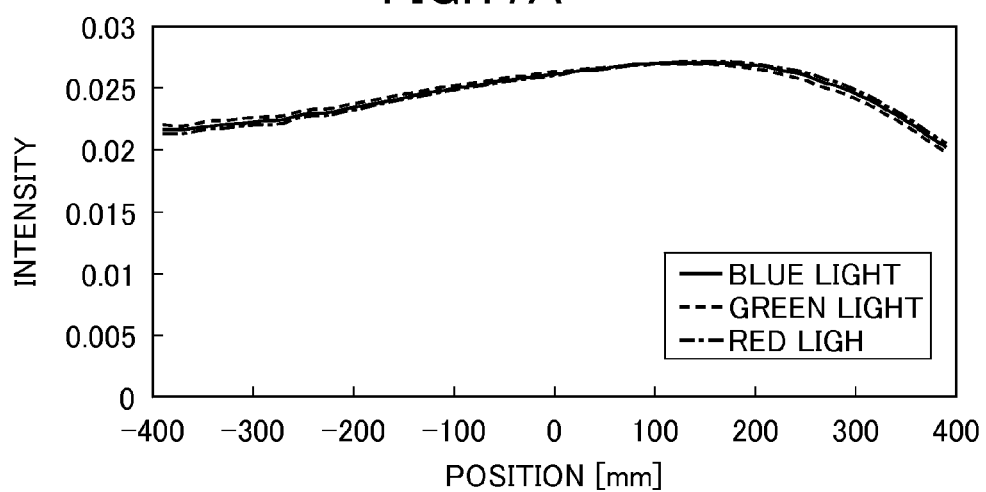
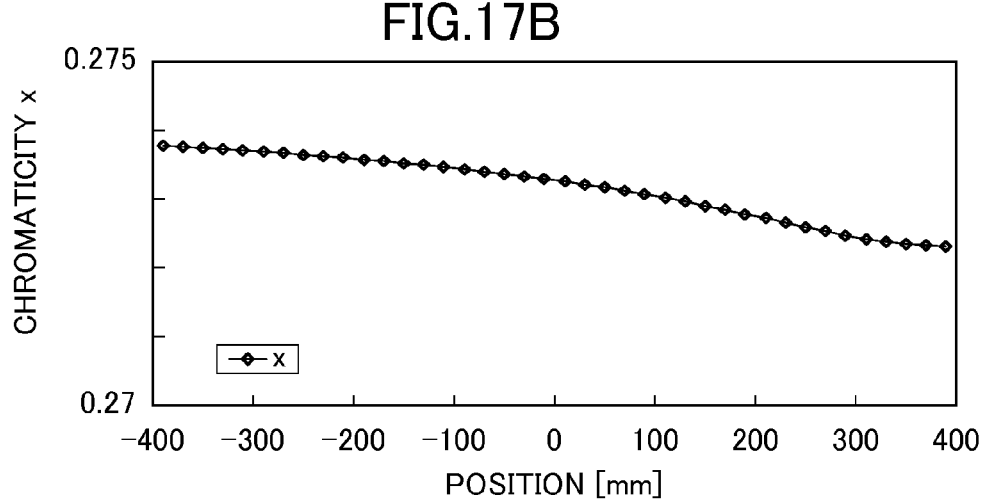
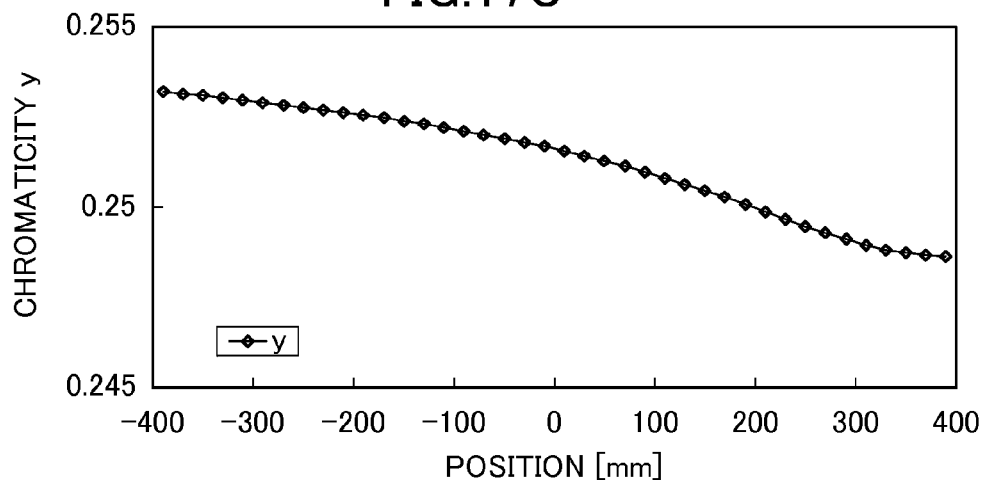

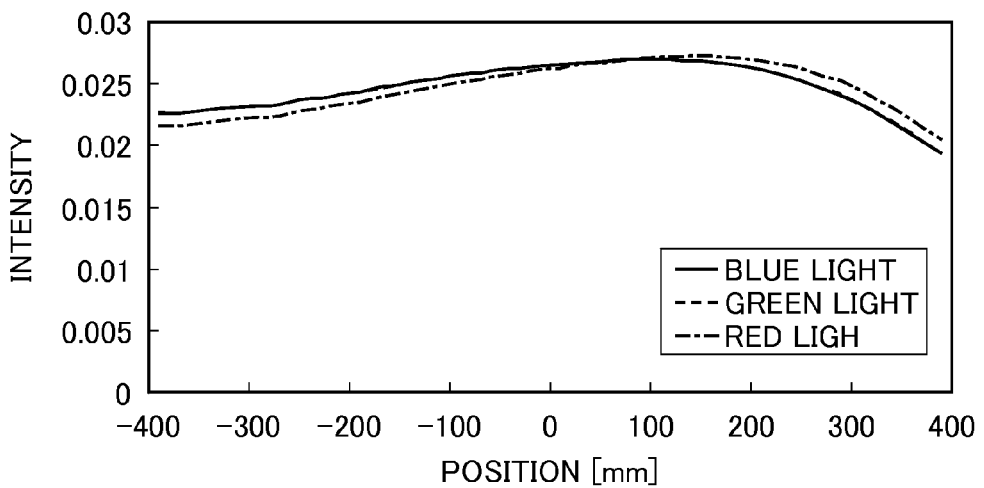
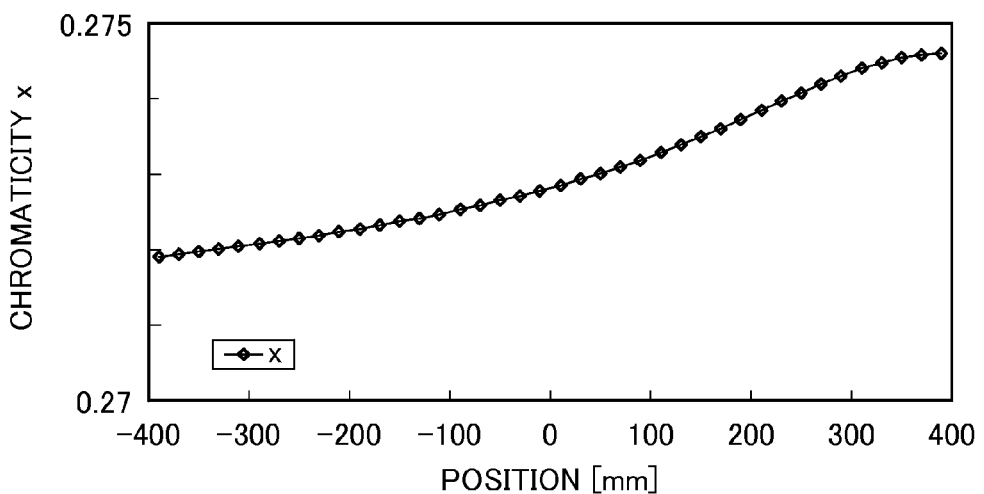
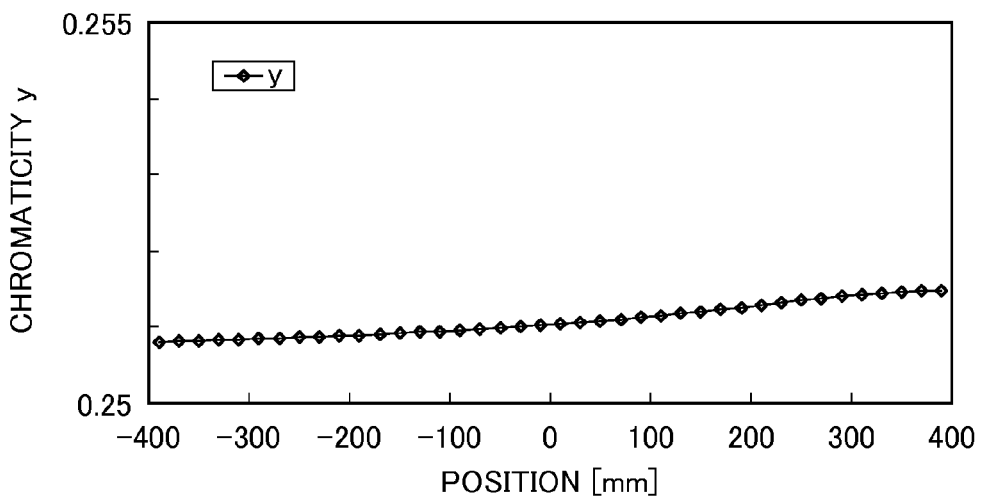

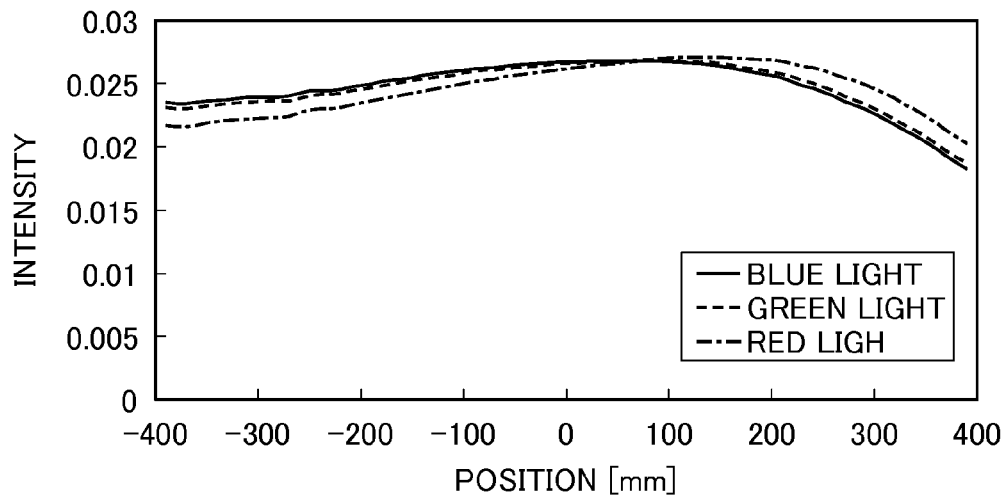
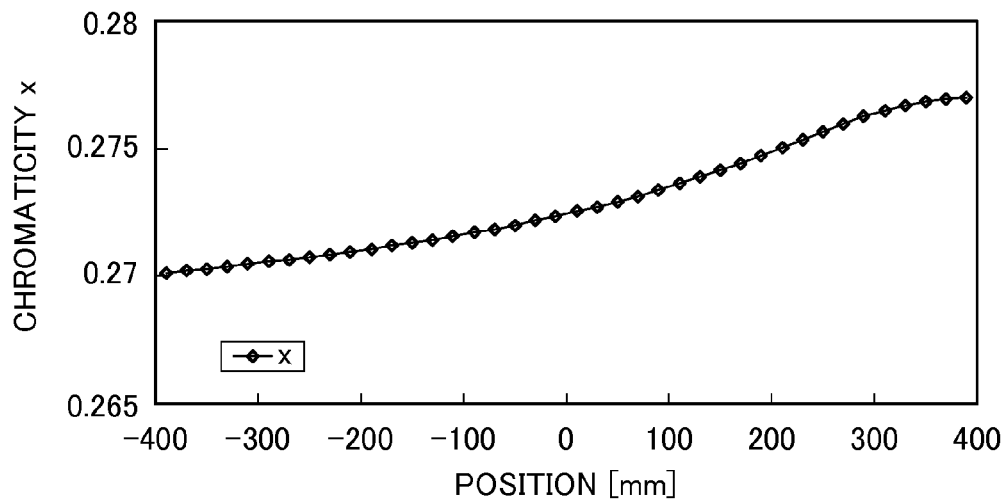
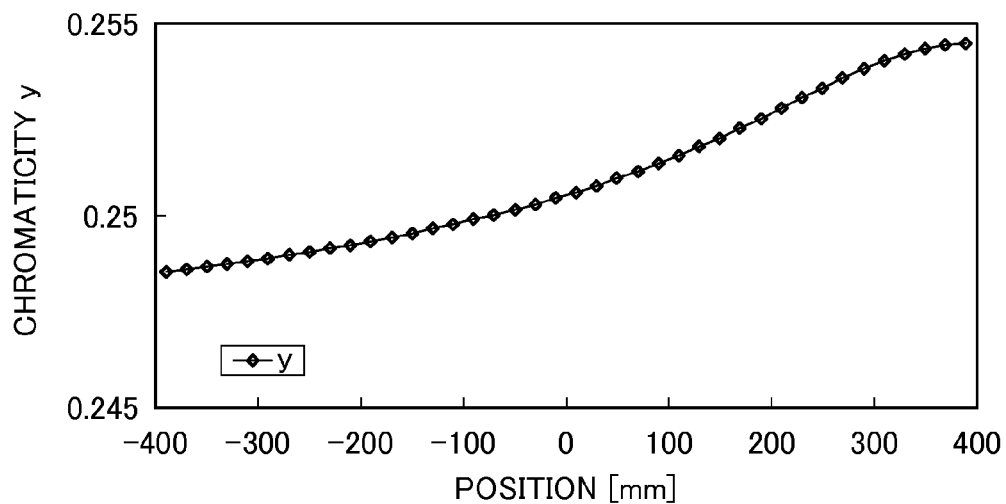

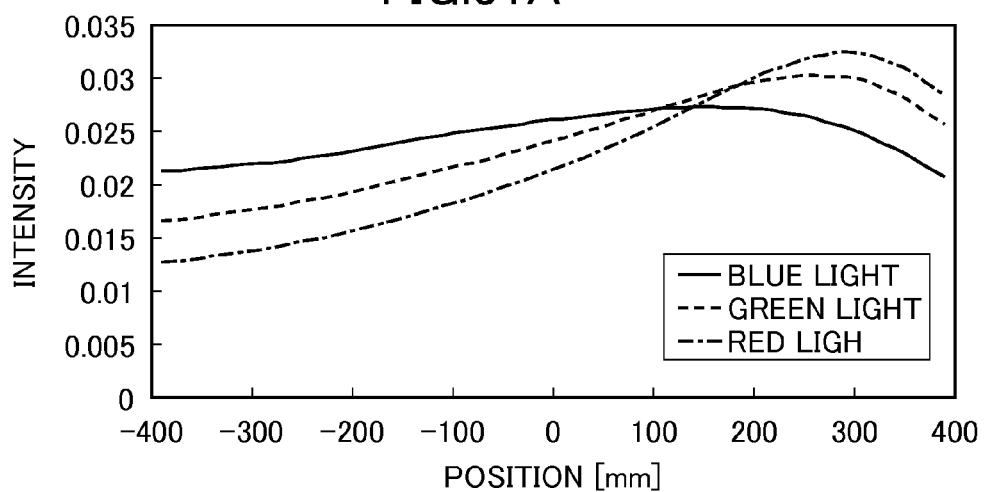
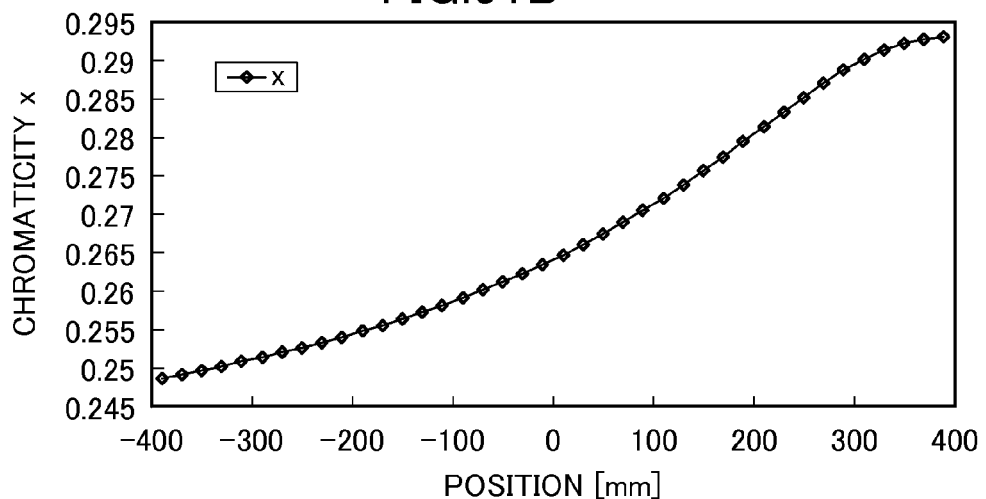
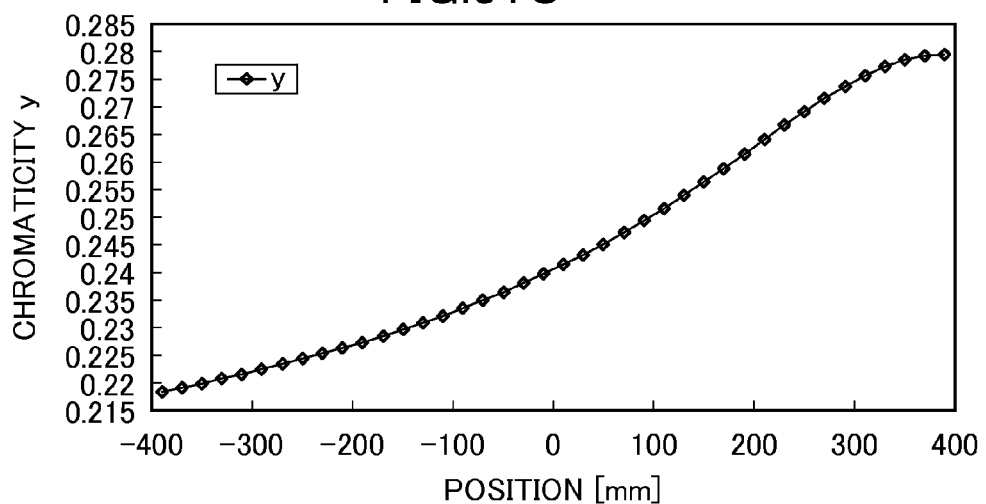

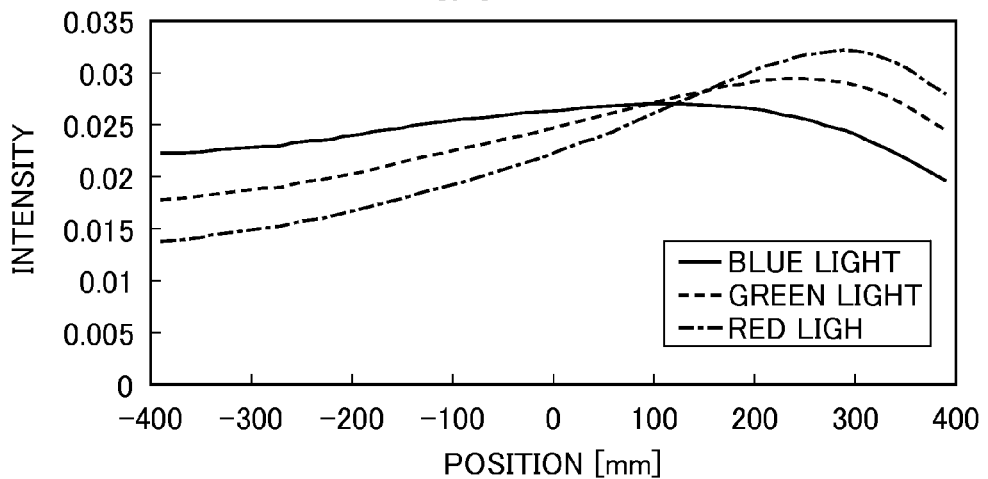
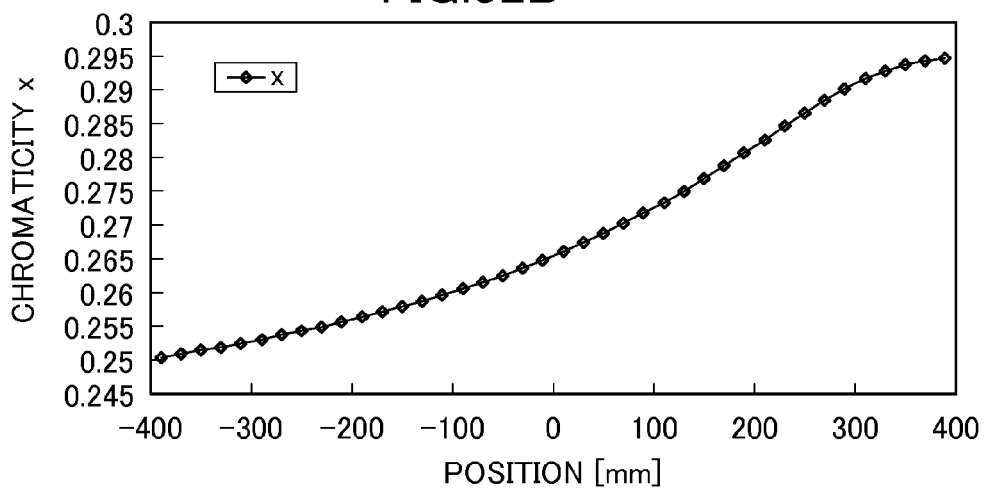
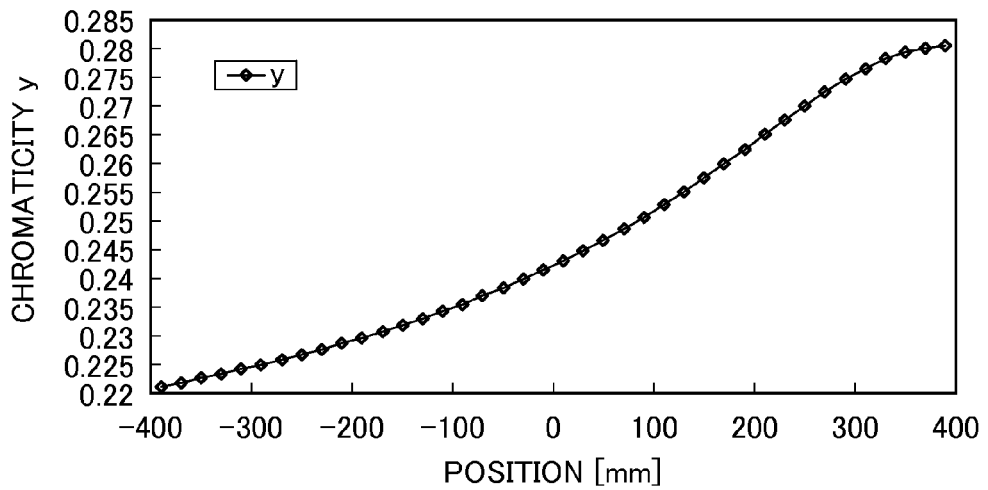

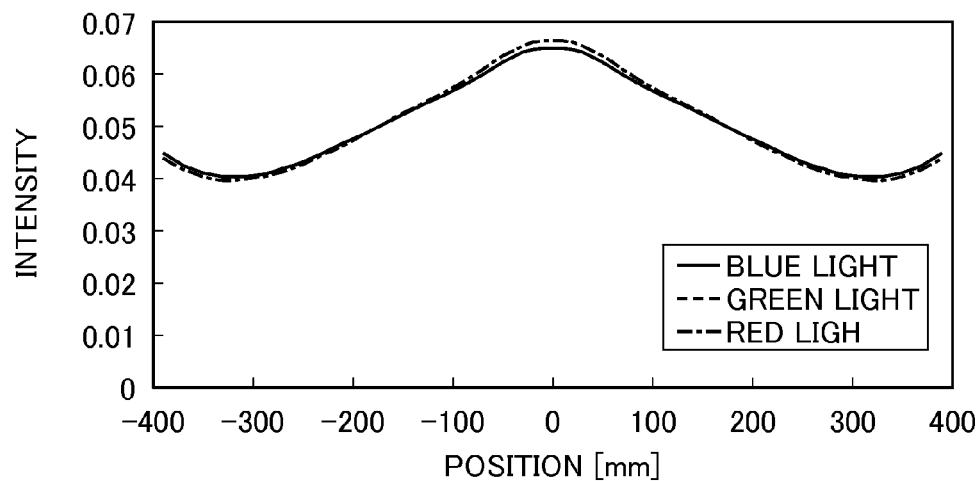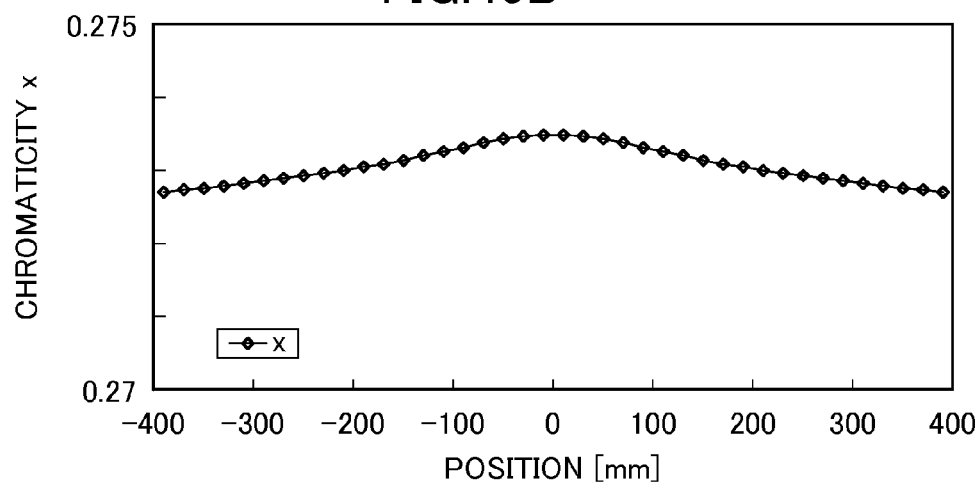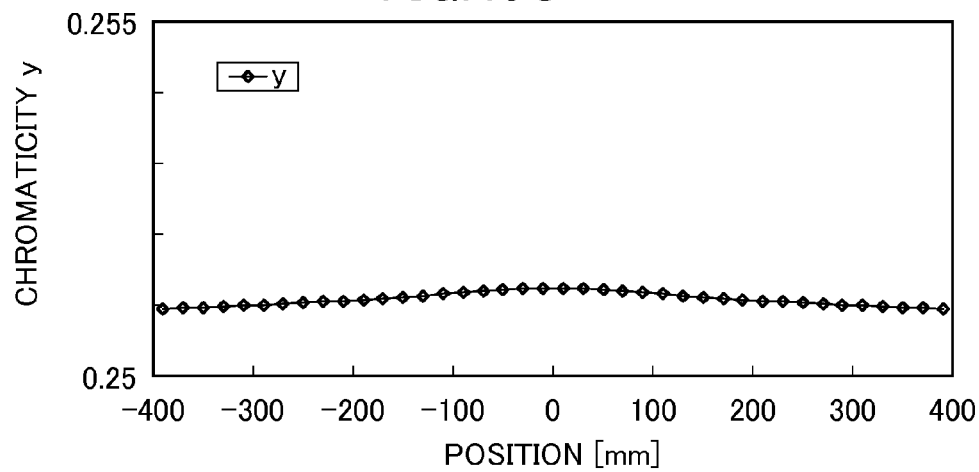

LIGHT GUIDE PLATE

CROSS-REFERENCE TO RELATED APPLICATIONS

This application is a Continuation of PCT International Application No. PCT/JP2013/060945 filed on Apr. 11, 2013 which claims priority under 35 U.S.C. §119(a) to Japanese Application No. 2012-118402 filed on May 24, 2012. Each of the above application(s) is hereby expressly incorporated by reference, in its entirety, into the present application.

BACKGROUND OF THE INVENTION

The present invention relates to a light guide plate for use in a planar lighting device that may be used for backlight of a liquid crystal display.

A liquid crystal display uses a planar lighting device (a backlight unit) which illuminates a liquid crystal display panel by irradiation of light from the back side of the liquid crystal display panel. The backlight unit is configured using a light guide plate for diffusing light emitted from an illumination light source to illuminate the liquid crystal display panel and parts such as a prism sheet and a diffusion sheet for making outgoing light from the light guide plate uniform.

As a backlight unit that allows the thickness reduction, use is made of an edge-lit backlight unit using a light guide plate in which a light source is disposed on a lateral surface of the light guide plate so that light incident from the lateral surface is guided in a predetermined direction different from the incident direction and is allowed to exit from a light exit surface which is a front surface.

It is proposed to use, as a light guide plate for use in such an edge-lit backlight unit, a light guide plate in plate form which is obtained by kneading and dispersing scattering particles for light scattering inside in order to guide the light incident from the lateral surface (light incidence surface) toward the front surface side (light exit surface).

The degree of light scattering caused by scattering particles in a case where the scattering particles are dispersed inside the light guide plate to scatter light varies depending on the light wavelength. Moreover, light at a wavelength at which scattering is more likely to occur exits after being scattered more at a region closer to the lateral surface through which the light entered, whereupon the quantity of light that may reach a region far from the light incidence surface is reduced to relatively decrease the quantity of outgoing light from the region far from the light incidence surface. On the other hand, light at a wavelength at which scattering is less likely to occur is not easily scattered, and hence the quantity of outgoing light from a region near the light incidence surface is reduced, whereas the quantity of light that may reach a region far from the light incidence surface is increased to relatively increase the quantity of outgoing light from the region far away from the light incidence surface. Accordingly, there was a problem that the ratio of quantities of light at respective wavelengths included in outgoing light through the light exit surface varies depending on the distance from the light incidence surface, thus causing color unevenness in the outgoing light.

Under the circumstances, various propositions have been made to reduce color unevenness of outgoing light in a light guide plate containing scattering particles dispersed therein.

For example, JP 11-153963 A describes that a light scattering guide is provided with scattering ability so that the ratio between the scattering efficiency in a long wavelength region and that in a short wavelength region is adjusted in a range of 0.75 to 1.25. More specifically, it is described to reduce color unevenness by adjusting the scattering efficiency ratio in a range of 0.75 to 1.25 through adjustment of the particle size of scattering particles to about 7 μm.

WO 2007/058060 describes that the rear surface is subjected to light diffusion treatment using, for example, a dot pattern having gradation from a lateral end surface having a light source disposed thereon toward a direction further away from the light source such that the tone unevenness which is a difference between a maximum value and a minimum value of the yellowness as obtained from tristimulus values at 25 luminance measurement points on the light exit surface is adjusted to 20 or less.

SUMMARY OF THE INVENTION

As liquid crystal displays increase in size, there are increasing demands for larger, thinner and lighter backlight units.

However, an increase in size of an edge-lit backlight unit causes a necessity to guide light having entered the light guide plate over longer distances and hence the ratio of the light quantities based on the wavelength varies significantly depending on the distance from the light incidence surface, thus leading to an increase in color unevenness of outgoing light.

It is necessary to perform classification with a very high degree of accuracy in order to adjust the particle size of scattering particles in a specific particle size range, which will lead to a significant cost increase.

In a case where a thin light guide plate is applied, a dot pattern provided on the rear surface may be seen in outgoing light, and there will arise a problem such as occurrence of luminance unevenness in the outgoing light.

An object of the present invention is to solve the problems associated with the foregoing prior art and to provide a large-sized thin light guide plate which is high in light use efficiency, which is capable of emitting light with reduced unevenness in luminance and color and obtaining a so-called convex brightness distribution, that is, such a distribution that an area around the center of the screen is brighter than the periphery as required of a large flat screen liquid crystal television, and which is easy to manufacture.

The present invention provides a light guide plate comprising: a rectangular light exit surface; one or more light incidence surfaces which are provided on one or more end sides of the light exit surface and through which light traveling in a direction substantially parallel to the light exit surface enters; a rear surface on an opposite side to the light exit surface; and scattering particles dispersed in the light guide plate, wherein the light guide plate includes two layers including a first layer disposed on a side closer to the light exit surface and a second layer that is disposed on a side closer to the rear surface and that contains the scattering particles at a higher particle concentration than the first layer, the first layer being superposed on the second layer in a direction perpendicular to the light exit surface, wherein thicknesses of the two layers in a direction substantially perpendicular to the light exit surface change in a direction perpendicular to each of the one or more light incidence surfaces to change a combined particle concentration, and wherein the scattering particles are obtained by mixing a particle group with an average particle size of less than 7 μm having one or more local maximum values in its particle size distribution and a particle group with an average particle size of more than 7 μm having one or more local maximum values in its particle size distribution, and satisfy following expressions: $1 \ \mu m \leq Ds < 7 \ \mu m$; $7 \ \mu m < Db \leq 12 \ \mu m$; and $0.3 \leq a \leq 0.5$ (where Ds represents an average particle size of the particle group with the average particle size of less than 7 µm, Db represents an average particle size of the particle group with the average particle size of more than 7 µm, and a represents a ratio of a volume of the particle group with the average particle size of less than 7 µm to a volume of all the scattering particles).

Preferably, the particle group with the average particle size of less than 7 µm is composed of particles with a single particle size, monodisperse particles, or polydisperse particles.

Preferably, the particle group with the average particle size of more than 7 µm is composed of particles with a single particle size, monodisperse particles, or polydisperse particles.

Preferably, a particle size distribution of the scattering particles has at least two local maximum values including a first local maximum value at a particle size of less than 7 µm and a second local maximum value at a particle size of more than 7 µm.

Preferably, scattering particles contained in the first layer and scattering particles contained in the second layer have different particle size distributions.

Preferably, the one or more light incidence surfaces comprise a light incidence surface provided on one end side of the light exit surface and the second layer smoothly changes so as to decrease in thickness with increasing distance from the light incidence surface in a direction perpendicular to the light incidence surface to reach a minimum thickness, then increase in thickness to reach a maximum thickness and subsequently decrease in thickness again.

Or, preferably, the one or more light incidence surfaces comprise a light incidence surface provided on one end side of the light exit surface and the second layer smoothly changes so as to decrease in thickness with increasing distance from the light incidence surface in a direction perpendicular to the light incidence surface to reach a minimum thickness, then increase in thickness to reach a maximum thickness and subsequently keep the thickness unchanged.

Or, preferably, the one or more light incidence surfaces comprise a light incidence surface provided on one end side of the light exit surface and the second layer continuously changes so as to once increase in thickness with increasing distance from the light incidence surface in a direction perpendicular to the light incidence surface, then decrease in thickness to reach a minimum thickness, then increase in thickness again to reach a maximum thickness and subsequently decrease in thickness.

Or, preferably, the one or more light incidence surfaces comprise a light incidence surface provided on one end side of the light exit surface and the second layer continuously changes so as to once increase in thickness with increasing distance from the light incidence surface in a direction perpendicular to the light incidence surface, then decrease in thickness to reach a minimum thickness, then increase in thickness again to reach a maximum thickness and subsequently keep the thickness unchanged.

Preferably, an interface between the first layer and the second layer in a region of the second layer between a position of the minimum thickness and a position of the maximum thickness in the direction perpendicular to the light incidence surface has a curved surface concave toward the light exit surface and a curved surface smoothly connected to the concave curved surface and convex toward the light exit surface.

Preferably, the one or more light incidence surfaces comprise two light incidence surfaces provided on two opposite end sides of the light exit surface and the second layer has a maximum thickness at a central portion in a direction perpendicular to the light incidence surfaces, then smoothly changes so as to decrease in thickness from the central portion toward each of the two light incidence surfaces to reach a minimum thickness, and subsequently increase in thickness.

Or, preferably, the one or more light incidence surfaces comprise two light incidence surfaces provided on two opposite end sides of the light exit surface and the second layer has a maximum thickness at a central portion in a direction perpendicular to the light incidence surfaces, then smoothly changes so as to decrease in thickness from the central portion toward each of the two light incidence surfaces to reach a minimum thickness, then increase in thickness and subsequently decreases in thickness.

Further, preferably, an interface between the first layer and the second layer has a region including concave curved surfaces toward the light exit surface on sides closer to the two light incidence surfaces and a curved surface convex toward the light exit surface which is located between the two concave curved surfaces and is smoothly connected to the two curved surfaces.

Preferably, Npo and Npr fall within ranges satisfying $0 \text{ wt\%} < \text{Npo} < 0.15 \text{ wt\%}$ and $\text{Npo} < \text{Npr} \leq 0.8 \text{ wt\%}$ where Npo represents a particle concentration of the first layer and Npr represents a particle concentration of the second layer.

The present invention can provide a large-sized thin light guide plate which is high in light use efficiency, which is capable of emitting light with reduced unevenness in luminance and color and obtaining a so-called convex distribution, that is, such a distribution that an area around the center of the screen is brighter than the periphery as required of a large flat screen liquid crystal television, which is easy to manufacture and which can prevent a cost increase.

BRIEF DESCRIPTION OF THE DRAWINGS

FIG. 2 is a cross-sectional view of the liquid crystal display shown in FIG. 1 taken along line II-II.

FIG. 4A is a perspective view showing the schematic configuration of a light source unit of the planar lighting device shown in FIGS. 1 and 2; and FIG. 4B is an enlarged schematic perspective view showing one of LEDs forming the light source unit shown in FIG. 4A.

FIGS. 6A to 6C are graphs each showing calculation results of the intensity distribution of outgoing light through the light exit surface of a light guide plate.

FIG. 14A is a graph showing measurement results of the intensity distributions of outgoing light; and FIGS. 14B and 14C are graphs each showing measurement results of the chromaticity distribution of outgoing light.

FIG. 15A is a graph showing measurement results of the intensity distributions of outgoing light; and FIGS. 15B and 15C are graphs each showing measurement results of the chromaticity distribution of outgoing light.

FIG. 17A is a graph showing measurement results of the intensity distributions of outgoing light; and FIGS. 17B and 17C are graphs each showing measurement results of the chromaticity distribution of outgoing light.

FIG. 19A is a graph showing measurement results of the intensity distributions of outgoing light; and FIGS. 19B and 19C are graphs each showing measurement results of the chromaticity distribution of outgoing light.

FIG. 20A is a graph showing measurement results of the intensity distributions of outgoing light; and FIGS. 20B and 20C are graphs each showing measurement results of the chromaticity distribution of outgoing light.

FIG. 31A is a graph showing measurement results of the intensity distributions of outgoing light; and FIGS. 31B and 31C are graphs each showing measurement results of the chromaticity distribution of outgoing light.

FIG. 32A is a graph showing measurement results of the intensity distributions of outgoing light; and FIGS. 32B and 32C are graphs each showing measurement results of the chromaticity distribution of outgoing light.

FIG. 45A is a graph showing measurement results of the intensity distributions of outgoing light; and FIGS. 45B and 45C are graphs each showing measurement results of the chromaticity distribution of outgoing light.

DETAILED DESCRIPTION OF THE INVENTION

A planar lighting device using a light guide plate according to the invention will be described below in detail with reference to preferred embodiments shown in the accompanying drawings.

Figure 1:
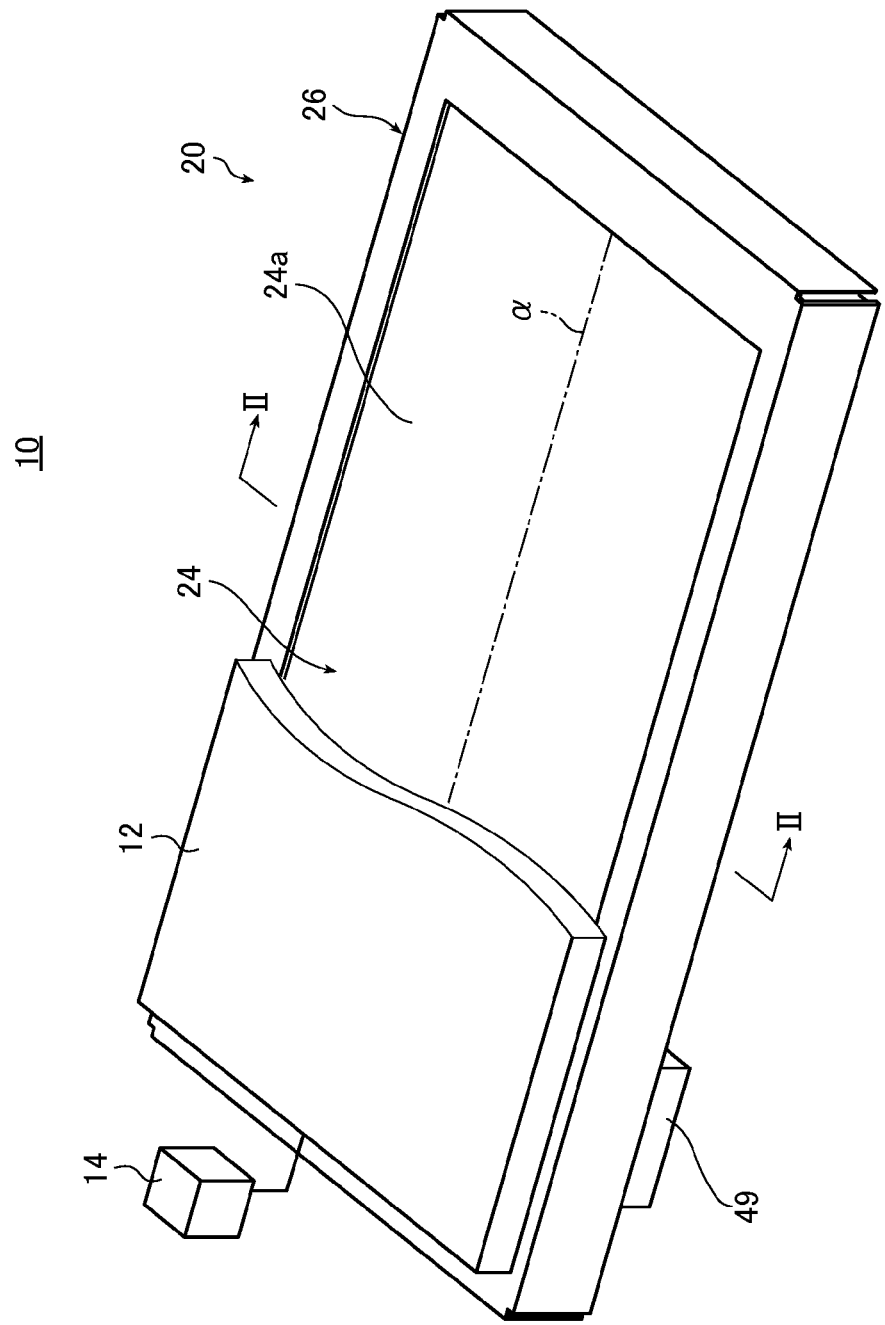
FIG. 1 is a schematic perspective view showing an embodiment of a liquid crystal display provided with a planar lighting device using a light guide plate according to the invention.

FIG. 1 is a perspective view schematically showing a liquid crystal display provided with a planar lighting device using a light guide plate according to the invention and FIG. 2 is a cross-sectional view of the liquid crystal display shown in FIG. 1 taken along line II-II.

Figure 3A:
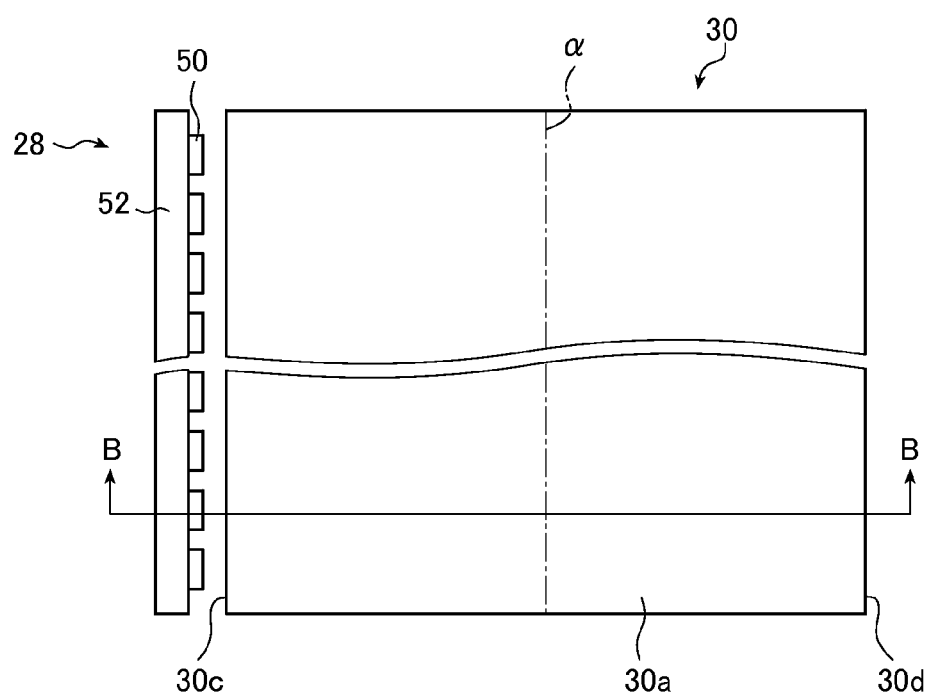
FIG. 3A is a view of the planar lighting device shown in FIG. 2 taken along line III-III.
Figure 3B:
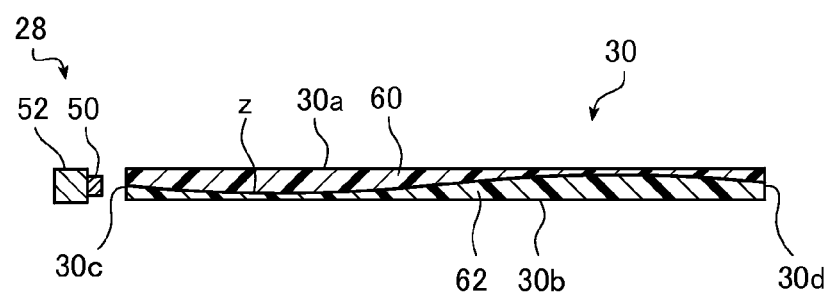
FIG. 3B is a cross-sectional view of FIG. 3A taken along line B-B.

FIG. 3A is a view of the planar lighting device (also referred to below as "backlight unit") shown in FIG. 2 taken along line III-III; and FIG. 3B is a cross-sectional view of FIG. 3A taken along line B-B.

A liquid crystal display 10 includes a backlight unit 20, a liquid crystal display panel 12 disposed on the side closer to a light exit surface 24a of the backlight unit 20, and a drive unit 14 for driving the liquid crystal display panel 12. In FIG. 1, part of the liquid crystal display panel 12 is not shown to illustrate the configuration of the backlight unit.

In the liquid crystal display panel 12, an electric field is partially applied to liquid crystal molecules previously arranged in a specified direction to thereby change the orientation of the molecules. The resultant changes in refractive index having occurred in the liquid crystal cells are used to display characters, figures, images and the like on a surface of the liquid crystal display panel 12.

The drive unit 14 applies a voltage to transparent electrodes in the liquid crystal display panel 12 to change the orientation of the liquid crystal molecules, thereby controlling the transmittance of light passing through the liquid crystal display panel 12.

The backlight unit 20 is a lighting device for illuminating the whole surface of the liquid crystal display panel 12 from behind the liquid crystal display panel 12 and includes the light exit surface 24a of which the shape is substantially the same as that of an image display surface of the liquid crystal display panel 12.

As shown in FIGS. 1, 2, 3A and 3B, the backlight unit 20 according to this embodiment includes: a lighting device main body 24 having a light source unit 28, a light guide plate 30 and an optical member unit 32; and a housing 26 having a lower housing 42, an upper housing 44, folded members 46 and support members 48. As shown in FIG. 1, a power unit casing 49 containing a plurality of power supplies for supplying the light source unit 28 with electric power is provided on the back side of the lower housing 42 of the housing 26.

The components constituting the backlight unit 20 will be described below.

The lighting device main body 24 includes the light source unit 28 for emitting light, the light guide plate 30 for emitting the light from the light source unit 28 as planar light, and the optical member unit 32 for scattering and diffusing the light emitted from the light guide plate 30 to further reduce the unevenness of the light.

First, the light source unit 28 will be described.

FIG. 4A is a schematic perspective view schematically showing the configuration of the light source unit 28 of the backlight unit 20 shown in FIGS. 1 and 2; and FIG. 4B is an enlarged schematic perspective view showing only one LED chip of the light source unit 28 shown in FIG. 4A.

As shown in FIG. 4A, the light source unit 28 includes a plurality of light-emitting diode chips (referred to below as "LED chips") 50 and a light source support 52.

The LED chip 50 is a chip of a light-emitting diode emitting blue light, which has a phosphor applied on the surface thereof. It has a light-emitting face 58 with a predetermined area through which white light is emitted.

Specifically, when blue light emitted through the surface of the light-emitting diode of the LED chip 50 passes through the phosphor, the phosphor emits fluorescence. Thus, the blue light emitted from the light-emitting diode is combined with light emitted as a result of the fluorescence of the phosphor to produce white light, which is emitted from the LED chip 50.

An example of the LED chip 50 includes a chip obtained by applying a YAG (yttrium aluminum garnet) phosphor to the surface of a GaN light-emitting diode, an InGaN light-emitting diode, or the like.

The light source support 52 is a plate member disposed such that one surface thereof faces a first light incidence surface 30c of the light guide plate 30.

The light source support 52 carries the LED chips 50 on its lateral surface facing the first light incidence surface 30c of the light guide plate 30 such that the LED chips 50 are spaced apart from each other at predetermined intervals. More specifically, the LED chips 50 constituting the light source unit 28 are arrayed along the longitudinal direction of the first light incidence surface 30c of the light guide plate 30 to be described later and are secured onto the light source support 52.

The light source support 52 is formed of a metal having high heat conductivity such as copper or aluminum and also serves as a heat sink which absorbs heat generated from the LED chips 50 and releases the absorbed heat to the outside.

As shown in FIG. 4B, the LED chips 50 according to this embodiment each have such a rectangular prism shape that the sides in a direction orthogonal to the direction in which the LED chips 50 are arrayed are shorter than the sides lying in the direction in which the LED chips 50 are arrayed, that is, the sides lying in the direction of thickness of the light guide plate 30 to be described later (the direction perpendicular to a light exit surface 30a) are shorter sides. The LED chips 50 each having a rectangular prism shape allow a thinner design of the light source unit to be achieved while keeping the output of a large amount of light. A thinner light source unit 28, in turn, permits the reduction of the thickness of the backlight unit. Further, the number of LED chips that need to be arranged can be reduced.

While the LED chips 50 each preferably have a rectangular prism shape with the shorter sides lying in the direction of the thickness of the light guide plate 30 for a thinner design of the light source unit 28, the invention is not limited thereto and LED chips having various shapes including a square shape, a circular shape, a polygonal shape and an elliptical shape may be used.

Next, the light guide plate 30 will be described.

Figure 5:
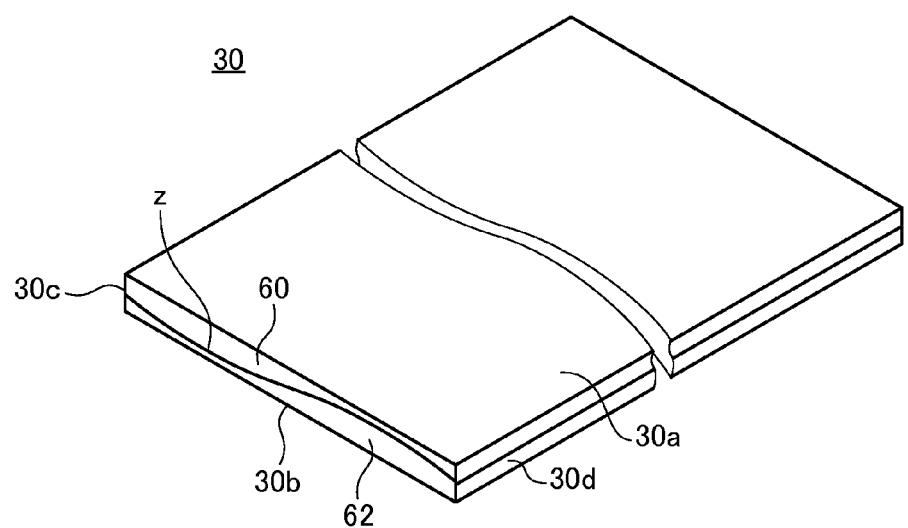
FIG. 5 is a schematic perspective view showing the shape of the light guide plate shown in FIG. 3A.

FIG. 5 is a schematic perspective view showing the shape of the light guide plate.

As shown in FIGS. 2, 3A and 5, the light guide plate 30 includes the rectangular light exit surface 30a; the first light incidence surface 30c formed at one longer side end of the light exit surface 30a substantially perpendicularly to the light exit surface 30a; an opposite lateral surface 30d as a lateral surface opposite to the first light incidence surface 30c; and a flat rear surface 30b located on the opposite side to the light exit surface 30a, that is, on the back side of the light guide plate 30.

The light source unit 28 mentioned above is disposed so as to face the first light incidence surface 30c of the light guide plate 30. Thus, the backlight unit 20 has the light source unit 28 disposed so as to face one lateral surface of the light guide plate 30.

The light guide plate 30 is formed by kneading and dispersing scattering particles for light scattering in a transparent resin. Exemplary materials of the transparent resin that may be used for the light guide plate 30 include optically transparent resins such as PET (polyethylene terephthalate), PP (polypropylene), PC (polycarbonate), PMMA (polymethyl methacrylate), benzyl methacrylate, MS resin, and COP (cycloolefin polymer). Silicone particles (e.g., TOSPEARL (registered trademark)) and other particles made of, for example, silica, zirconia and a dielectric polymer may be used for the scattering particles to be kneaded and dispersed in the light guide plate 30.

The light guide plate 30 is of a two-layer structure including a first layer 60 on the side closer to the light exit surface 30a and a second layer 62 on the side closer to the rear surface 30b. When the boundary between the first layer 60 and the second layer 62 is referred to as "interface z," the first layer 60 has a sectional region surrounded by the light exit surface 30a, the first light incidence surface 30c, the opposite lateral surface 30d and the interface z. On the other hand, the second layer 62 is a layer adjacent to the first layer on the side closer to the rear surface 30b and has a sectional region surrounded by the interface z, the first light incidence surface 30c, the opposite lateral surface 30d and the rear surface 30b.

Now, the particle concentration of scattering particles in the first layer 60 and that of scattering particles in the second layer 62 are denoted by Npo and Npr, respectively. Then, Npo and Npr have a relationship expressed by Npo<Npr. Thus, in the light guide plate 30, the second layer 62 on the side closer to the rear surface 30b contains the scattering particles at a higher particle concentration than that in the first layer 60 on the side closer to the light exit surface 30a.

The particle concentration Npo of the scattering particles in the first layer 60 and the particle concentration Npr of the scattering particles in the second layer 62 preferably satisfy the relationships of 0 wt %≤Npo<0.15 wt % and Npo<Npr<0.8 wt %.

If the first layer 60 and the second layer 62 of the light guide plate 30 satisfy the above relationships, the light guide plate 30 can guide incident light to the inside (center) of the light guide plate 30 without scattering it so much in the first layer 60 having a lower particle concentration and the light is scattered by the second layer 62 of the light guide plate 30 having a higher particle concentration as it approaches the center of the light guide plate, thus enabling the quantity of outgoing light through the light exit surface 30a to be increased. In brief, the illuminance distribution which is high in the middle at a preferable ratio can be obtained while further enhancing the light use efficiency.

The particle concentration [wt %] as used herein denotes a weight percentage of scattering particles with respect to the weight of a base material.

Since the first layer 60 and the second layer 62 of the light guide plate 30 satisfy the above relationships, the illuminance distribution which is high in the middle at a preferable ratio can be obtained while further enhancing the light use efficiency.

In addition, when seen in a cross section perpendicular to the longitudinal direction of the first light incidence surface 30c, the interface z between the first layer 60 and the second layer 62 changes so that the second layer 62 once decreases in thickness from the first light incidence surface 30c toward the opposite lateral surface 30d to reach a minimum thickness, subsequently changes so that the second layer 62 increases in thickness to reach a maximum thickness, and smoothly changes so that the second layer 62 decreases in thickness again on the side closer to the opposite lateral surface 30d.

More specifically, the interface z includes a curved surface concave toward the light exit surface 30a on the side closer to the light incidence surface 30c of the light guide plate 30 and a convex curved surface smoothly connected to the concave curved surface and positioned on the side closer to the opposite lateral surface 30d.

As described above, the second layer 62 containing the scattering particles at a higher particle concentration than that in the first layer 60 has such a thickness as to have a local minimum value at a position closer to the first light incidence surface 30c and to have a local maximum value on the side closer to the opposite lateral surface 30d beyond the central portion. The combined particle concentration of the scattering particles is thus changed so as to have the local minimum value in the vicinity of the first light incidence surface 30c and the local maximum value in the vicinity of the opposite lateral surface 30d.

In short, the profile of the combined particle concentration has a curve which changes so as to have the local minimum value on the side closer to the first light incidence surface 30c and the local maximum value on the side closer to the opposite lateral surface 30d.

The combined particle concentration as used in the invention means a concentration of scattering particles expressed using the amount of scattering particles added or combined in a direction substantially perpendicular to the light exit surface at a position spaced apart from the light incidence surface toward the opposite surface on the assumption that the light guide plate is a flat plate having the thickness at the light incidence surface throughout the light guide plate. In other words, the combined particle concentration means a quantity per unit volume of scattering particles or a weight percentage with respect to a base material of scattering particles added in a direction substantially perpendicular to the light exit surface at a position spaced apart from the light incidence surface on the assumption that the light guide plate is a flat light guide plate which has the thickness at the light incidence surface throughout the light guide plate and in which the concentration is the same.

As described above, the second layer 62 having a higher particle concentration has such a configuration as to change so that the second layer 62 once decreases in thickness from the first light incidence surface 30c toward the opposite lateral surface 30d to reach a minimum thickness, subsequently change so that the second layer 62 increases in thickness to reach a maximum thickness, and smoothly change so that the second layer 62 decreases in thickness again on the side closer to the opposite lateral surface 30d. In this way, the combined particle concentration is smoothly changed from the first light incidence surface 30c toward the opposite lateral surface 30d on the opposite side so as to once decrease, then increase and then decrease on the side closer to the opposite lateral surface. With this configuration, light having entered through the light incidence surface can travel to a position further away from the light incidence surface even in a large and thin light guide plate, whereby outgoing light may have a luminance distribution which is high in the middle.

By adjusting the combined particle concentration in the vicinity of the light incidence surface higher than the local minimum value, light having entered through the light incidence surface can be sufficiently diffused in the vicinity of the light incidence surface. Therefore, outgoing light from the vicinity of the light incidence surface can be prevented from having visible bright lines (dark lines, unevenness) which are attributable to such causes as the intervals at which the light sources are disposed.

By adjusting the shape of the interface z, the luminance distribution (concentration distribution of the scattering particles) can be also set as desired to improve the efficiency to the maximum extent possible.

In addition, since the particle concentration of the layer on the side closer to the light exit surface is made lower than that of the other layer, the total amount of the scattering particles used can be reduced, thus leading to cost reduction.

Although the light guide plate 30 is divided into the first layer 60 and the second layer 62 by the interface z, the first layer 60 and the second layer 62 are obtained by dispersing the same scattering particles in the same transparent resin and have an integrated structure, the only difference being the particle concentration. That is, the light guide plate 30 has different particle concentrations in the respective regions on both sides of the interface z which serves as a reference but the interface z is a virtual face and the first layer 60 is integrated with the second layer 62.

The light guide plate 30 as described above may be manufactured using an extrusion molding method or an injection molding method.

In the practice of the invention, the scattering particles to be kneaded and dispersed in the light guide plate 30 are obtained by mixing a particle group with an average particle size of less than 7 μm having a local maximum value and a particle group with an average particle size of more than 7 μm having a local maximum value, and satisfy the following expressions: 1 μm≤Ds<7 μm, 7 μm<Db≤12 μm and 0.3≤a≤0.5 (where Ds represents the average particle size of the particle group with the average particle size of less than 7 μm, Db represents the average particle size of the particle group with the average particle size of more than 7 μm, and a represents a ratio of the volume of the particle group with the average particle size of less than 7 μm to the volume of all the scattering particles). By thus mixing the particle group whose average particle size is less than 7 μm with the particle group whose average particle size is more than 7 μm, the particle size distribution has two or more local maximum values including a first local maximum value taken at the particle size of less than 7 μm and a second local maximum value taken at the particle size of more than 7 μm.

Scattering particles having a particle size of less than 7 μm are more likely to scatter light at shorter wavelengths but less likely to scatter light at longer wavelengths. On the other hand, particles having a particle size of more than 7 μm are more likely to scatter light at longer wavelengths but less likely to scatter light at shorter wavelengths.

FIG. 6A shows calculation results obtained by simulating the intensity distributions of outgoing light (quantities of outgoing light) in a case where light at a wavelength of 450 nm (blue light), light at a wavelength of 555 nm (green light) and light at a wavelength of 650 nm (red light) are allowed to enter a light guide plate having the shape shown in FIG. 3 and containing scattering particles with a single particle size of 7 μm. Likewise, FIG. 6B shows the quantity of outgoing light at each wavelength in a case where a single particle size of 4.5 μm is applied, and FIG. 6C shows the quantity of outgoing light at each wavelength in a case where a single particle size of 10 μm is applied.

In FIGS. 6A to 6C, the vertical axis indicates the intensity (standard value) of outgoing light from the light exit surface 30a and the horizontal axis indicates the position in a direction perpendicular to the first light incidence surface 30c of the light guide plate 30 (the center is set as 0 mm). The intensity of the blue light is indicated by a solid line, the intensity of the green light by a broken line, and the intensity of the red light by a chain line.

In the case where the scattering particles with the single particle size of 7 μm are used as shown in FIG. 6A, the light quantity distributions of the blue light, green light and red light do not have so large differences but are coincident with each other to some extent. In contrast, in the case where the single particle size of 4.5 μm is applied as shown in FIG. 6B, the quantity of the blue light increases and that of the red light decreases in the vicinity of the light incidence surface (−400 mm side position), whereas that of the red light increases and that of the blue light decreases in the vicinity of the opposite lateral surface (400 mm side position). On the other hand, in the case where the single particle size of 10 μm is applied as shown in FIG. 6C, the quantity of the red light increases and that of the blue light decreases in the vicinity of the light incidence surface (−400 mm side position), whereas that of the blue light increases and that of the red light decreases in the vicinity of the opposite lateral surface (400 mm side position).

The wavelength at which light is more likely to scatter is thus different between scattering particles with the particle size of less than 7 μm and scattering particles with the particle size of more than 7 μm.

Accordingly, by mixing scattering particles having the average particle size of less than 7 μm with scattering particles having the average particle size of more than 7 μm at a predetermined ratio so that the scattering particles have a particle size distribution which has a first local maximum value at the particle size of less than 7 μm and a second local maximum value at the particle size of more than 7 μm, the ease of scattering depending on the wavelengths can be made uniform to make constant the ratio between the quantities of outgoing light at the respective wavelengths also in a large-sized light guide plate, whereupon color unevenness of outgoing light from the light exit surface 30a can be reduced.

In the light guide plate of the invention, when the average particle size of the particle group whose average particle size is less than 7 μm is denoted by Ds, the average particle size of the particle group whose average particle size is more than 7 μm is denoted by Db, and a ratio of the volume of the particle group whose average particle size is less than 7 μm to the volume of all the scattering particles is denoted by a, the average particle sizes Ds and Db, and the ratio a satisfy the following relationships: 1 μm≤Ds<7 μm, 7 μm<Db≤12 μm and 0.3≤a≤0.5. Further, the ratio a more preferably satisfies a range of 0.35≤a≤0.45.

When the particle group with the average particle size of less than 7 μm has an average particle size Ds of less than 1 μm, the Rayleigh scattering region is approached to considerably increase the scattering intensity with respect to blue light, thus increasing the scattering intensity ratio between the blue light and light at other wavelengths. Therefore, the difference in the quantity of outgoing light depending on the wavelength, that is, the color difference is also increased. Accordingly, the average particle size Ds is preferably 1 μm or more.

When the particle group with the average particle size of more than 7 μm has an average particle size Db of more than 12 μm, the forward scattering intensity increases to approach a geometric optical region and hence light is less likely to scatter and to exit in the vicinity of the light entrance portion. Therefore, a desired luminance distribution cannot be obtained. Accordingly, the average particle size Db is preferably 12 μm or less.

When the particle group with the average particle size Ds is mixed with the particle group with the average particle size Db, the ratio a of the volume of the particle group with the average particle size Ds to that of all the scattering particles is set in a range of 0.3 to 0.5 and preferably 0.35 to 0.45. The ease of scattering depending on the wavelengths can be thus made uniform to reduce the color differences of outgoing light.

The particle group with the average particle size Ds and the particle group with the average particle size Db may be those with a single particle size or monodisperse particle groups. Alternatively, these particle groups may be polydisperse.

In order for the two particle groups to have a single particle size, classification with a very high degree of accuracy is necessary, which may lead to a considerable cost increase.

In contrast, when the two particle groups are monodisperse or polydisperse particle groups, it is not necessary for the classification accuracy to be so high and hence cost increases can be prevented.

The two particle groups may be those in which the way of dispersion is different from each other, as exemplified by a case where one of the particle groups is monodisperse and the other is polydisperse.

In the practice of the invention, a particle group having a monodisperse particle size distribution satisfies a Gaussian distribution in which the distribution of the particle size with respect to the central particle size (particle size at the local maximum value) falls within a range of ±0.5 μm when calculated as 3σ, where σ represents the standard deviation. A polydisperse particle group is one in which the distribution of the particle size with respect to the central particle size (particle size at the local maximum value) exceeds a range of ±0.5 μm when calculated as 3σ and is a particle group having a smooth distribution as compared with the particle size distribution of the monodisperse particle group.

In each of the monodisperse particle group and the polydisperse particle group, the particle size distribution has one local maximum value.

The particle size distribution of each of the two particle groups may have two or more local maximum values.

The particle group with the average particle size of less than 7 μm (the particle group with the average particle size Ds) may contain particles with an average particle size of 7 μm or more and the particle group with the average particle size of more than 7 μm (the particle group with the average particle size Db) may contain particles with a particle size of 7 μm or less. The particle size distribution of the particle group with the average particle size of less than 7 μm and that of the particle group with the average particle size of more than 7 μm may overlap each other. In this regard, scattering particles obtained by mixing such two particle groups whose particle size distributions overlap each other may have a particle size distribution having a third local maximum value located at an overlapping position in addition to a first local maximum value and a second local maximum value.

In the light guide plate 30 shown in FIG. 2, light emitted from the light source unit 28 and allowed to enter the light guide plate 30 through the first light incidence surface 30c is scattered by the scattering particles contained inside the light guide plate 30 as it travels through the inside of the light guide plate 30, and exits through the light exit surface 30a directly or after having been reflected by the rear surface 30b. Then, part of light may leak through the rear surface 30b but the light which leaked out is then reflected by a reflector 34 disposed on the side of the light guide plate 30 closer to the rear surface 30b to enter the light guide plate 30 again. The reflector 34 will be described later in detail.

In the illustrated example, the scattering particles to be kneaded and dispersed in the first layer 60 and those to be kneaded and dispersed in the second layer 62 are only different in particle concentration and have the same particle size distribution. However, the configuration is not limited to this but the first layer 60 and the second layer 62 may use scattering particles which are different in particle size distribution.

In the illustrated light guide plate 30, the second layer 62 has such a shape that its thickness changes so as to decrease from the first light incidence surface 30c toward the opposite lateral surface 30d, then changes so as to increase to reach a maximum thickness, and then smoothly changes so as to decrease again in the vicinity of the opposite lateral surface 30d. However, the present invention is not limited thereto.

Figure 7:
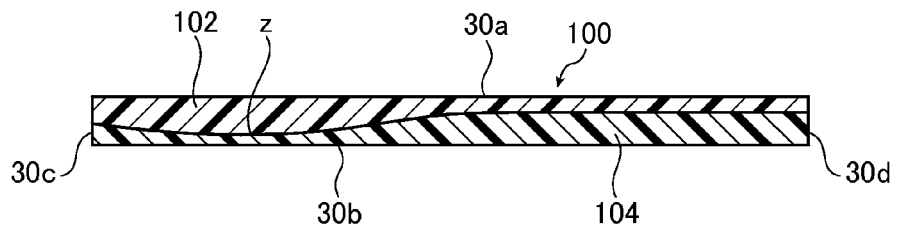
FIG. 7 is a schematic view showing another example of the light guide plate according to the invention.

FIG. 7 shows a schematic view of another example of the light guide plate of the invention.

A light guide plate 100 shown in FIG. 7 has the same configuration as the light guide plate 30 shown in FIG. 3B except that the shape of the interface z between the first layer 60 and the second layer 62 in the light guide plate 30 is changed. Therefore, like elements are denoted by the same reference numerals and the following description mainly focuses on the distinctive portions.

The light guide plate 100 shown in FIG. 7 includes a first layer 102 on the side closer to a light exit surface 30a and a second layer 104 on the side closer to a rear surface 30b. When seen in a cross section perpendicular to the longitudinal direction of a first light incidence surface 30c, an interface z between the first layer 102 and the second layer 104 changes so that the second layer 104 once decreases in thickness from the first light incidence surface 30c toward an opposite lateral surface 30d to reach a minimum thickness, subsequently changes so that the second layer 104 increases in thickness to reach a maximum thickness, and then smoothly changes so that the second layer 62 has a constant thickness until the opposite lateral surface 30d.

More specifically, the interface z includes a curved surface concave toward the light exit surface 30a on the side closer to the first light incidence surface 30c of the light guide plate 100, a convex curved surface at the central portion smoothly connected to the concave curved surface and a flat surface smoothly connected to the convex curved surface and positioned on the side closer to the opposite lateral surface 30d.

Light having entered through the light incidence surface can travel to a position further away from the light incidence surface even in a large and thin light guide plate in which the thickness of the second layer is thus constant on the opposite lateral surface side, whereby outgoing light may have a luminance distribution which is high in the middle.

In the light guide plate shown in FIG. 3B, the second layer 62 has such a shape that its thickness changes so as to decrease with increasing distance from the first light incidence surface, and then increases. However, the configuration is not limited thereto.

Figure 8:
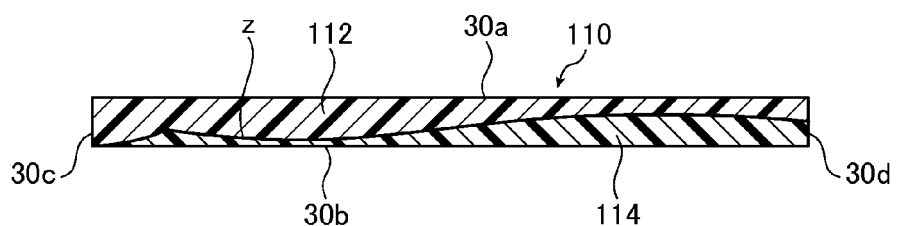
FIG. 8 is a schematic view showing still another example of the light guide plate according to the invention.

FIG. 8 is a schematic view showing still another example of the light guide plate of the invention.

A light guide plate 110 shown in FIG. 8 has the same configuration as the light guide plate 30 except that the shape of the interface z in the light guide plate 30 is changed. Therefore, in the following description, like elements are denoted by the same reference numerals and the following description mainly focuses on the distinctive portions.

The light guide plate 110 shown in FIG. 8 includes a first layer 112 on the side closer to a light exit surface 30a and a second layer 114 on the side closer to a rear surface 30b. When seen in a cross section perpendicular to the longitudinal direction of a first light incidence surface 30c, an interface z between the first layer 112 and the second layer 114 changes so that the second layer 114 increases in thickness from the first light incidence surface 30c toward an opposite lateral surface 30d, then changes so that the second layer 114 once decreases in thickness, next smoothly changes so that the second layer 114 increases in thickness to reach a maximum thickness and continuously changes so that the second layer 114 decreases in thickness again on the side closer to the opposite lateral surface 30d.

More specifically, the interface z includes a curved surface convex toward the light exit surface 30a on the side closer to the opposite lateral surface 30d, a concave curved surface smoothly connected to the convex curved surface, and a concave curved surface connected to the concave curved surface and communicating with one end of the first light incidence surface 30c on the side closer to the rear surface 30b. The thickness of the second layer 114 at the first light incidence surface 30c is zero.

More specifically, the combined particle concentration of the scattering particles (thickness of the second layer) is changed so as to have a first local maximum value in the vicinity of the first light incidence surface 30c and a second local maximum value on the side closer to the opposite lateral surface 30d beyond the central portion of the light guide plate, the second local maximum value being larger than the first local maximum value.

Although not shown, the combined particle concentration of the light guide plate 110 has the first local maximum value at the edge of an opening 44a of a housing 26 and the region from the first light incidence surface 30c to the position of the first local maximum value is a so-called mixing zone M for diffusing light having entered through the light incidence surface.

By adjusting the combined particle concentration so as to have the first local maximum value in the vicinity of the first light incidence surface 30c, incident light through the first light incidence surface 30c can be sufficiently diffused in the vicinity of the light incidence surface to prevent outgoing light from the vicinity of the light incidence surface from having visible bright lines (dark lines, unevenness) which are attributable to such causes as intervals at which the light sources are disposed.

The region from the first light incidence surface 30c to the position at which the combined particle concentration has the first local maximum value is adjusted so that the combined particle concentration is lower than the first local maximum value. This makes it possible to reduce return light, which is outgoing light through the light incidence surface after it once enters the light guide plate, and also reduce outgoing light from the region in the vicinity of the light incidence surface (mixing zone M) which is not used because the region is covered with the housing, whereupon the use efficiency of outgoing light through the effective region of the light exit surface (effective screen area E) can be improved.

In the light guide plate 110 shown in FIG. 8, the portion of the interface z from the first light incidence surface 30c to the position showing the first local maximum value (the interface at the mixing zone) has a concave curved shape toward the light exit surface 30a. However, the shape is not limited to this but this portion of the interface may have a curved surface which is convex toward the light exit surface 30a and communicates with an end of the first light incidence surface 30c on the side closer to the rear surface 30b. The portion of the interface may have a flat surface connecting the end of the first light incidence surface 30c on the side closer to the rear surface 30b with the position showing the first local maximum value. Alternatively, the portion between the first light incidence surface 30c and the position showing the first local maximum value may not have the second layer 114 but be wholly composed of the first layer 112.

In a cross section perpendicular to the longitudinal direction of the light incidence surface, the concave curved surface and the convex curved surface which form the interface z may each have a curve expressed by part of a circle or an ellipse, a quadratic curve, a curve expressed by a polynomial, or a curve obtained by a combination thereof.

Next, the optical member unit 32 will be described.

The optical member unit 32 is provided to reduce the luminance unevenness and illuminance unevenness of illumination light emitted through the light exit surface 30a of the light guide plate 30 before emitting the light through the light exit surface 24a of the lighting device main body 24. As shown in FIG. 2, the optical member unit 32 includes a diffusion sheet 32a for diffusing the illumination light emitted through the light exit surface 30a of the light guide plate 30 to reduce the luminance unevenness and illuminance unevenness; a prism sheet 32b having microprism arrays formed thereon parallel to the line where the light exit surface 30a and the first light incidence surface 30c meet; and a diffusion sheet 32c for diffusing the illumination light emitted from the prism sheet 32b to reduce the luminance unevenness and the illuminance unevenness.

There is no particular limitation on the diffusion sheets 32a and 32c and the prism sheet 32b, and known diffusion sheets and prism sheets may be used. For example, sheets disclosed in paragraphs [0028] through [0033] of commonly assigned JP 2005-234397 A may be applied as the diffusion sheets and the prism sheet.

While the optical member unit in the embodiment under consideration includes the two diffusion sheets 32a and 32c and the prism sheet 32b disposed between the two diffusion sheets, there is no particular limitation on the order in which the prism sheet and the diffusion sheets are arranged or the number of the sheets to be used. The materials of the prism sheet and the diffusion sheets are also not particularly limited, and use may be made of various optical members, as long as they can further reduce the unevenness in luminance and illuminance of the illumination light emitted through the light exit surface 30a of the light guide plate 30.

For example, the optical members used in addition to or instead of the above-described diffusion sheets and prism sheet may be transmittance adjusting members in which a large number of transmittance adjusters consisting of diffusion reflectors are disposed according to the luminance unevenness and the illuminance unevenness. Further, the optical member unit may be of a two-layer structure including one prism sheet and one diffusion sheet or including two diffusion sheets only.

Next, the reflector 34 of the lighting device main body 24 will be described.

The reflector 34 is provided to reflect light leaking through the rear surface 30b of the light guide plate 30 back into the light guide plate 30 and helps enhance the light use efficiency. The reflector 34 is disposed so as to face the rear surface 30b of the light guide plate 30.

The reflector 34 may be formed of any material, as long as it can reflect light leaking through the rear surface 30b of the light guide plate 30. The reflector 34 may be formed, for example, of a resin sheet produced by kneading a filler with PET or PP (polypropylene) and then drawing the resultant mixture to form voids therein for increased reflectance; a sheet with a specular surface formed by, for example, aluminum vapor deposition on the surface of a transparent or white resin sheet; a metal foil such as an aluminum foil or a resin sheet carrying a metal foil; or a thin metal sheet having sufficient reflectivity on the surface.

An upper light guide reflector 36 is disposed between the light guide plate 30 and the diffusion sheet 32a, i.e., on the side closer to the light exit surface 30a of the light guide plate 30, so as to cover the light source unit 28 and an end portion of the light exit surface 30a of the light guide plate 30 (i.e., an end portion on the side closer to the first light incidence surface 30c).

By thus providing the upper light guide reflector 36, light emitted from the light source unit 28 can be prevented from leaking above the light guide plate 30.

Thus, light emitted from the light source unit 28 is allowed to efficiently enter the light guide plate 30 to enhance the light use efficiency.

A lower light guide reflector 38 is disposed on the side closer to the rear surface 30b of the light guide plate 30 so as to cover part of the light source unit 28. An end of the lower light guide reflector 38 closer to the center of the light guide plate 30 is connected to the reflector 34.

The upper light guide reflector 36 and the lower light guide reflector 38 may be formed of any of the above-mentioned various materials used to form the reflector 34.

By providing the lower light guide reflector 38, light emitted from the light source unit 28 can be prevented from leaking below the light guide plate 30.

Thus, light emitted from the light source unit 28 is allowed to efficiently enter the light guide plate 30 through the first light incidence surface 30c to enhance the light use efficiency.

While the reflector 34 is connected to the lower light guide reflector 38 in the embodiment under consideration, this is not the sole case and they may be used as separate members.

The shapes and the widths of the upper light guide reflector 36 and the lower light guide reflector 38 are not particularly limited as long as light emitted from the light source unit 28 can be reflected toward the side of the first light incidence surface 30c and allowed to enter the light guide plate 30.

Next, the housing 26 will be described.

As shown in FIG. 2, the housing 26 accommodates and supports the lighting device main body 24, and holds and secures the lighting device main body 24 from the side closer to the light exit surface 24a and the side closer to the rear surface 30b of the light guide plate 30. The housing 26 includes the lower housing 42, the upper housing 44, the folded members 46 and the support members 48.

The lower housing 42 is open at the top and has a shape formed by a bottom section and lateral sections provided upright on the four sides of the bottom section. In brief, it is substantially in the shape of a rectangular box open on one side. As shown in FIG. 2, the lower housing 42 supports the lighting device main body 24 placed therein from above on the bottom section and the lateral sections and covers the faces of the lighting device main body 24 except the light exit surface 24a, i.e., the face opposite from the light exit surface 24a of the lighting device main body 24 (rear surface) and the lateral faces.

The upper housing 44 has the shape of a rectangular box; it has at the top a rectangular opening which is smaller than the rectangular light exit surface 24a of the lighting device main body 24 and is open at the bottom.

As shown in FIG. 2, the upper housing 44 is placed from above the lighting device main body 24 and the lower housing 42 (from the light exit surface side) to cover the lighting device main body 24 and the lower housing 42 holding the main body therein, including the four lateral sections.

The folded members 46 have a concave (U-shaped) sectional profile that is always identical throughout their length. That is, each folded member 46 is a bar-shaped member having a U-shaped profile in cross section perpendicular to the direction in which they extend.

As shown in FIG. 2, the folded members 46 are fitted between the lateral faces of the lower housing 42 and the lateral faces of the upper housing 44 such that the outer face of one of the parallel sections of the U-shaped member is connected with the lateral section of the lower housing 42 whereas the outer face of the other parallel section is connected with the lateral section of the upper housing 44.

Various known methods including a method using bolts and nuts and a method using an adhesive may be used to join the lower housing 42 to the folded members 46 and the folded members 46 to the upper housing 44.

By thus providing the folded members 46 between the lower housing 42 and the upper housing 44, the rigidity of the housing 26 can be increased to prevent the light guide plate 30 from warping.

Various materials such as metals and resins may be used to form the upper housing 44, the lower housing 42 and the folded members 46 of the housing 26. The material used is preferably light in weight and very strong.

While the folded members 46 are provided as separate members in the embodiment under consideration, they may be integrated with the upper housing 44 or the lower housing 42. Alternatively, the housing may not have the folded members 46.

The support members 48 are rod members each having an identical shape in cross section perpendicular to the direction in which they extend.

As shown in FIG. 2, the support members 48 are provided between the reflector 34 and the lower housing 42 at positions corresponding to the sides closer to the first light incidence surface 30c and the opposite lateral surface 30d, respectively. The support members 48 thus secure the light guide plate 30 and the reflector 34 to the lower housing 42 and support them.

While the support members 48 are provided as separate members in the embodiment under consideration, the invention is not limited thereto and they may be integrated with the lower housing 42 or the reflector 34. To be more specific, projections may be formed in part of the lower housing 42 to serve as the support members 48 or projections may be formed in part of the reflector 34 to serve as the support members 48.

The shape of the support members 48 is not particularly limited and the support members 48 may have any of various shapes. The support members 48 may also be formed of various materials. For example, a plurality of support members 48 may be provided at predetermined intervals.

The backlight unit 20 is basically configured as described above.

In the backlight unit 20, light emitted from the light source unit 28 provided on one end face of the light guide plate 30 enters through the first light incidence surface 30c of the light guide plate 30. The incident light through the first light incidence surface 30c is scattered by scatterers contained inside the light guide plate 30 as the light travels inside the light guide plate 30 and is emitted through the light exit surface 30a directly or after being reflected by the rear surface 30b. Then, part of the light leaking through the rear surface 30b is reflected by the reflector 34 to enter the light guide plate 30 again.

The light thus emitted through the light exit surface 30a of the light guide plate 30 is transmitted through the optical member unit 32 and emitted through the light exit surface 24a of the lighting device main body 24 to illuminate the liquid crystal display panel 12.

The liquid crystal display panel 12 uses the drive unit 14 to control the light transmittance according to the position so as to display characters, figures, images, etc. on its surface.

Although the light guide plate according to the above embodiment is of a type including one light source unit disposed on one light incidence surface so that light enters from one side of the light guide plate, the invention is not limited thereto; the light guide plate may be of a type including two light source units disposed on two opposite light incidence surfaces so that light enters from both sides of the light guide plate.

Figure 9A:
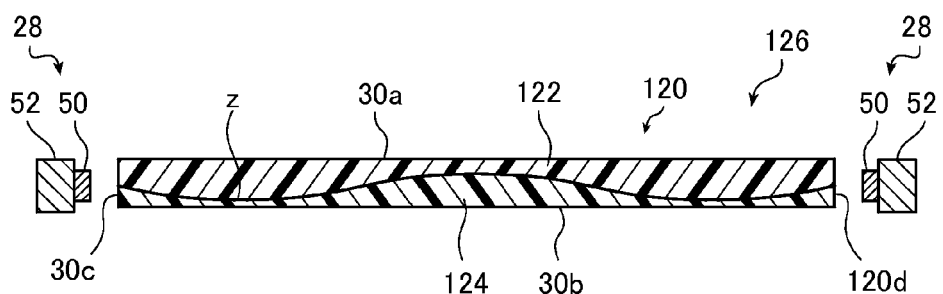
FIGS. 9A and 9B are schematic views showing other examples of the planar lighting device using the light guide plate according to the invention.

FIG. 9A shows a schematic view of yet another example of the light guide plate of the invention.

Since a backlight unit 126 shown in FIG. 9A has the same configuration except that the light guide plate 30 is replaced by a light guide plate 120 and that two light source units 28 are provided on two light incidence surfaces of the light guide plate 120 so as to face them, like elements are denoted by the same reference numerals and the following description mainly focuses on the distinctive portions. In FIG. 9A, portions other than the light guide plate 120 and the light source units 28 are not shown.

The backlight unit 126 includes the light guide plate 120 and the two light source units 28 disposed so as to face a first light incidence surface 30c and a second light incidence surface 120d of the light guide plate 120, respectively.

The light guide plate 120 includes a light exit surface 30a, the two light incidence surfaces (the first light incidence surface 30c and the second light incidence surface 120d) formed on two opposite longer sides of the light exit surface 30a, and a rear surface 30b which is a surface on the opposite side to the light exit surface 30a.

The light guide plate 120 includes a first layer 122 located on the light exit surface 30a side and a second layer 124 having a higher particle concentration than the first layer 122 and located on the rear surface 30b side.

When an interface z between the first layer 122 and the second layer 124 in the light guide plate 120 is seen in a cross section perpendicular to the longitudinal direction of the first light incidence surface 30c, the second layer 124 has a maximum thickness at the central portion of the light exit surface 30a, then smoothly changes so as to decrease in thickness toward the first light incidence surface 30c and the second light incidence surface 120d to reach a minimum thickness, and then smoothly changes so as to increase in thickness.

More specifically, the interface z includes a curved surface convex toward the light exit surface 30a at the central portion of the light guide plate 120, and two concave curved surfaces smoothly connected to the convex curved surface and communicating with the light incidence surfaces 30c and 120d.

The thickness of the second layer 124 is continuously changed so as to be the largest and have a local maximum value at the central portion of the light guide plate and to be once decreased and have a local minimum value in the vicinities of the light incidence surfaces. The combined particle concentration of the scattering particles is thus changed so as to have the local minimum value in the vicinities of the first and second light incidence surfaces (30c and 120d) and the local maximum value at the central portion of the light guide plate.

More specifically, the profile of the combined particle concentration has a curve which has the second local maximum value that is the largest at the center of the light guide plate and which changes on both sides so as to have the local minimum value at positions away by about two-thirds of the distance from the center to the light incidence surfaces in the illustrated example.

The second layer 124 of the light guide plate 120 is changed so as to have the maximum thickness at the central portion and the minimum thickness in the vicinities of the light incidence surfaces. With this profile, light having entered through the light incidence surfaces 30c and 120d can travel to a position further away from the light incidence surfaces 30c and 120d even in a large and thin light guide plate, whereby outgoing light may have a luminance distribution which is high in the middle.

The light guide plate 120 shown in FIG. 9A has such a configuration that the thickness of the second layer 124 is smoothly changed so as to be the largest and have the local maximum value at the central portion of the light guide plate and to be once decreased and have the local minimum value in the vicinities of the light incidence surfaces. However, the configuration is not limited thereto.

Figure 9B:
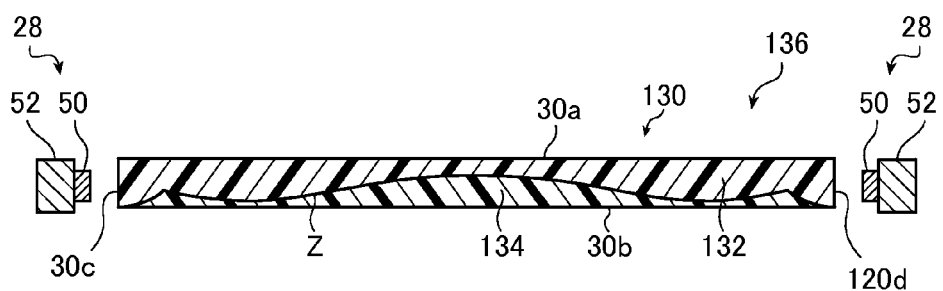

FIG. 9B shows a schematic view of still yet another example of the light guide plate of the invention.

A light guide plate 130 shown in FIG. 9B has the same configuration as the light guide plate 120 except that the shape of the interface z in the light guide plate 120 is changed. Therefore, like elements are denoted by the same reference numerals and the following description mainly focuses on the distinctive portions. In FIG. 9B, portions other than the light guide plate 130 and light source units 28 are not shown.

The light guide plate 130 shown in FIG. 9B includes a first layer 132 and a second layer 134 having a larger particle concentration than the first layer 132. When an interface z between the first layer 132 and the second layer 134 in the light guide plate 130 is seen in a cross section perpendicular to the longitudinal direction of first and second light incidence surfaces 30c and 120d, the second layer 134 has a maximum thickness at the central portion of a light exit surface 30a, then smoothly changes so as to decrease in thickness toward the first light incidence surface 30c and the second light incidence surface 120d, and then continuously changes so as to once increase in thickness in the vicinities of the first light incidence surface 30c and the second light incidence surface 120d and to decrease in thickness again.

More specifically, the interface z includes a curved surface convex toward the light exit surface 30a at the central portion of the light guide plate 120, two concave curved surfaces smoothly connected to the convex curved surface, and concave curved surfaces connected to the concave curved surfaces and communicating with ends of the light incidence surfaces 30c and 120d on the side closer to the rear surface 30b. The thickness of the second layer 134 at the light incidence surfaces 30c and 120d is zero.

The thickness of the second layer 134 containing scattering particles at a higher particle concentration than that in the first layer 132 is continuously changed so that the second layer once increases in thickness and has a first local maximum value in the vicinities of the light incidence surfaces and has a second local maximum value at the central portion of the light guide plate where the thickness is the largest. The combined particle concentration of the scattering particles is thus changed so as to have a first local maximum value in the vicinities of the first and second light incidence surfaces (30c and 120d) and a second local maximum value at the central portion of the light guide plate, the second local maximum value being larger than the first local maximum value.

More specifically, the profile of the combined particle concentration has a curve which has the second local maximum value that is the largest at the center of the light guide plate 30 and which changes on both sides so as to have the local minimum value at positions away by about two-thirds of the distance from the center to the light incidence surfaces (30c and 120d) and to further have the first local maximum value on the sides closer to the light incidence surfaces from the positions of the local minimum value in the illustrated example.

The first local maximum value in the thickness (combined particle concentration) of the second layer 134 is located near the edge of an opening of an upper housing 44 (not shown). The regions covered with the frame portion which forms the opening of the upper housing 44 do not contribute to the emission of light as the backlight unit 20.

In other words, the regions from the light incidence surfaces 30c and 120d to their corresponding positions of the first local maximum value are so-called mixing zones M for diffusing light having entered through the light incidence surfaces.

The combined particle concentration is thus adjusted to have the first local maximum value in the vicinities of the light incidence surfaces 30c and 120d. Incident light through the light incidence surfaces 30c and 120d can be thereby sufficiently diffused in the vicinities of the light incidence surfaces to prevent outgoing light from the vicinities of the light incidence surfaces from having visible bright lines (dark lines, unevenness) which are attributable to such causes as intervals at which the light sources are disposed.

The regions from the light incidence surfaces 30c, 120d to their corresponding positions at which the combined particle concentration has the first local maximum value are adjusted so that the combined particle concentration is lower than the first local maximum value. This makes it possible to reduce return light, which is outgoing light through the light incidence surfaces after it once enters the light guide plate, and also reduce outgoing light from the regions in the vicinities of the light incidence surfaces (mixing zones M) which is not used because the regions are covered with the housing, whereupon the use efficiency of outgoing light through the effective region of the light exit surface (effective screen area E) can be improved.

In the light guide plate 130 shown in FIG. 9B, portions of the interface z from the light incidence surfaces (30c and 120d) to positions showing the first local maximum value (the interface at the mixing zones) have a concave curved shape toward the light exit surface 30a. However, the shape is not limited to this but these portions of the interface may each have a curved surface which is convex toward the light exit surface and communicates with an end of the light incidence surface on the side closer to the rear surface 30b. Each of the portions of the interface may have a flat surface connecting an end of the light incidence surface on the side closer to the rear surface 30b with the position showing the first local maximum value. Alternatively, each of the portions between the light incidence surfaces and their corresponding positions showing the first local maximum value may not have the second layer 134 but be wholly composed of the first layer 132.

As compared with the light incidence from one side, the quantity of light is easily increased in the light incidence from both sides in which two light source units are disposed. On the other hand, the light incidence from one side can reduce the number of light source units, thus leading to reduction of the number of parts and costs.

As compared with the light incidence from both sides, the distance over which light is guided is increased in the light incidence from one side and hence color unevenness is more likely to occur due to differences in ease of scattering depending on the wavelength. Accordingly, the light guide plate of the invention that can reduce color unevenness due to differences in ease of scattering depending on the wavelength can be more advantageously applied to a one-side incidence type backlight unit.

The backlight unit using the light guide plate of the invention is not limited thereto and, in addition to the two light source units, light source units may also be provided so as to face the lateral surfaces on the short sides of the light exit surface of the light guide plate. The intensity of light emitted from the device can be enhanced by increasing the number of light source units.

Light may be emitted not only through the light exit surface but also from the rear surface side.

The light guide plate of the invention includes the two layers which contain scattering particles at different particle concentrations. However, the light guide plate is not limited thereto and may include three or more layers which are different in the scattering particle concentration.

The invention will be described below in greater detail with reference to specific examples of the invention.

Example 1

In Example 1, the particle size distribution of scattering particles to be kneaded and dispersed in the light guide plate 30 shown in FIG. 3 was variously changed and the normalized intensity distributions (luminance distributions), the chromaticity distributions and the color differences of outgoing light were determined by computer simulation.

In Example 1, two particle groups each having a single particle size were mixed and used as scattering particles.

In the simulation, the material of the transparent resin of the light guide plate and the material of the scattering particles were modeled as PMMA and silicone particles, respectively. This will also apply to all the examples given below.

In Example 1-1, the light guide plate 30 corresponding to a 60-inch screen size was used. More specifically, the length $L_{1g}$ from the first light incidence surface 30c to the opposite lateral surface 30d (length of the light guide plate) was set to 780 mm.

The thickness $T_{1g}$ in a direction perpendicular to the light exit surface 30a (thickness of the light guide plate) was set to 2 mm.

The maximum thickness of the second layer 62 was set to 1.2 mm; the minimum thickness of the second layer 62 to 0.3 mm; the distance from the first light incidence surface 30c to the position of the maximum thickness to 680 mm; and the distance from the first light incidence surface 30c to the position of the minimum thickness to 80 mm.

As for the shape of the interface z, the radius of curvature of the concave curved surface on the side closer to the first light incidence surface 30c was set to 210,000 mm and the radius of curvature of the convex curved surface on the side closer to the opposite lateral surface 30d to 35,000 mm.

A particle group having a single particle size of 4.5 μm was mixed with a particle group having a single particle size of 10 μm at a volume ratio of 35:65 (a=0.35) and the mixture was used as the scattering particles to be kneaded and dispersed inside.

As for the concentration of the scattering particles, the concentration Npo in the first layer 60 was set to 0.0053 wt % and the concentration Npr in the second layer 62 to 0.252 wt %.

A method of calculating the intensity distributions of outgoing light by simulation is now described in detail.

Figure 10:
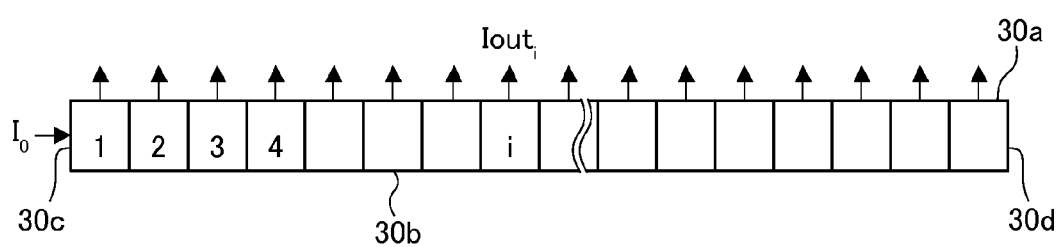
FIG. 10 is a conceptual view illustrating a method of calculating the intensity distribution of outgoing light through the light exit surface of the light guide plate.

As shown in FIG. 10, the light guide plate 30 is divided into a plurality of blocks each having a predetermined length in a direction perpendicular to the first light incidence surface 30c, and the intensity of outgoing light is calculated for each block to determine the intensity distributions of the outgoing light.

The attenuated light intensity $I_i(\lambda)$ in the ith block with respect to light at a wavelength λ, in other words, the intensity of light reaching the (i+1)th block is expressed by the following expression:

$$I_i(\lambda)=I_{i-1}(\lambda)\times EXP[-\Sigma_j(\lambda)\cdot Np_{ij}\cdot Lb_i\cdot Kc)] \quad (1)$$

where i is the block number, j is the particle size identification number, $\Phi_j(\lambda)$ is the scattering cross-section of scattering particles with the particle size j with respect to light at the wavelength λ, $Np_{ij}$ is the number of particles per unit volume of scattering particles with the particle size j in the ith block, $Lb_i$ is the length of the ith block in the light incident direction, Kc is the attenuation correction coefficient based on the light confinement effect and $I_0$ is the intensity of light incident through the first light incidence surface 30c.

Accordingly, the intensity $Ie_i(\lambda)$ of outgoing light through the light exit surface of the ith block is obtained by subtracting the attenuated light intensity in expression (1) from the intensity $I_{i-1}(\lambda)$ of incident light and hence is expressed by the following expression:

$$Ie_i(\lambda)=I_{i-1}(\lambda)\times\{1-EXP[-\Sigma_j(\Phi_j(\lambda)\cdot Np_{ij}\cdot Lb_i\cdot Kc)]\} \quad (2)$$

The intensity distribution of outgoing light at the wavelength λ can be determined by obtaining the intensity $Ie_i(\lambda)$ of the outgoing light from each block.

In Example 1-1, the light guide plate 30 was divided into 39 blocks each having a length Lb of 20 mm.

The intensity $I_0$ of incident light was normalized as 1.

The number of particles $Np_{ij}$ per unit volume of the scattering particles was determined from the thicknesses of the first layer 60 and the second layer 62 in the ith block, the length Lb of the block, the particle concentration Npo of the first layer 60, the particle concentration Npr of the second layer 62, and the mixing ratio between the two particle groups.

The scattering cross-section $\Phi_{4.5}$ (B) of scattering particles with a particle size of 4.5 μm with respect to blue light (450 nm) is $4.3\times10^{-5}$ mm$^2$, the scattering cross-section $\Phi_{4.5}$ (G) of the scattering particles with respect to green light (555 nm) is $3.7\times10^{-5}$ mm$^2$, and the scattering cross-section $\Phi_{4.5}$ (R) of the scattering particles with respect to red light (650 nm) is $2.9\times10^{-5}$ mm$^2$.

On the other hand, the scattering cross-section $\Phi_{10}$ (B) of scattering particles with a particle size of 10 μm with respect to blue light (450 nm) is $1.2\times10^{-4}$ mm$^2$, the scattering cross-section $\Phi_{10}$ (G) of the scattering particles with respect to green light (555 nm) is $1.6\times10^{-4}$ mm$^2$, and the scattering cross-section $\Phi_{10}$ (R) of the scattering particles with respect to red light (650 nm) is $2.2\times10^{-4}$ mm$^2$.

The intensity $Ie_i$(B) of outgoing light from each block in a case of incidence of blue light on the light guide plate in Example 1-1 was determined to obtain the intensity distribution of outgoing light from the light exit surface 30a. The intensity distribution of outgoing light in a case of incidence of green light and the intensity distribution of outgoing light in a case of incidence of red light were determined in the same manner.

Figure 11A:
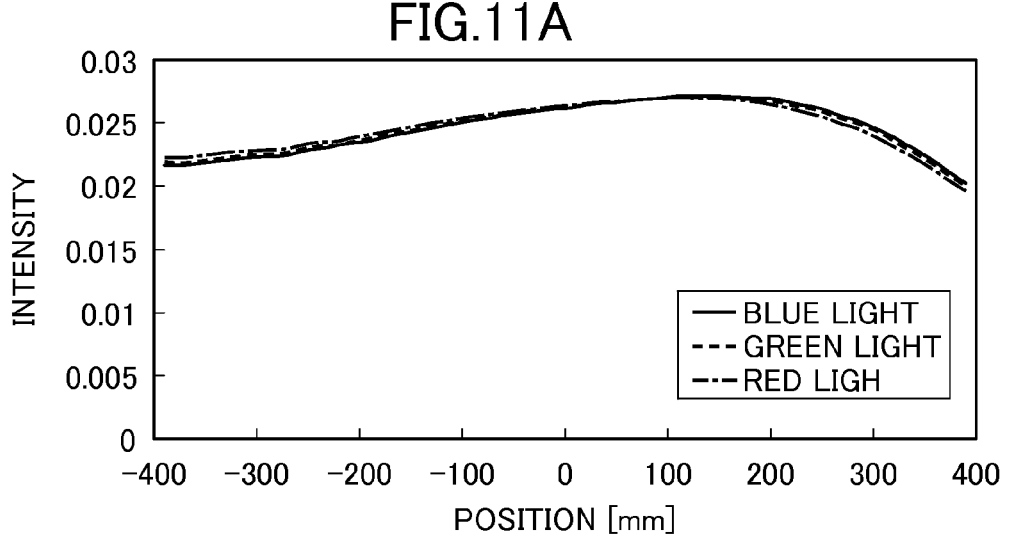
FIG. 11A is a graph showing measurement results of the intensity distributions of outgoing light.

The results are shown in FIG. 11A.

In FIG. 11A, the vertical axis indicates the intensity (standard value) of outgoing light from the light exit surface 30a and the horizontal axis indicates the position in a direction perpendicular to the first light incidence surface 30c of the light guide plate 30 (the center is set as 0 mm). The intensity of the blue light is indicated by a solid line, the intensity of the green light by a broken line, and the intensity of the red light by a chain line.

Next, in a case of incidence of white light, the distributions of the chromaticity x and the chromaticity y in the xyY color system were determined from the intensity distribution of light at each wavelength exiting from the light exit surface 30a, thereby obtaining the amounts of the chromaticity change.

The white light was modeled by the relative intensity of light at some wavelengths which is representative of the wavelength distribution of outgoing light from a white LED in which a YAG phosphor is applied onto the surface of a GaN light-emitting diode.

The intensity distribution of the outgoing light was determined from expression (2) for each wavelength of the modeled white light, the intensity distributions at the respective wavelengths were combined and the distributions of the chromaticities x and y were determined from the results.

Figure 11B:
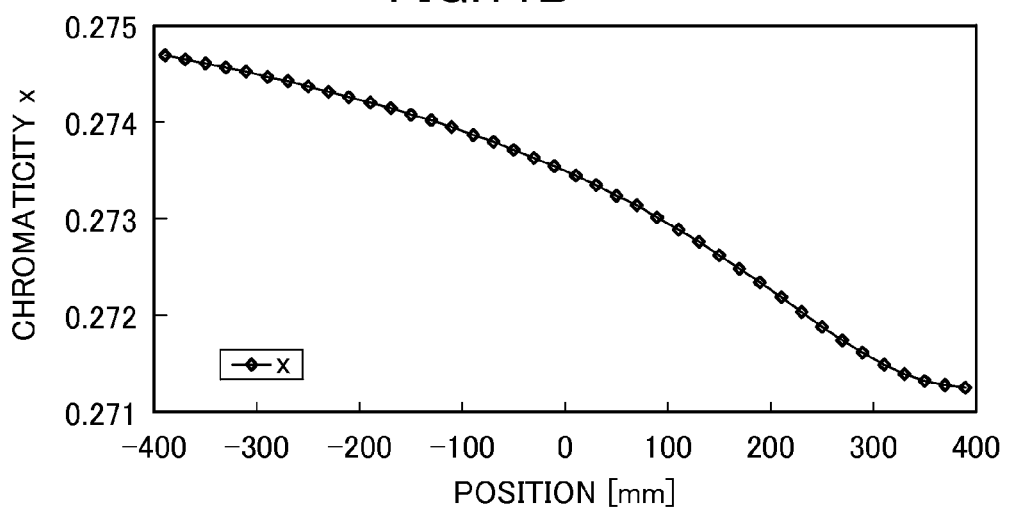
FIGS. 11B and 11C are graphs each showing measurement results of the chromaticity distribution of outgoing light.
Figure 11C:
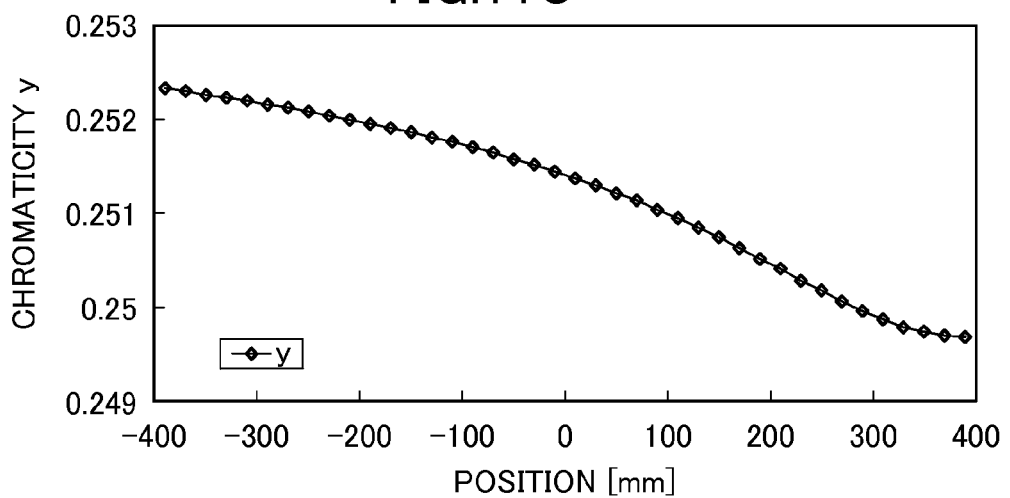

The results are shown in FIGS. 11B and 11C.

In FIG. 11B, the vertical axis indicates the chromaticity x of outgoing light from the light exit surface 30a and the horizontal axis indicates the position in the direction perpendicular to the first light incidence surface 30c of the light guide plate 30 (the center is set as 0 mm). In FIG. 11C, the vertical axis indicates the chromaticity y of outgoing light from the light exit surface 30a and the horizontal axis indicates the position in the direction perpendicular to the first light incidence surface 30c of the light guide plate 30 (the center is set as 0 mm).

The difference between a maximum value and a minimum value in each of the determined distributions of the chromaticity x and chromaticity y was determined as the color difference.

The color differences Δx and Δy were 0.003 and 0.003, respectively.

Next, in Example 1-2, Example 1-1 was repeated except that the particle group with the single particle size of 4.5 μm and the particle group with the single particle size of 10 μm were mixed at a ratio of 37.5:62.5 (a=0.375) for scattering particles, thereby determining the intensity distributions of blue light, green light and red light, and the distributions of the chromaticities x and y, and the color differences Δx and Δy.

Figure 12A:
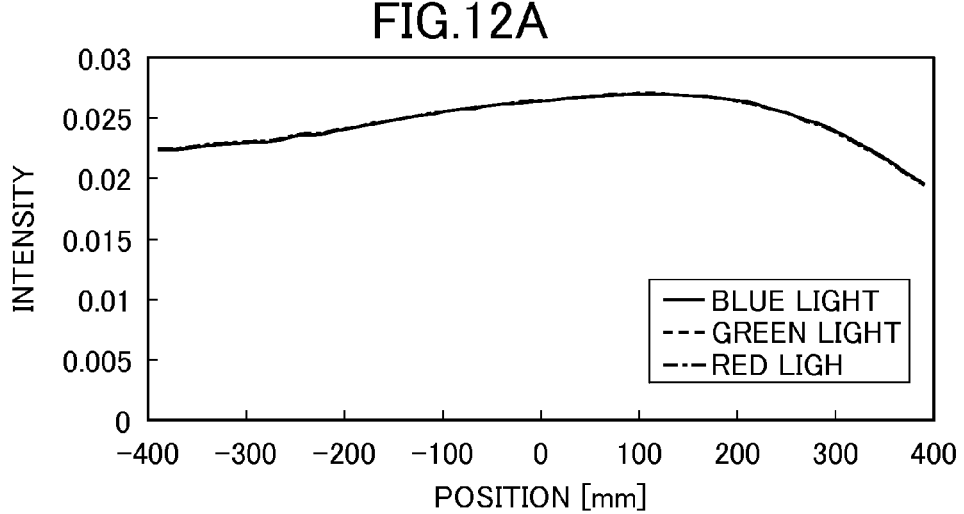
FIG. 12A is a graph showing measurement results of the intensity distributions of outgoing light.
Figure 12B:
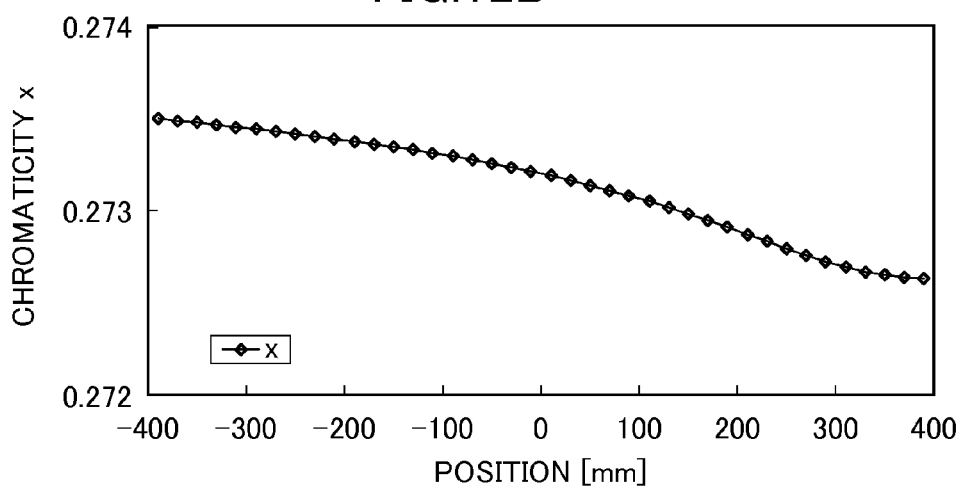
FIGS. 12B and 12C are graphs each showing measurement results of the chromaticity distribution of outgoing light.
Figure 12C:
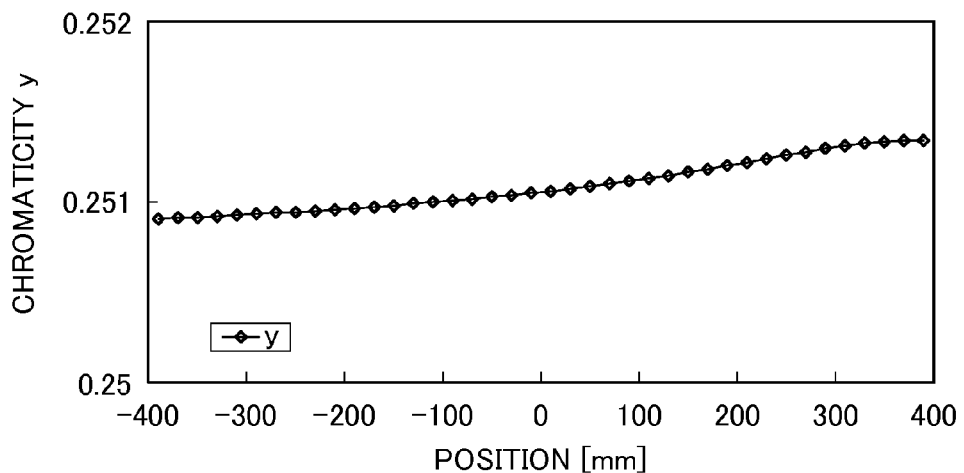

The results are shown in FIGS. 12A to 12C.

The color differences Δx and Δy were 0.0009 and 0.0004, respectively.

In Example 1-3, Example 1-1 was repeated except that the particle group with the single particle size of 4.5 μm and the particle group with the single particle size of 10 μm were mixed at a ratio of 40:60 (a=0.4) for scattering particles, thereby determining the intensity distributions of blue light, green light and red light, and the distributions of the chromaticities x and y, and the color differences Δx and Δy.

Figure 13A:
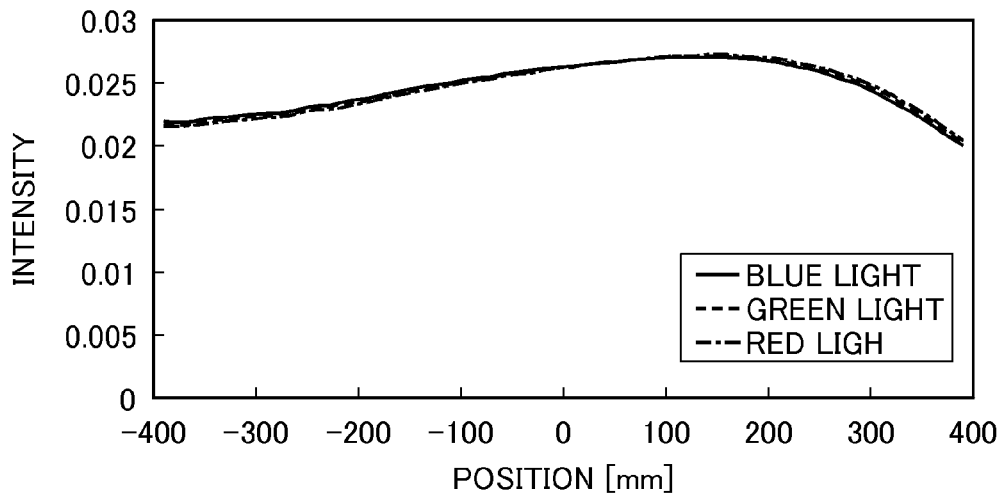
FIG. 13A is a graph showing measurement results of the intensity distributions of outgoing light.
Figure 13B:
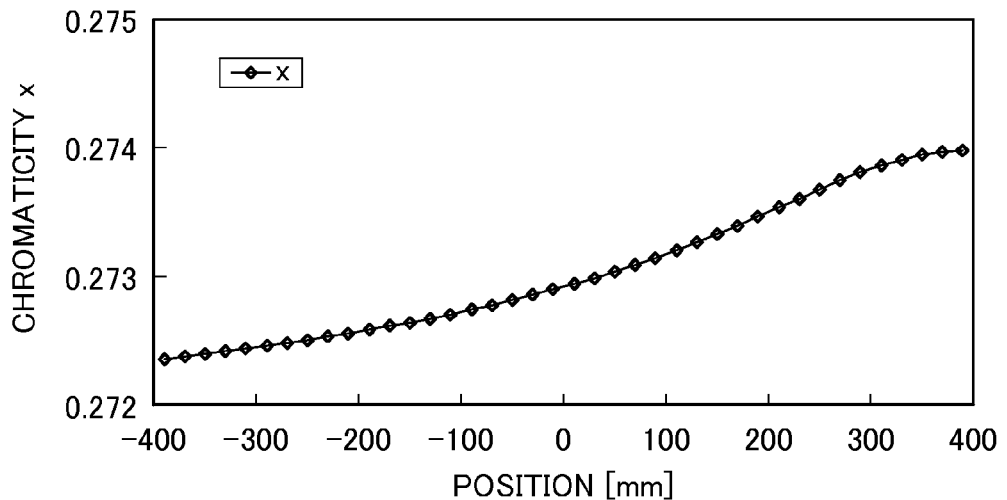
FIGS. 13B and 13C are graphs each showing measurement results of the chromaticity distribution of outgoing light.
Figure 13C:
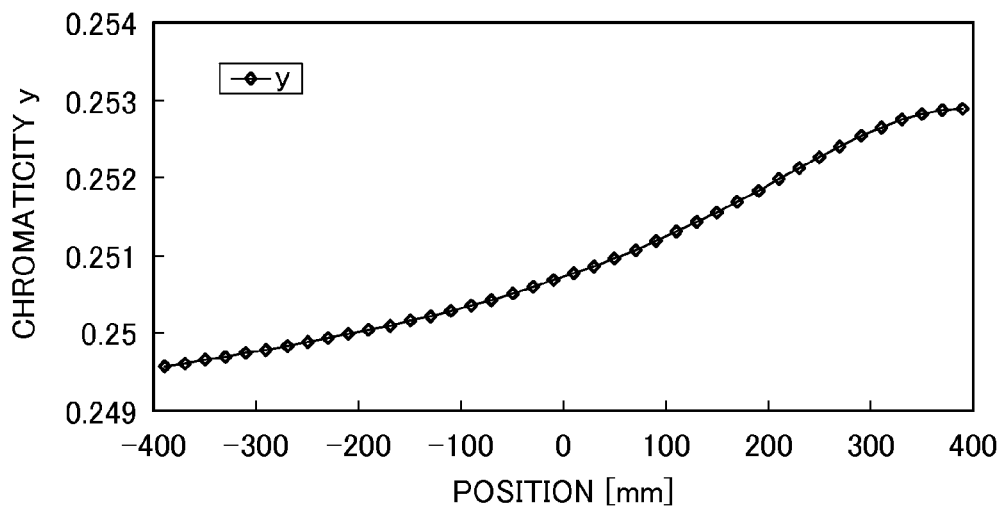
Figure 16A:
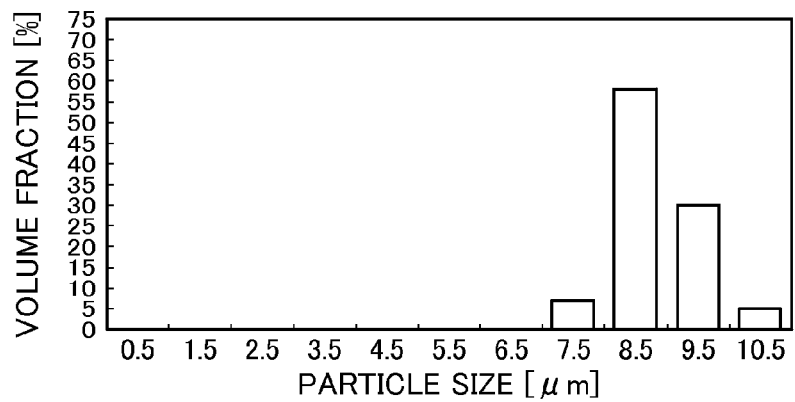
FIGS. 16A to 16D are graphs each showing the particle size distribution of a particle group.
Figure 16B:
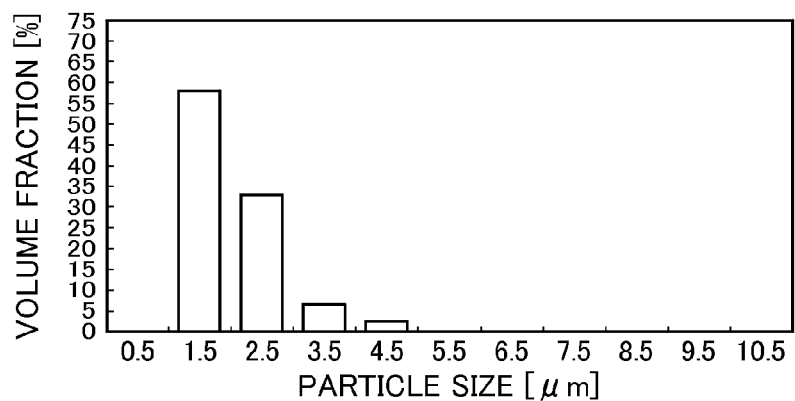
Figure 16C:
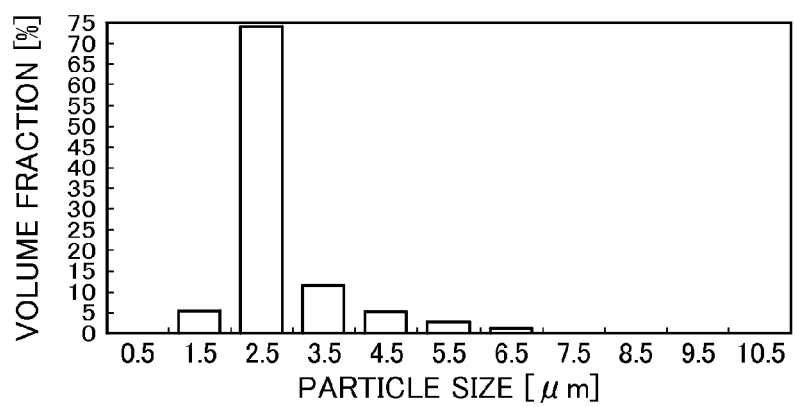
Figure 16D:
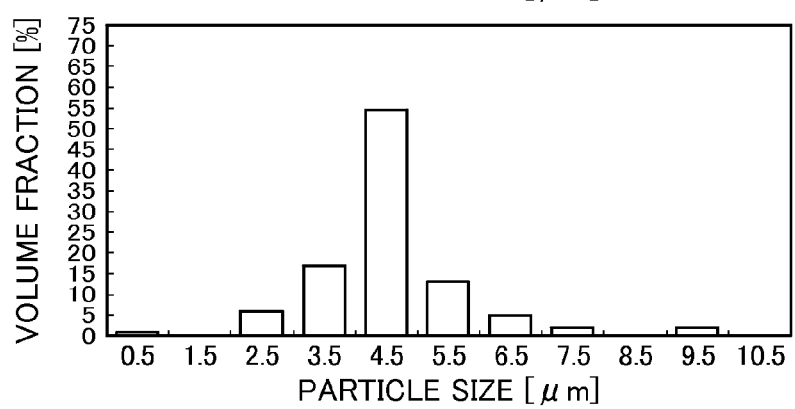

The results are shown in FIGS. 13A to 13C.

The color differences Δx and Δy were 0.0016 and 0.0033, respectively.

In Example 1-4, Example 1-1 was repeated except that the particle group with the single particle size of 4.5 μm and the particle group with the single particle size of 10 μm were mixed at a ratio of 50:50 (a=0.5) for scattering particles, thereby determining the intensity distributions of blue light, green light and red light, and the distributions of the chromaticities x and y, and the color differences Δx and Δy.

The results are shown in FIGS. 14A to 14C.

The color differences Δx and Δy were 0.010 and 0.013, respectively.

In Example 1-5, Example 1-1 was repeated except that the particle group with the single particle size of 4.5 μm and the particle group with the single particle size of 10 μm were mixed at a ratio of 60:40 (a=0.6) for scattering particles, thereby determining the intensity distributions of blue light, green light and red light, and the distributions of the chromaticities x and y, and the color differences Δx and Δy.

The results are shown in FIGS. 15A to 15C.

The color differences Δx and Δy were 0.017 and 0.021, respectively.

Example 2

Next, two monodisperse particle groups were mixed and used as scattering particles to determine the intensity distributions of outgoing light, the chromaticity distributions and the color differences.

The monodisperse particle groups for use in the examples are first described.

Four types of commercially available silicone particles (TOSPEARL 1100, TOSPEARL 120A, TOSPEARL 130A, and TOSPEARL 145T manufactured by Momentive Performance Materials Inc.) were used as models of monodisperse particle groups. The modeled particle groups are denoted by T1, T2, T3 and T4, respectively.

The particle size distributions of the particle groups T1, T2, T3 and T4 are shown in FIGS. 16A to 16D, respectively.

In FIGS. 16A to 16D, the vertical axis indicates the volume fraction (%) and the horizontal axis indicates the particle size (μm).

T1 has an average particle size of 10.0 μm, T2 an average particle size of 2.0 μm, T3 an average particle size of 3.0 μm, and T4 an average particle size of 4.5 μm.

In Example 2, the particle groups T1 and T4 were mixed and used as scattering particles.

In Example 2-1, Example 1-1 was repeated except that the particle groups T4 and T1 were mixed at a ratio of 40:60 (a=0.4) for scattering particles, thereby determining the intensity distributions of blue light, green light and red light, and the distributions of the chromaticities x and y, and the color differences Δx and Δy.

The results are shown in FIGS. 17A to 17C.

The color differences Δx and Δy were 0.0015 and 0.0046, respectively.

In Example 2-2, Example 2-1 was repeated except that the particle groups T4 and T1 were mixed at a ratio of 44.5:55.5 (a=0.445) for scattering particles, thereby determining the intensity distributions of blue light, green light and red light, and the distributions of the chromaticities x and y, and the color differences Δx and Δy.

Figure 18A:
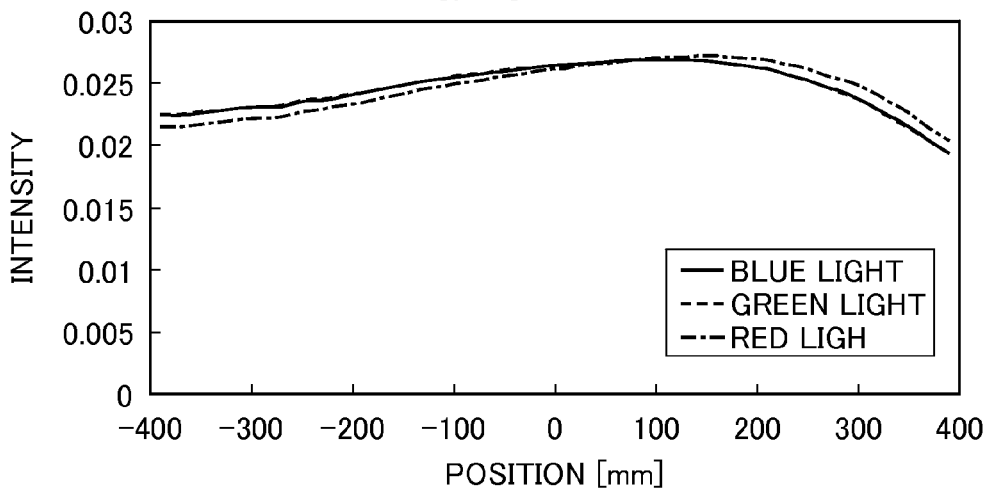
FIG. 18A is a graph showing measurement results of the intensity distributions of outgoing light.
Figure 18B:
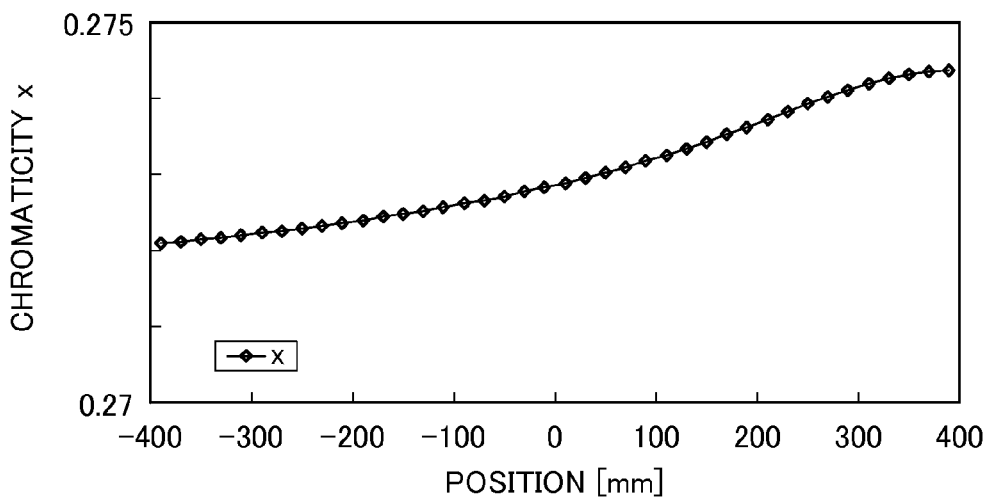
FIGS. 18B and 18C are graphs each showing measurement results of the chromaticity distribution of outgoing light.
Figure 18C:
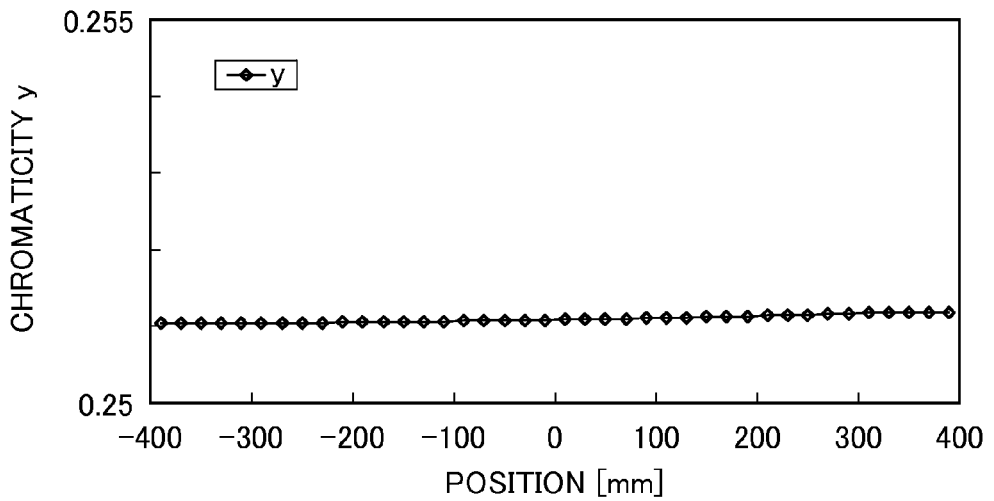

The results are shown in FIGS. 18A to 18C.

The color differences Δx and Δy were 0.0023 and 0.0001, respectively.

In Example 2-3, Example 2-1 was repeated except that the particle groups T4 and T1 were mixed at a ratio of 45:55 (a=0.45) for scattering particles, thereby determining the intensity distributions of blue light, green light and red light, and the distributions of the chromaticities x and y, and the color differences Δx and Δy.

The results are shown in FIGS. 19A to 19C.

The color differences Δx and Δy were 0.0027 and 0.0007, respectively.

In Example 2-4, Example 2-1 was repeated except that the particle groups T4 and T1 were mixed at a ratio of 50:50 (a=0.5) for scattering particles, thereby determining the intensity distributions of blue light, green light and red light, and the distributions of the chromaticities x and y, and the color differences Δx and Δy.

The results are shown in FIGS. 20A to 20C.

The color differences Δx and Δy were 0.0069 and 0.0060, respectively.

Example 3

In Example 3, the particle groups T1 and T3 were mixed and used as scattering particles.

In Example 3-1, Example 2-1 was repeated except that the particle groups T3 and T1 were mixed at a ratio of 35:65 (a=0.35) for scattering particles, thereby determining the intensity distributions of blue light, green light and red light, and the distributions of the chromaticities x and y, and the color differences Δx and Δy.

Figure 21A:
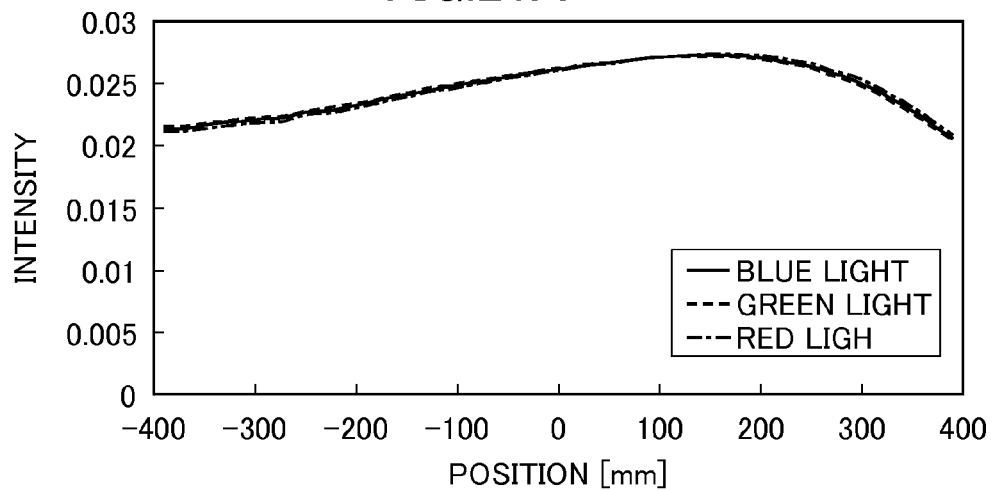
FIG. 21A is a graph showing measurement results of the intensity distributions of outgoing light.
Figure 21B:
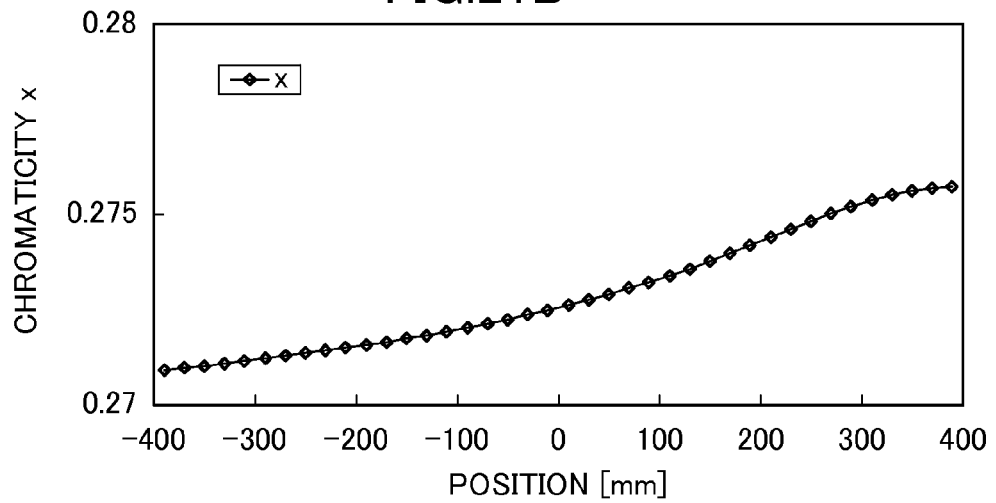
FIGS. 21B and 21C are graphs each showing measurement results of the chromaticity distribution of outgoing light.
Figure 21C:
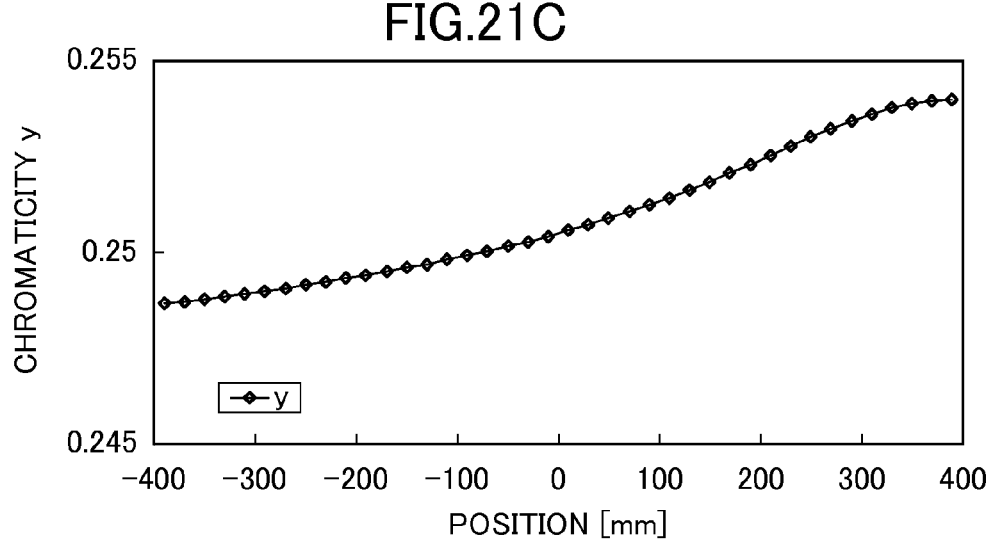

The results are shown in FIGS. 21A to 21C.

The color differences Δx and Δy were 0.0048 and 0.0053, respectively.

In Example 3-2, Example 3-1 was repeated except that the particle groups T3 and T1 were mixed at a ratio of 36.5:63.5 (a=0.365) for scattering particles, thereby determining the intensity distributions of blue light, green light and red light, and the distributions of the chromaticities x and y, and the color differences Δx and Δy.

Figure 22A:
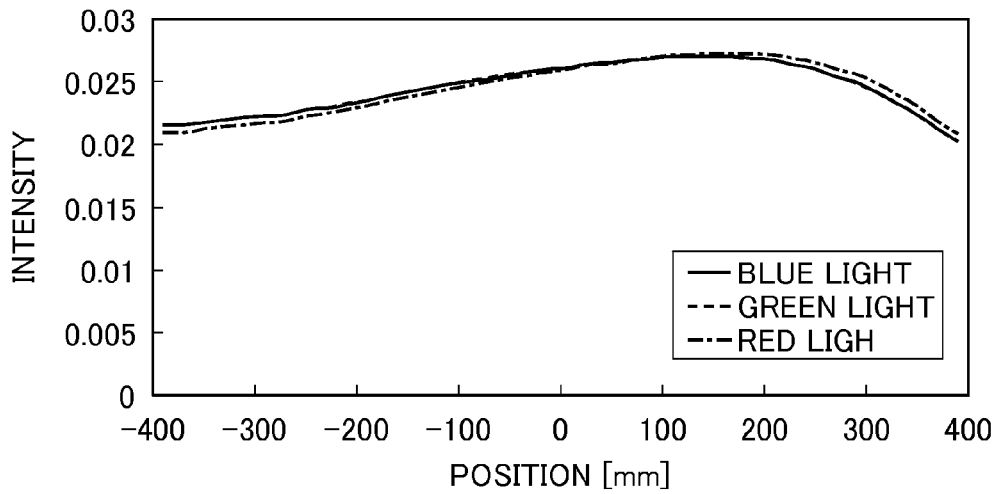
FIG. 22A is a graph showing measurement results of the intensity distributions of outgoing light.
Figure 22B:
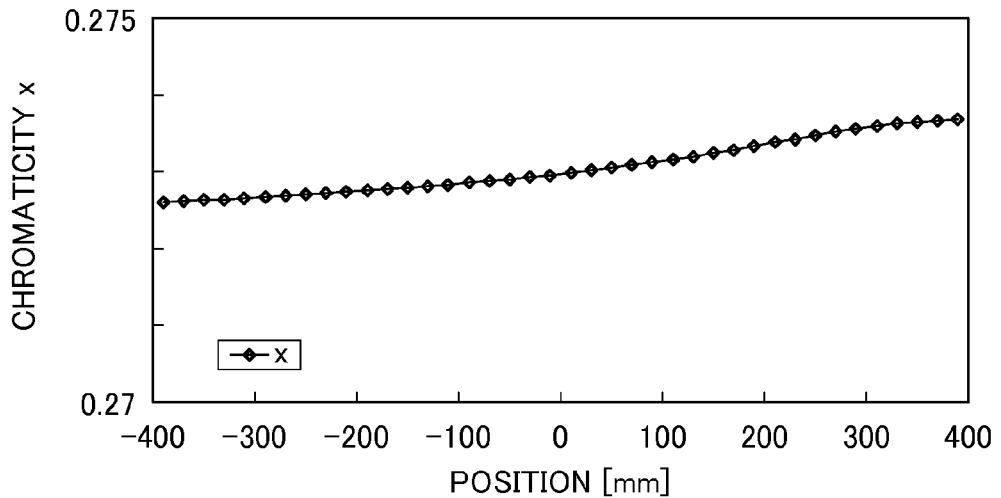
FIGS. 22B and 22C are graphs each showing measurement results of the chromaticity distribution of outgoing light.
Figure 22C:
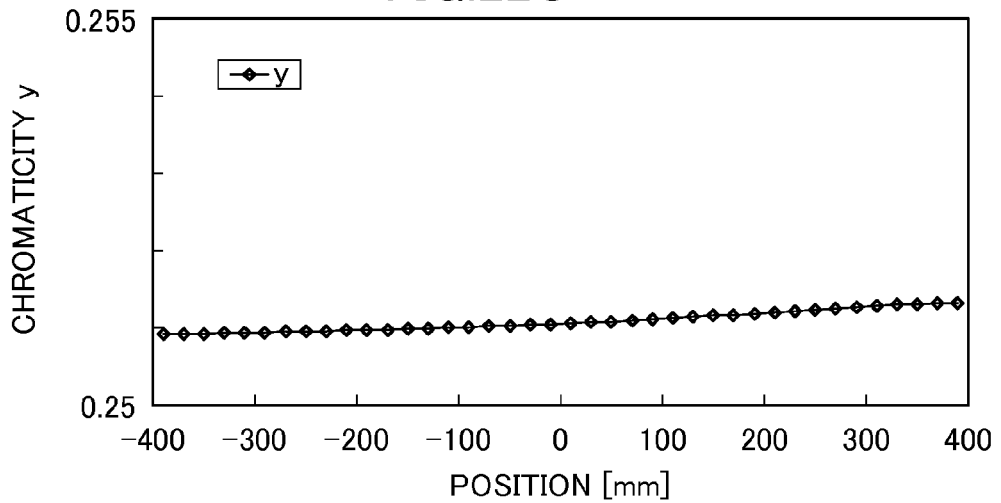

The results are shown in FIGS. 22A to 22C.

The color differences Δx and Δy were 0.0011 and 0.0004, respectively.

In Example 3-3, Example 3-1 was repeated except that the particle groups T3 and T1 were mixed at a ratio of 40:60 (a=0.4) for scattering particles, thereby determining the intensity distributions of blue light, green light and red light, and the distributions of the chromaticities x and y, and the color differences Δx and Δy.

Figure 23A:
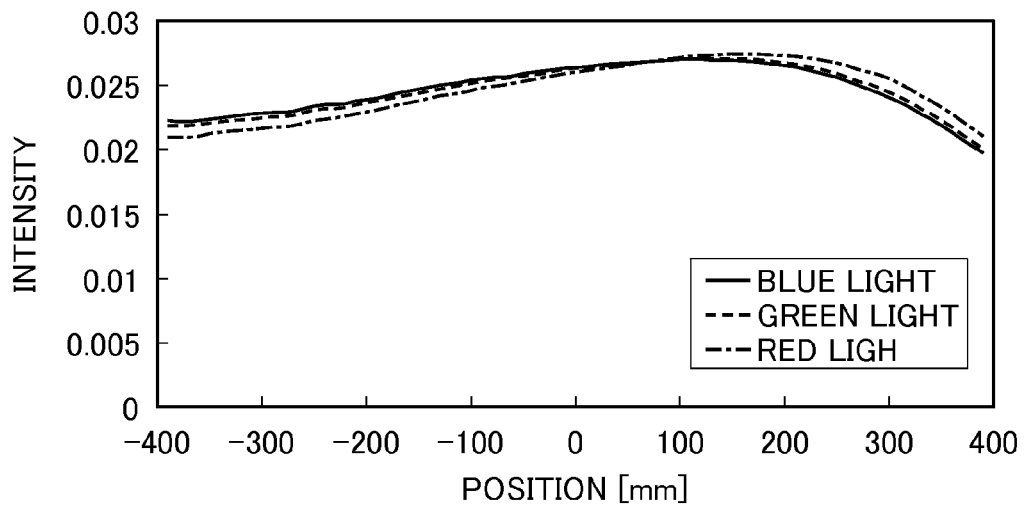
FIG. 23A is a graph showing measurement results of the intensity distributions of outgoing light.
Figure 23B:
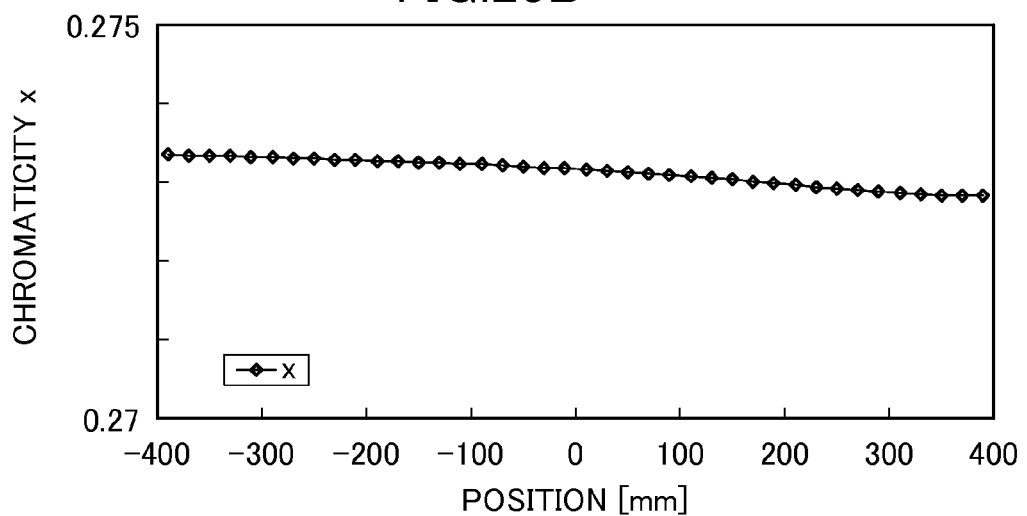
FIGS. 23B and 23C are graphs each showing measurement results of the chromaticity distribution of outgoing light.
Figure 23C:
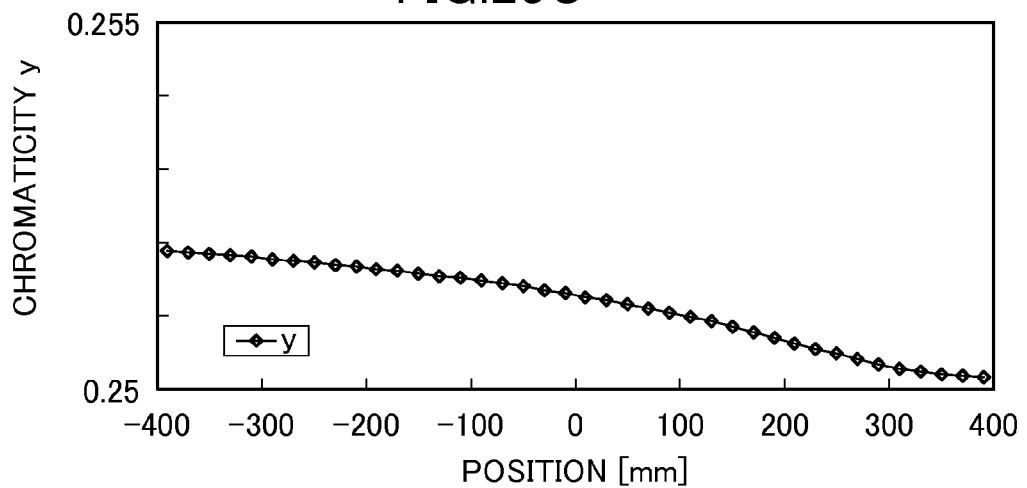

The results are shown in FIGS. 23A to 23C.

The color differences Δx and Δy were 0.0006 and 0.0017, respectively.

Example 4

In Example 4, the particle groups T1 and T2 were mixed and used as scattering particles.

In Example 4-1, Example 2-1 was repeated except that the particle groups T2 and T1 were mixed at a ratio of 30:70 (a=0.3) for scattering particles, thereby determining the intensity distributions of blue light, green light and red light, and the distributions of the chromaticities x and y, and the color differences Δx and Δy.

Figure 24A:
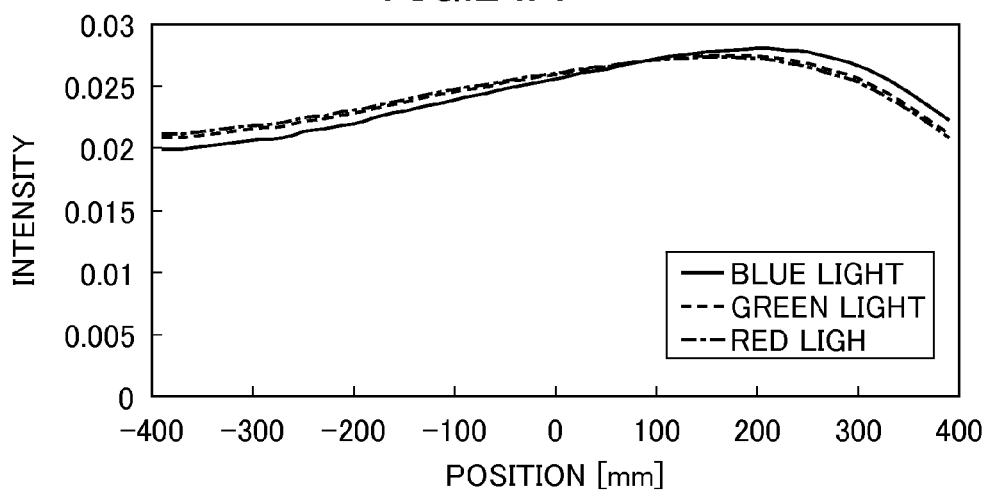
FIG. 24A is a graph showing measurement results of the intensity distributions of outgoing light.
Figure 24B:
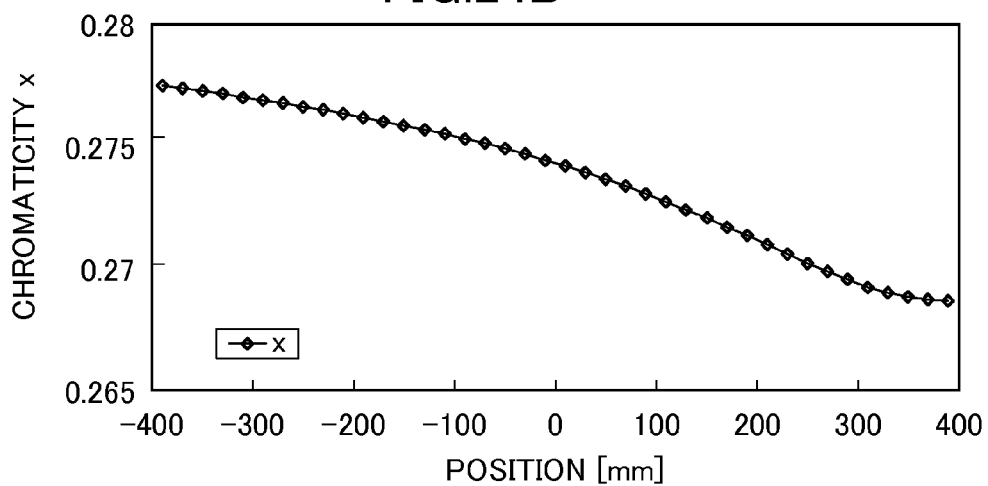
FIGS. 24B and 24C are graphs each showing measurement results of the chromaticity distribution of outgoing light.
Figure 24C:
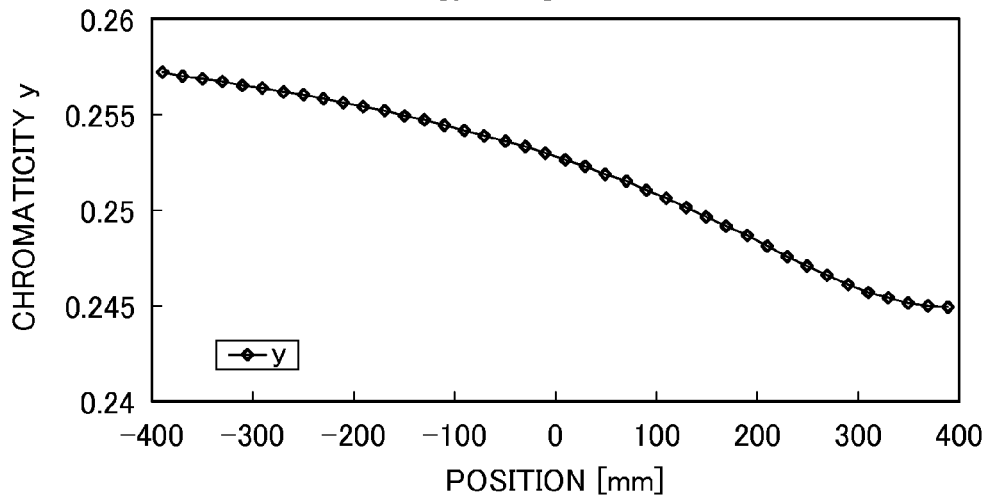

The results are shown in FIGS. 24A to 24C.

The color differences Δx and Δy were 0.0088 and 0.012, respectively.

In Example 4-2, Example 4-1 was repeated except that the particle groups T2 and T1 were mixed at a ratio of 39:61 (a=0.39) for scattering particles, thereby determining the intensity distributions of blue light, green light and red light, and the distributions of the chromaticities x and y, and the color differences Δx and Δy.

Figure 25A:
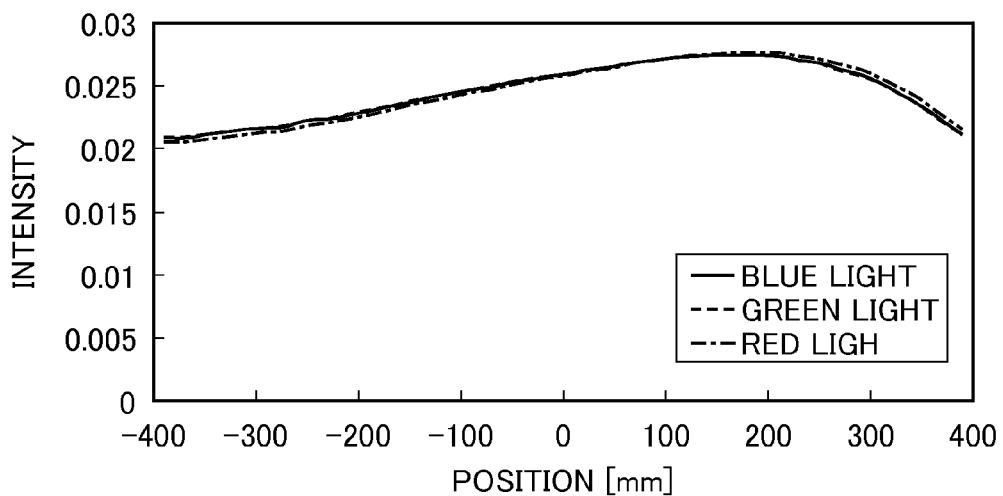
FIG. 25A is a graph showing measurement results of the intensity distributions of outgoing light.
Figure 25B:
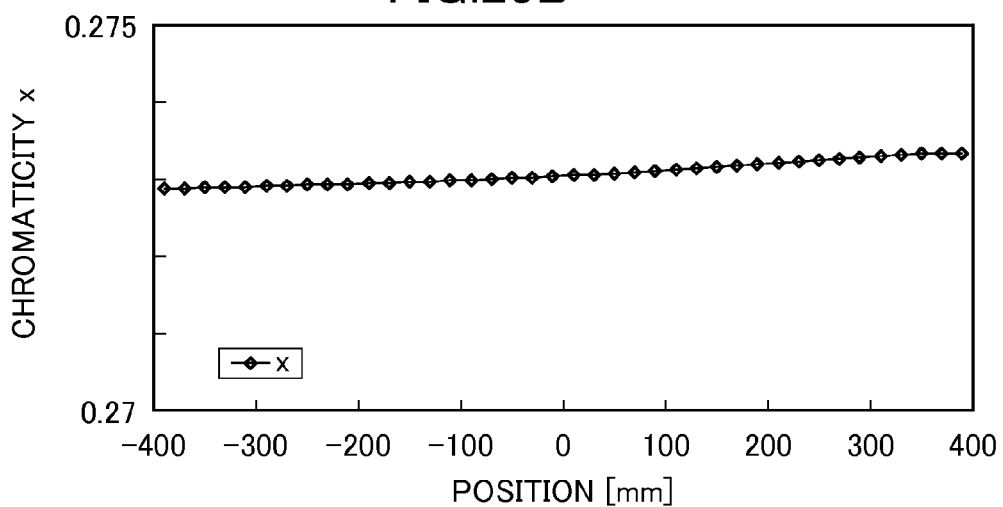
FIGS. 25B and 25C are graphs each showing measurement results of the chromaticity distribution of outgoing light.
Figure 25C:
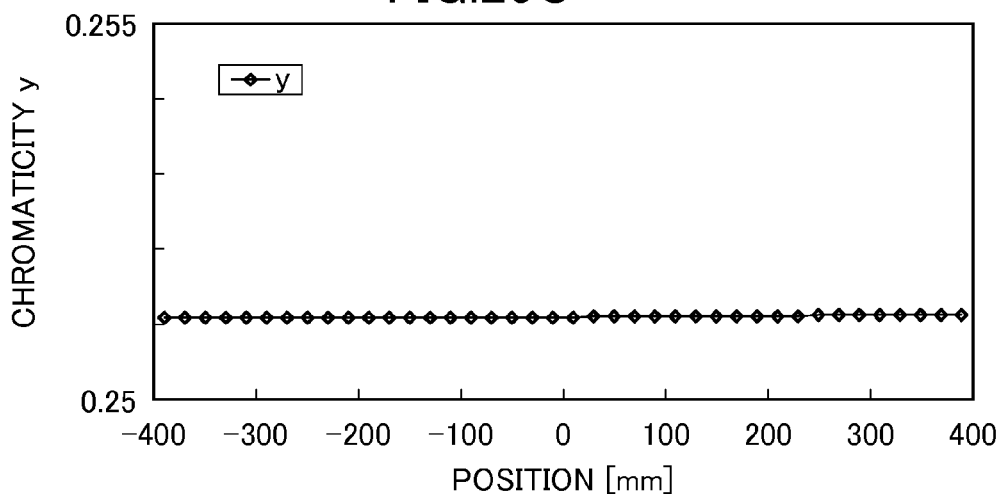

The results are shown in FIGS. 25A to 25C.

The color differences Δx and Δy were 0.0004 and 0.00004, respectively.

In Example 4-3, Example 4-1 was repeated except that the particle groups T2 and T1 were mixed at a ratio of 40:60 (a=0.4) for scattering particles, thereby determining the intensity distributions of blue light, green light and red light, and the distributions of the chromaticities x and y, and the color differences Δx and Δy.

Figure 26A:
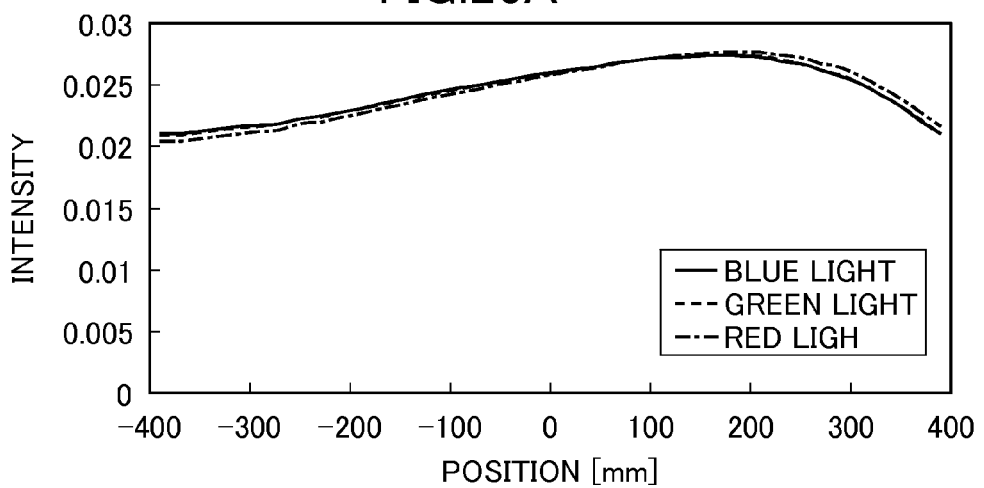
FIG. 26A is a graph showing measurement results of the intensity distributions of outgoing light.
Figure 26B:
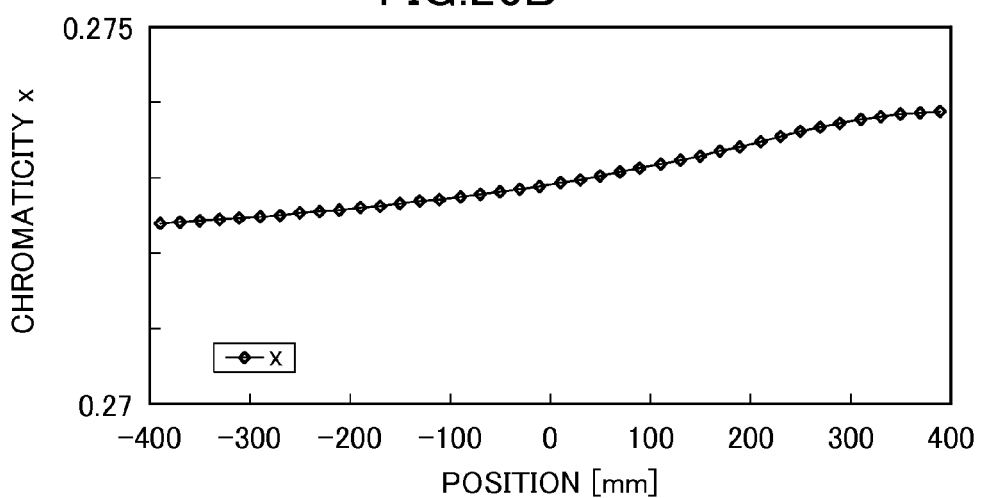
FIGS. 26B and 26C are graphs each showing measurement results of the chromaticity distribution of outgoing light.
Figure 26C:
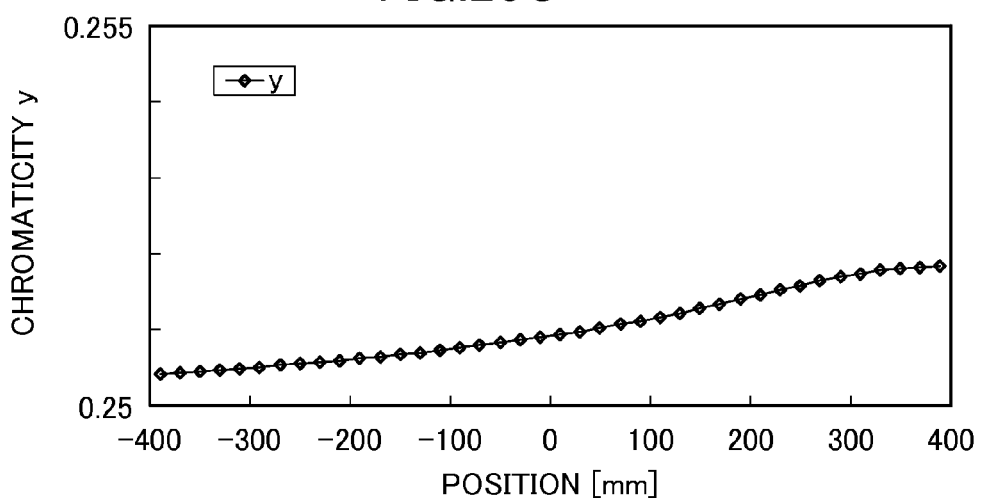

The results are shown in FIGS. 26A to 26C.

The color differences Δx and Δy were 0.0015 and 0.0014, respectively.

Comparative Example 1

Scattering particles with a single particle size were used in Comparative Example 1.

In Comparative Example 1-1, Example 1-1 was repeated except that scattering particles with a single particle size of 7 μm were used, thereby determining the distributions of the chromaticities x and y, and the color differences Δx and Δy. The intensity distributions of blue light, green light and red light are as shown in FIG. 6A.

Figure 27A:
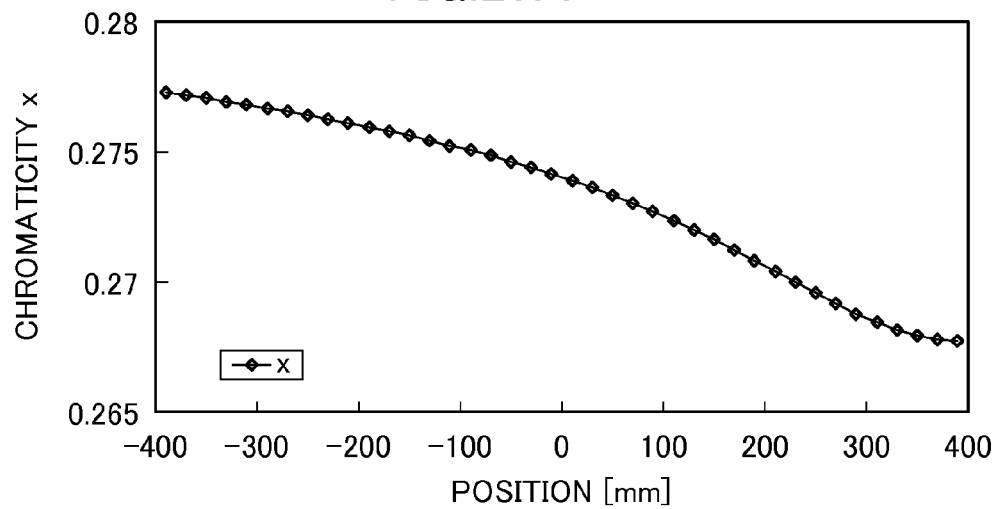
FIGS. 27A and 27B are graphs each showing measurement results of the chromaticity distribution of outgoing light.
Figure 27B:
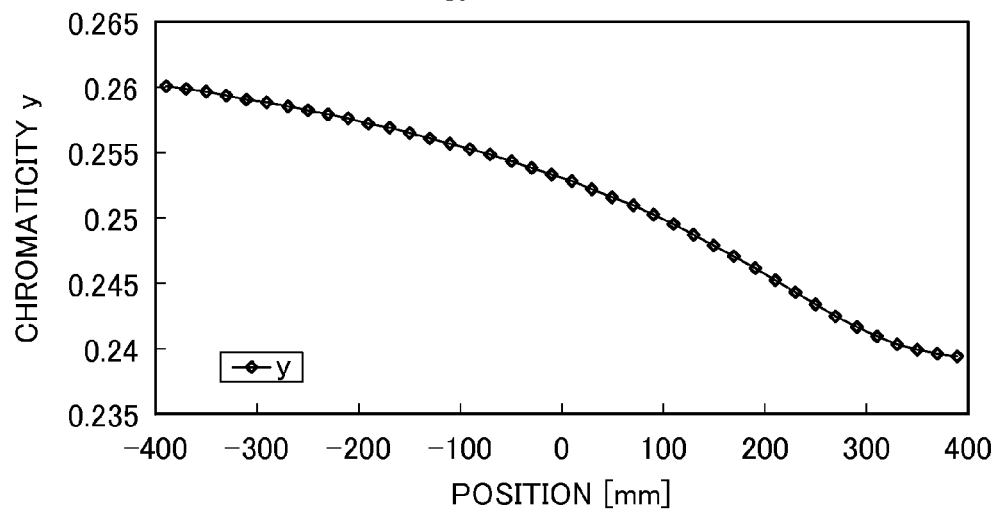

The results are shown in FIGS. 27A and 27B.

The color differences Δx and Δy were 0.010 and 0.021, respectively.

In Comparative Example 1-2, Comparative Example 1-1 was repeated except that scattering particles with a single particle size of 4.5 μm were used, thereby determining the distributions of the chromaticities x and y, and the color differences Δx and Δy. The intensity distributions of blue light, green light and red light are as shown in FIG. 6B.

Figure 28A:
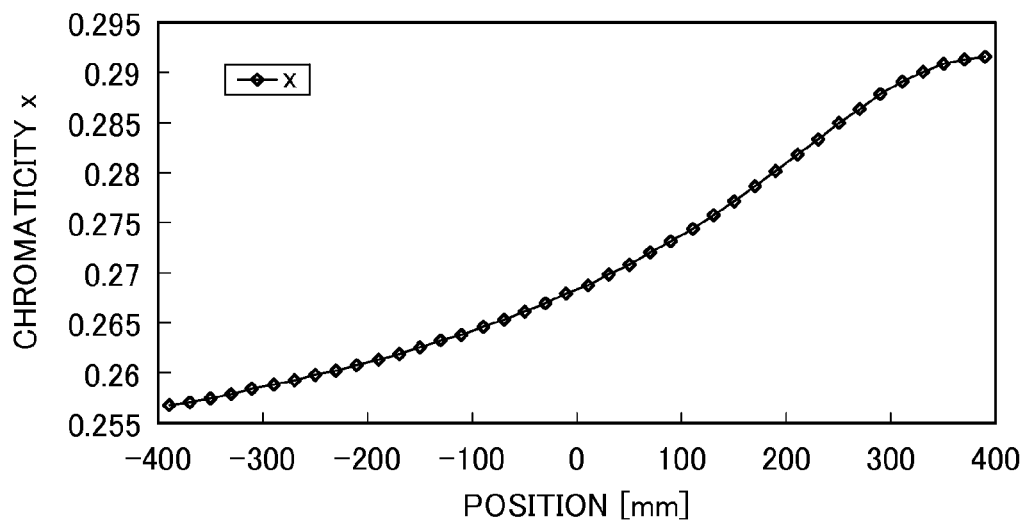
FIGS. 28A and 28B are graphs each showing measurement results of the chromaticity distribution of outgoing light.
Figure 28B:
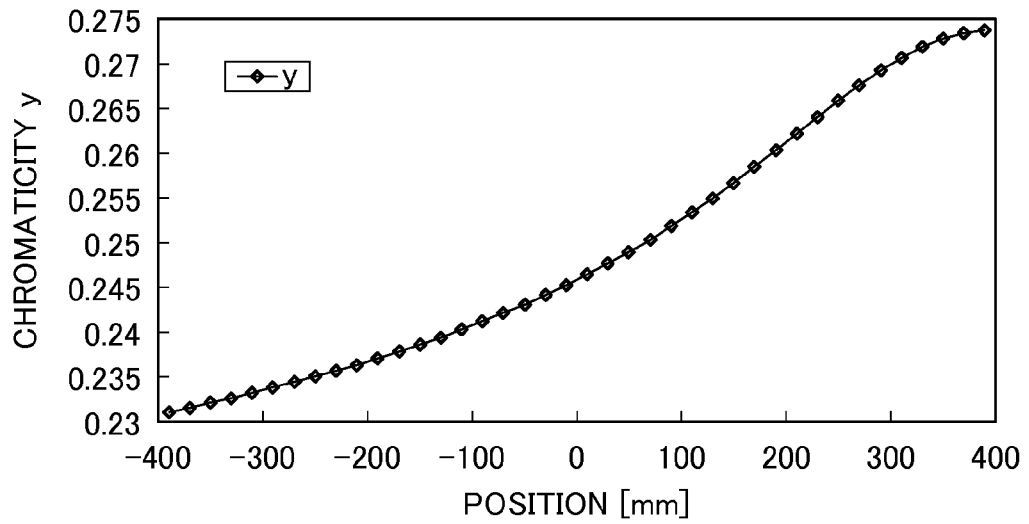

The results are shown in FIGS. 28A and 28B.

The color differences Δx and Δy were 0.035 and 0.043, respectively.

In Comparative Example 1-3, Comparative Example 1-1 was repeated except that scattering particles with a single particle size of 10 μm were used, thereby determining the distributions of the chromaticities x and y, and the color differences Δx and Δy. The intensity distributions of blue light, green light and red light are as shown in FIG. 6C.

Figure 29A:
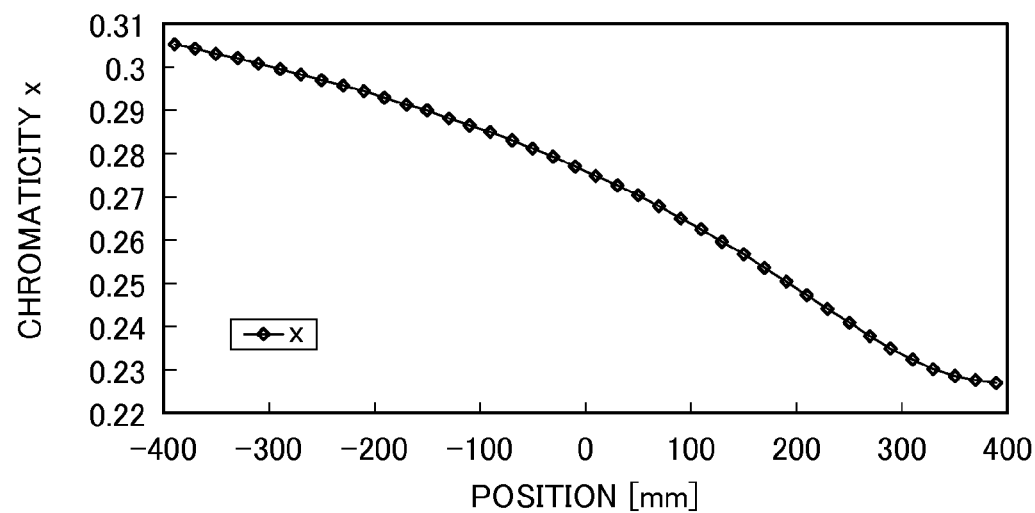
FIGS. 29A and 29B are graphs each showing measurement results of the chromaticity distribution of outgoing light.
Figure 29B:
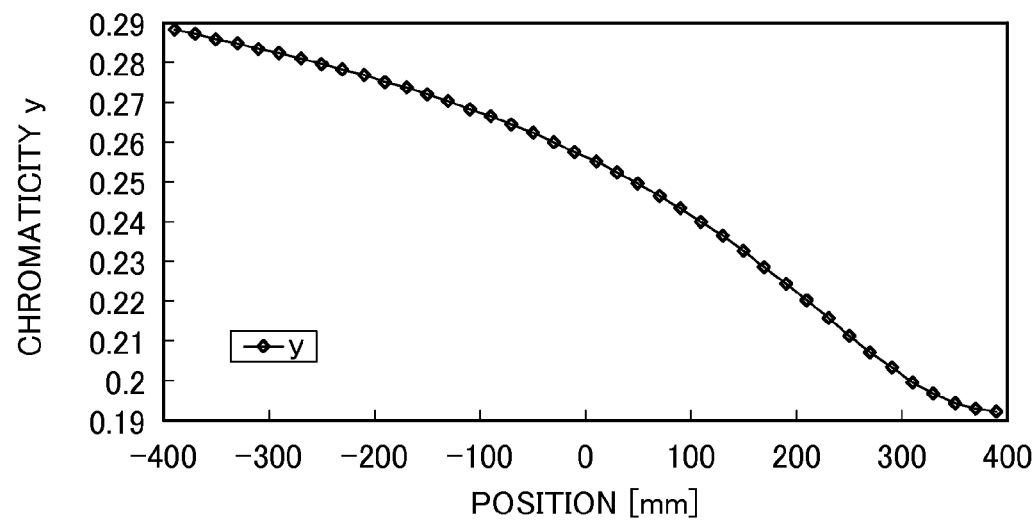

The results are shown in FIGS. 29A and 29B.

The color differences Δx and Δy were 0.078 and 0.096, respectively.

Comparative Example 2

Monodisperse scattering particles were used in Comparative Example 2.

In Comparative Example 2-1, Example 1-1 was repeated except that scattering particles of the particle group T1 were used, thereby determining the intensity distributions of blue light, green light and red light, and the distributions of the chromaticities x and y, and the color differences Δx and Δy.

Figure 30A:
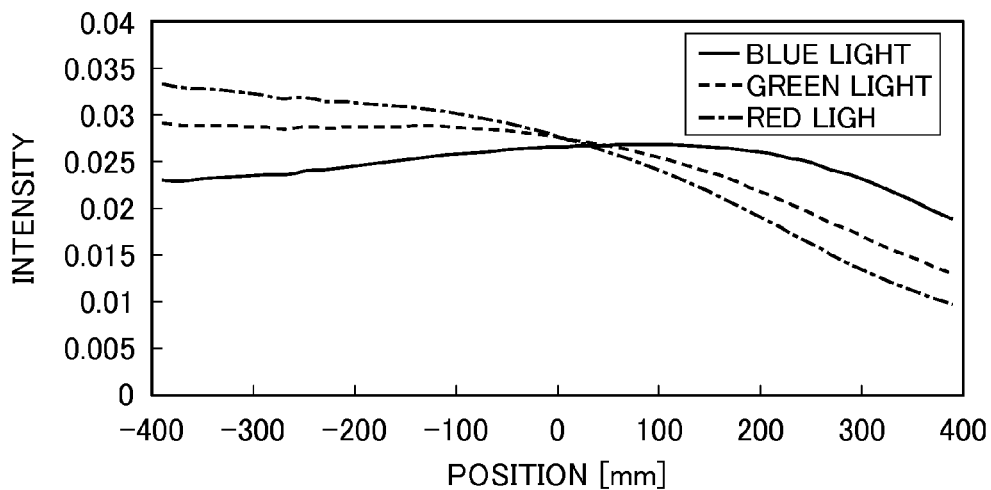
FIG. 30A is a graph showing measurement results of the intensity distributions of outgoing light.
Figure 30B:
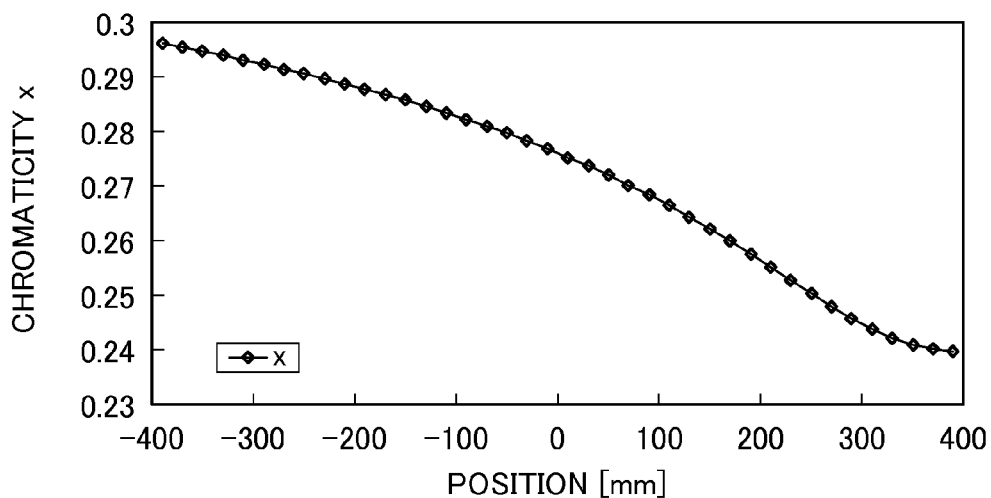
FIGS. 30B and 30C are graphs each showing measurement results of the chromaticity distribution of outgoing light.
Figure 30C:
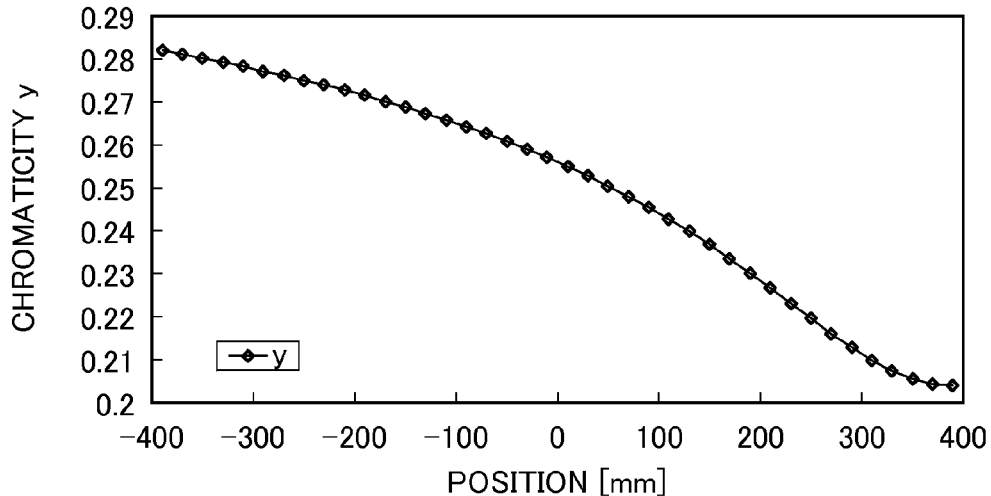

The results are shown in FIGS. 30A to 30C.

The color differences Δx and Δy were 0.056 and 0.078, respectively.

In Comparative Example 2-2, Comparative Example 2-1 was repeated except that scattering particles of the particle group T2 were used, thereby determining the intensity distributions of blue light, green light and red light, and the distributions of the chromaticities x and y, and the color differences Δx and Δy.

The results are shown in FIGS. 31A to 31C.

The color differences Δx and Δy were 0.044 and 0.061, respectively.

In Comparative Example 2-3, Comparative Example 2-1 was repeated except that scattering particles of the particle group T3 were used, thereby determining the intensity distributions of blue light, green light and red light, and the distributions of the chromaticities x and y, and the color differences Δx and Δy.

The results are shown in FIGS. 32A to 32C.

The color differences Δx and Δy were 0.044 and 0.059, respectively.

In Comparative Example 2-4, Comparative Example 2-1 was repeated except that scattering particles of the particle group T4 were used, thereby determining the intensity distributions of blue light, green light and red light, and the distributions of the chromaticities x and y, and the color differences Δx and Δy.

Figure 33A:
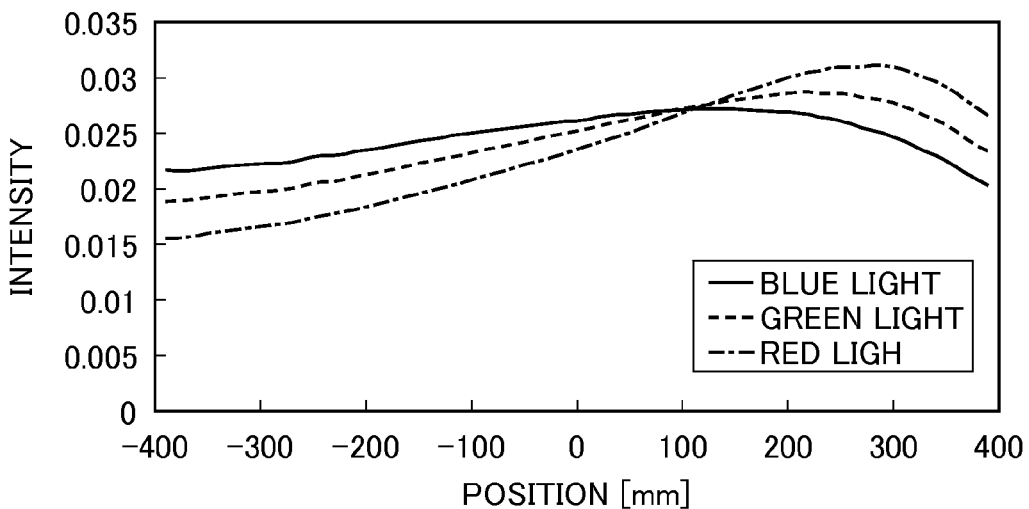
FIG. 33A is a graph showing measurement results of the intensity distributions of outgoing light.
Figure 33B:
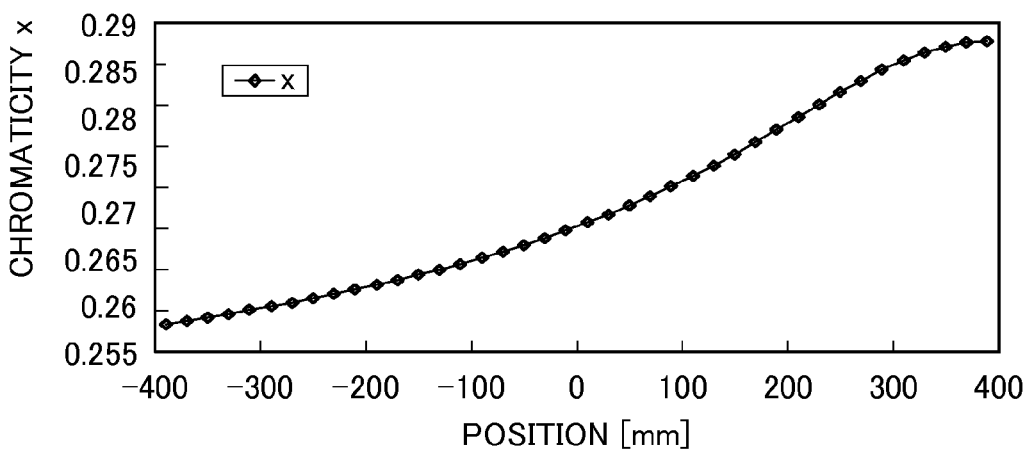
FIGS. 33B and 33C are graphs each showing measurement results of the chromaticity distribution of outgoing light.
Figure 33C:
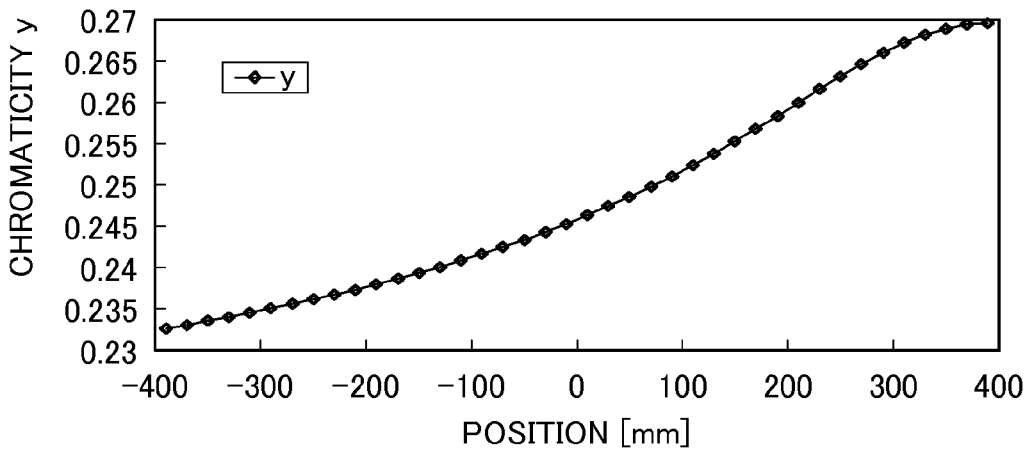

The results are shown in FIGS. 33A to 33C.

The color differences Δx and Δy were 0.030 and 0.037, respectively.

The results in Examples 1 to 4 reveal that, by mixing a particle group having an average particle size of less than 7 μm with a particle group having an average particle size of more than 7 μm at a predetermined ratio, scattering particles form a particle size distribution which has a first local maximum value at the particle size of less than 7 μm and a second local maximum value at the particle size of more than 7 μm, and hence the ease of scattering depending on the wavelengths can be made uniform. It is also revealed that even in a large-sized light guide plate, the ratio of the quantities of outgoing light based on the wavelength can be thereby made constant to decrease the color differences Δx and Δy of outgoing light from the light exit surface 30a, thus reducing the color unevenness.

It is particularly revealed that in Examples in which the ratio a of the volume of a particle group having an average particle size of less than 7 μm to the volume of all the scattering particles is in a range of 0.3≤a≤0.5 (except Example 1-5), the color differences Δx and Δy are both suitably as small as 0.02 or less. It is further revealed that in Examples in which the ratio a is in a range of 0.35≤a≤0.45 (except Examples 1-4, 1-5 and 4-1), the color differences Δx and Δy are both more suitably as significantly small as 0.01 or less.

Example 5

In Example 5, the backlight unit 126 shown in FIG. 9A was used and the particle size distribution of scattering particles to be kneaded and dispersed in the light guide plate 120 was variously changed to determine the intensity distributions of outgoing light as well as the chromaticity distributions and the color differences by the same simulation as in Example 1.

In Example 5, Example 1 was repeated except that the shape of the light guide plate 120 (shape of the interface z) and the number of light sources were different.

In Example 5-1, the maximum thickness of the second layer 62 was set to 0.8 mm; the minimum thickness of the second layer 62 to 0.16 mm; and the distance from the light incidence surface to the position of the minimum thickness to 30 mm.

As for the shape of the interface z, the radius of curvature of the concave curved surface on the side closer to the light incidence surface was set to 45,000 mm and the radius of curvature of the convex curved surface at the central portion to 260,000 mm.

A particle group having a single particle size of 4.5 μm was mixed with a particle group having a single particle size of 10 μm at a ratio of 35:65 (a=0.35) and the mixture was used as scattering particles to be kneaded and dispersed inside.

As for the concentration of the scattering particles, the concentration Npo in the first layer 60 was set to 0.008 wt % and the concentration Npr in the second layer 62 to 0.22 wt %.

Figure 34A:
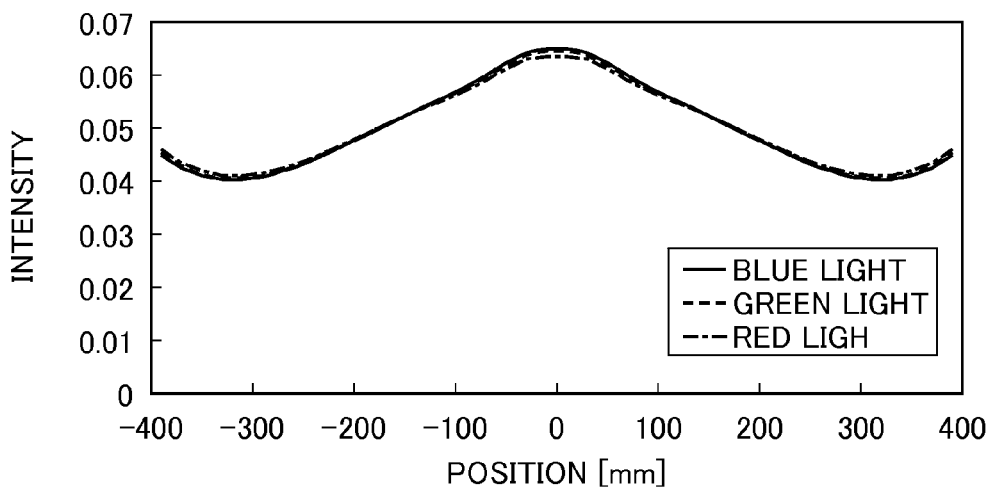
FIG. 34A is a graph showing measurement results of the intensity distributions of outgoing light.
Figure 34B:
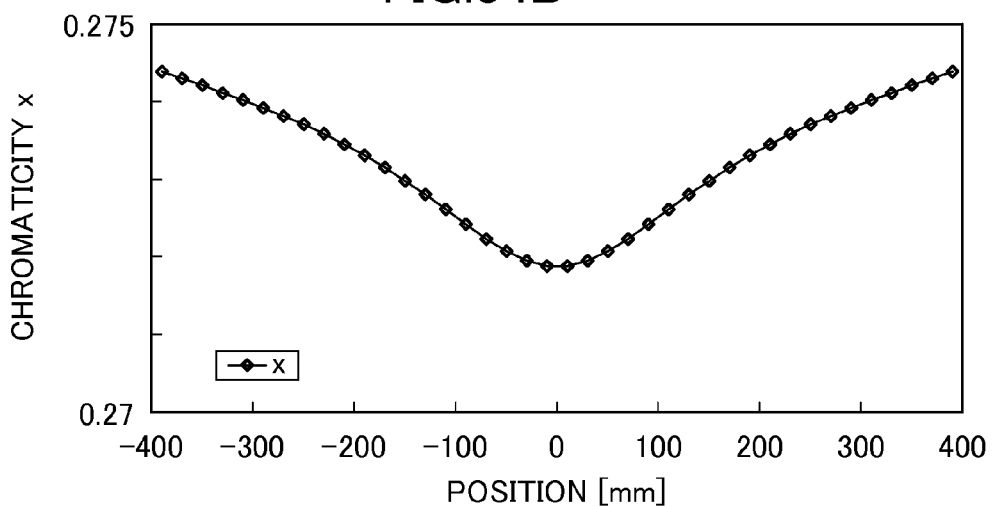
FIGS. 34B and 34C are graphs each showing measurement results of the chromaticity distribution of outgoing light.
Figure 34C:
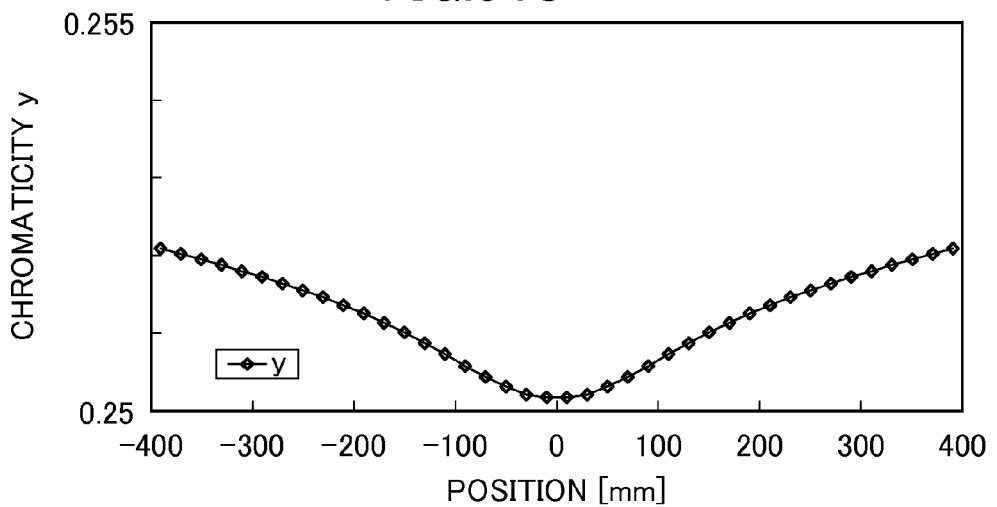

The results of the intensity distributions of blue light, green light and red light, and the distributions of the chromaticities x and y, and the color differences Δx and Δy are shown in FIGS. 34A to 34C.

The color differences Δx and Δy were 0.0025 and 0.0019, respectively.

In Example 5-2, Example 5-1 was repeated except that the particle group with the single particle size of 4.5 μm and the particle group with the single particle size of 10 μm were mixed at a ratio of 37.5:62.5 (a=0.375) for scattering particles, thereby determining the intensity distributions of blue light, green light and red light, and the distributions of the chromaticities x and y, and the color differences Δx and Δy.

Figure 35A:
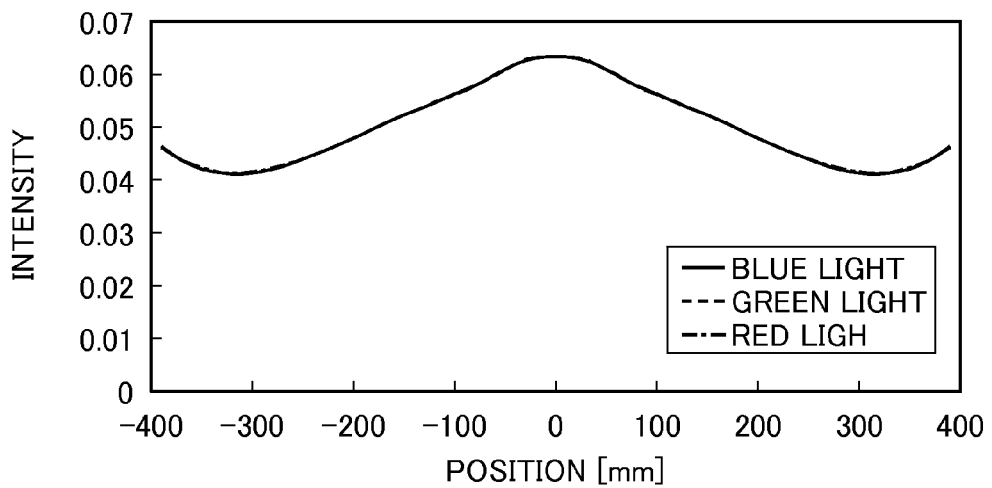
FIG. 35A is a graph showing measurement results of the intensity distributions of outgoing light.
Figure 35B:
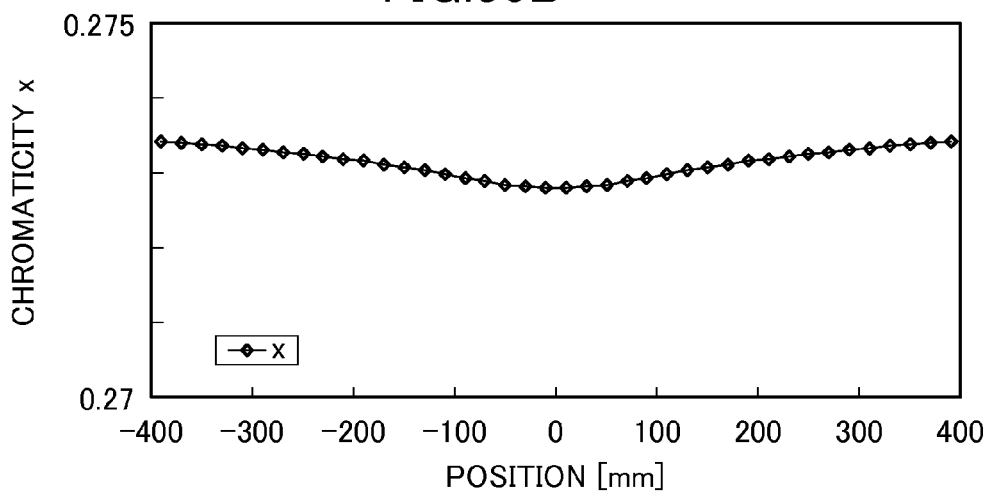
FIGS. 35B and 35C are graphs each showing measurement results of the chromaticity distribution of outgoing light.
Figure 35C:
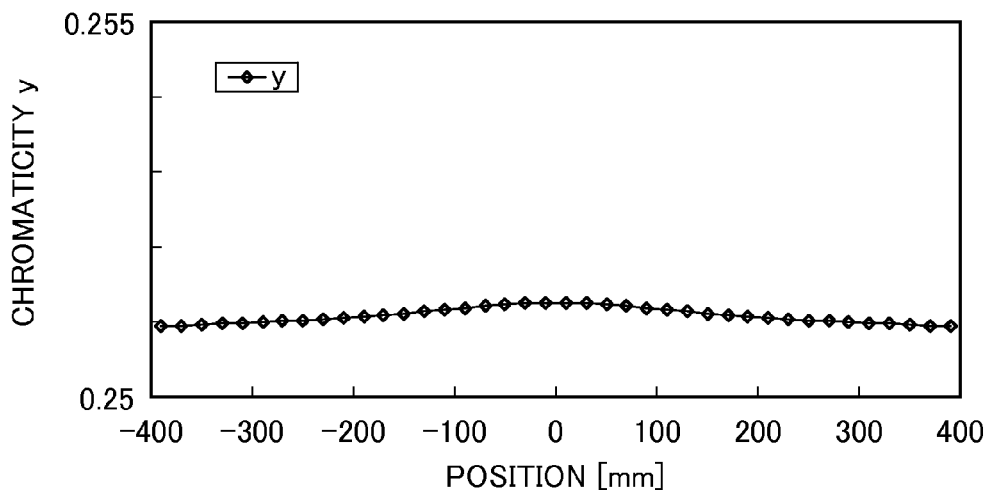

The results are shown in FIGS. 35A to 35C.

The color differences Δx and Δy were 0.0006 and 0.0003, respectively.

In Example 5-3, Example 5-1 was repeated except that the particle group with the single particle size of 4.5 μm and the particle group with the single particle size of 10 μm were mixed at a ratio of 40:60 (a=0.4) for scattering particles, thereby determining the intensity distributions of blue light, green light and red light, and the distributions of the chromaticities x and y, and the color differences Δx and Δy.

Figure 36A:
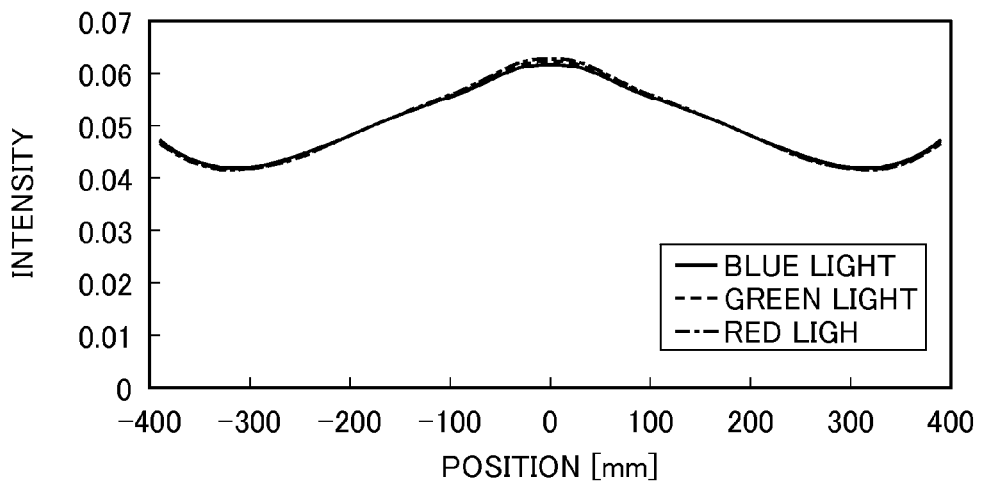
FIG. 36A is a graph showing measurement results of the intensity distributions of outgoing light.
Figure 36B:
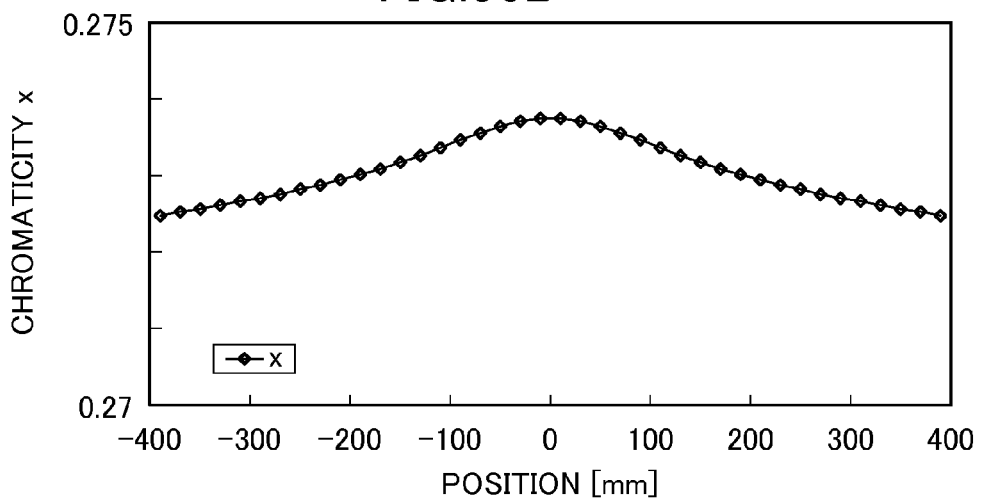
FIGS. 36B and 36C are graphs each showing measurement results of the chromaticity distribution of outgoing light.
Figure 36C:
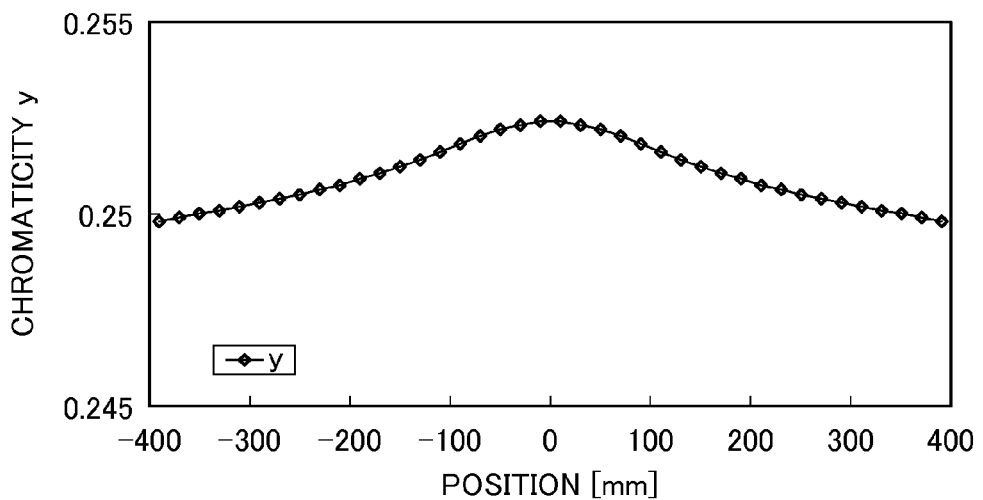

The results are shown in FIGS. 36A to 36C.

The color differences Δx and Δy were 0.0012 and 0.0026, respectively.

In Example 5-4, Example 5-1 was repeated except that the particle group with the single particle size of 4.5 μm and the particle group with the single particle size of 10 μm were mixed at a ratio of 50:50 (a=0.5) for scattering particles, thereby determining the intensity distributions of blue light, green light and red light, and the distributions of the chromaticities x and y, and the color differences Δx and Δy.

Figure 37A:
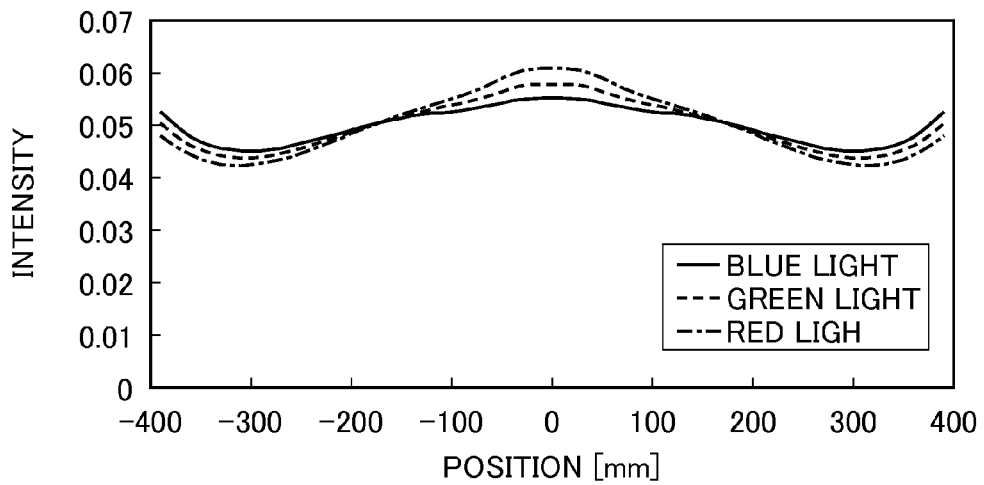
FIG. 37A is a graph showing measurement results of the intensity distributions of outgoing light.
Figure 37B:
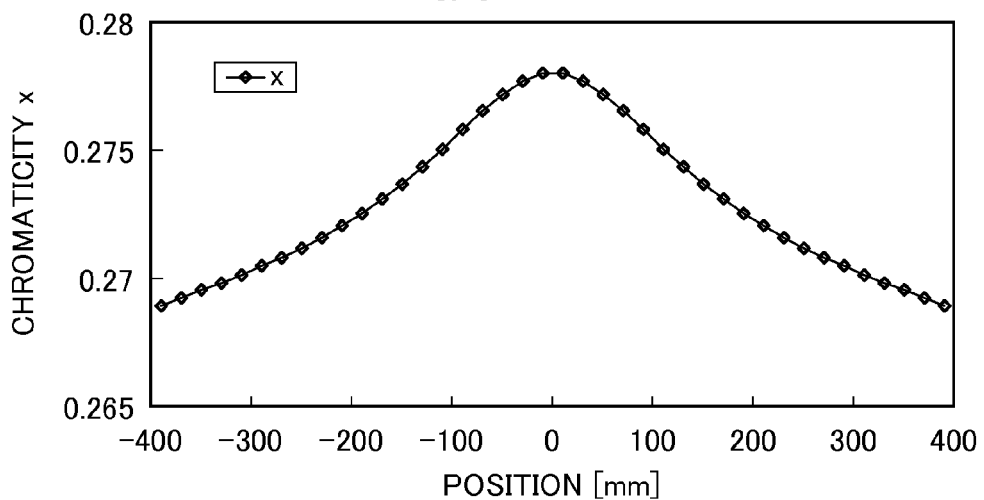
FIGS. 37B and 37C are graphs each showing measurement results of the chromaticity distribution of outgoing light.
Figure 37C:
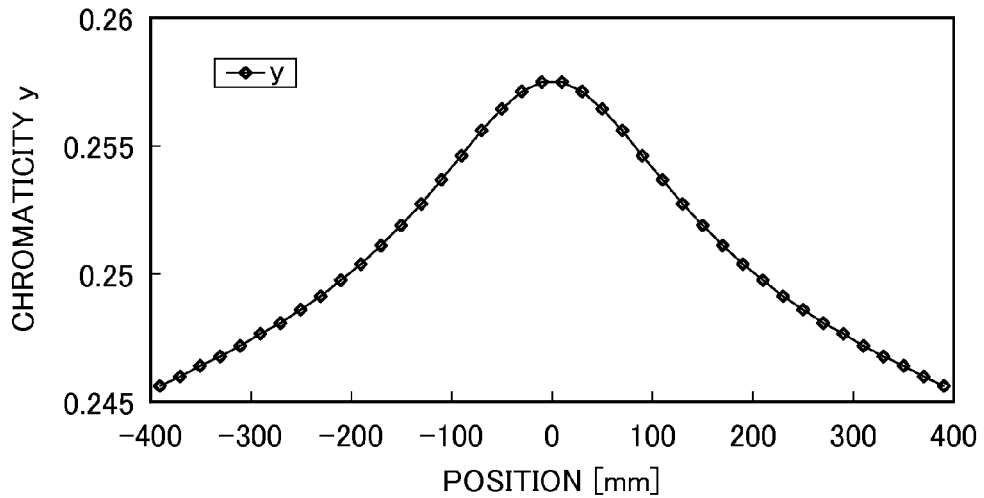

The results are shown in FIGS. 37A to 37C.

The color differences Δx and Δy were 0.0091 and 0.0119, respectively.

In Example 5-5, Example 5-1 was repeated except that the particle group with the single particle size of 4.5 μm and the particle group with the single particle size of 10 μm were mixed at a ratio of 60:40 (a=0.6) for scattering particles, thereby determining the intensity distributions of blue light, green light and red light, and the distributions of the chromaticities x and y, and the color differences Δx and Δy.

Figure 38A:
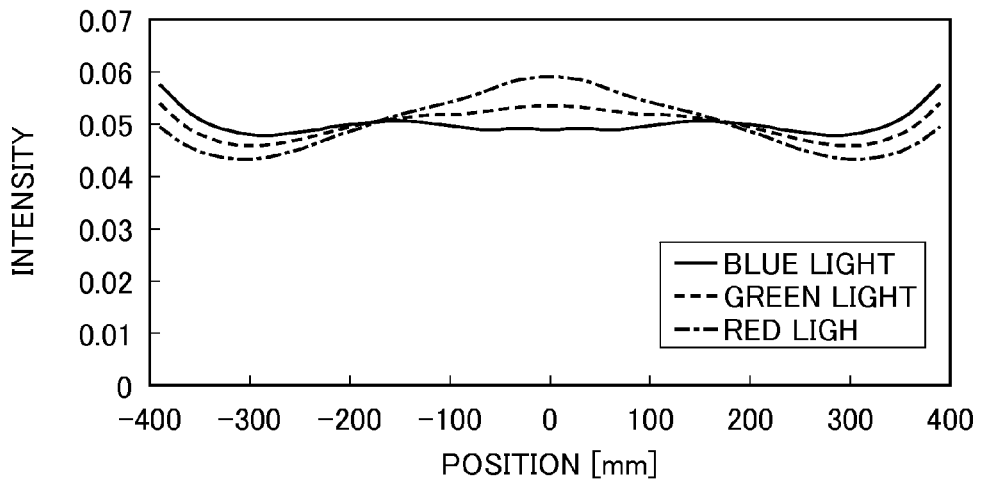
FIG. 38A is a graph showing measurement results of the intensity distributions of outgoing light.
Figure 38B:
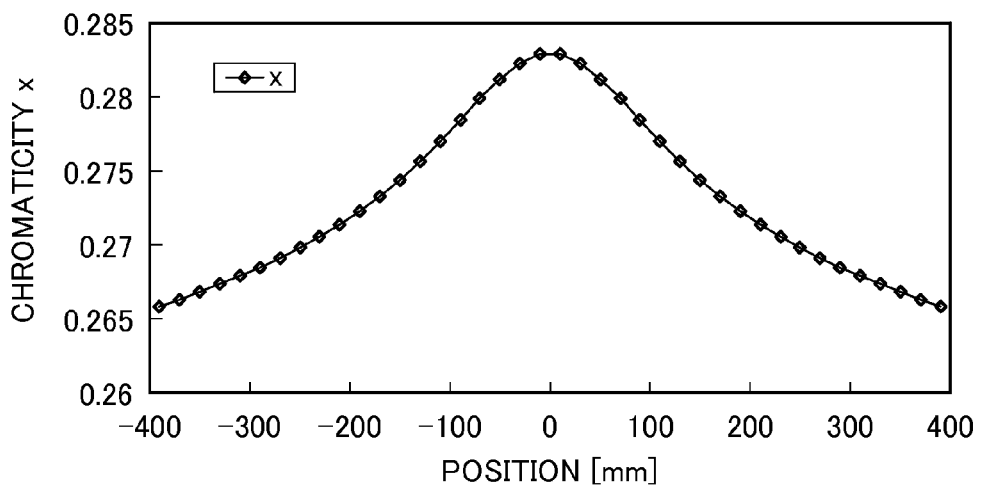
FIGS. 38B and 38C are graphs each showing measurement results of the chromaticity distribution of outgoing light.
Figure 38C:
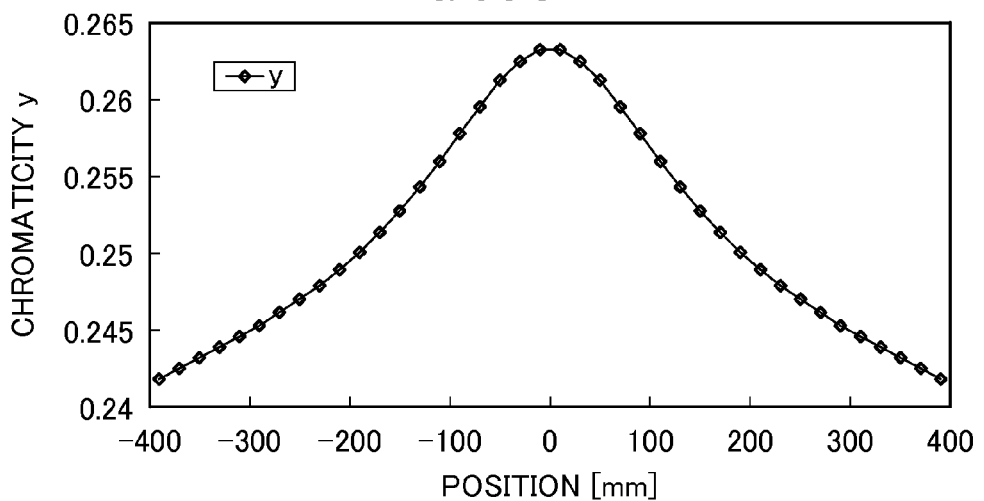

The results are shown in FIGS. 38A to 38C.

The color differences Δx and Δy were 0.017 and 0.021, respectively.

Example 6

Next, two monodisperse particle groups were mixed and used as scattering particles to determine the intensity distributions of outgoing light, the chromaticity distributions and the color differences.

In Example 6, the particle groups T1 and T4 were mixed and used as scattering particles.

In Example 6-1, Example 5-1 was repeated except that the particle groups T4 and T1 were mixed at a ratio of 40:60 (a=0.4) for scattering particles, thereby determining the intensity distributions of blue light, green light and red light, and the distributions of the chromaticities x and y, and the color differences Δx and Δy.

Figure 39A:
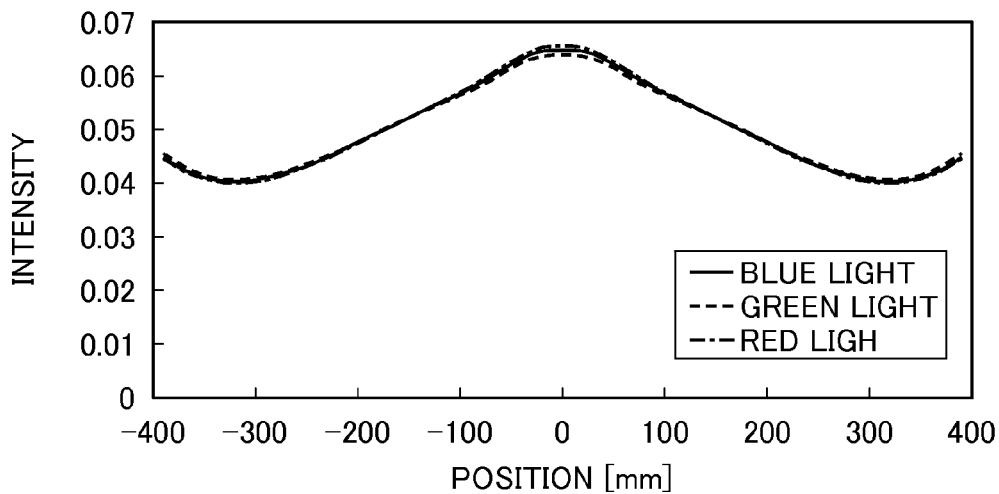
FIG. 39A is a graph showing measurement results of the intensity distributions of outgoing light.
Figure 39B:
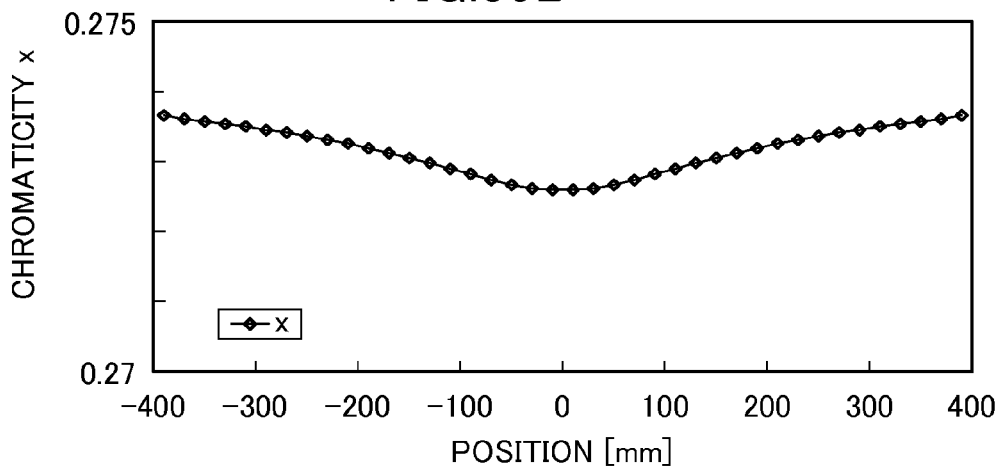
FIGS. 39B and 39C are graphs each showing measurement results of the chromaticity distribution of outgoing light.
Figure 39C:
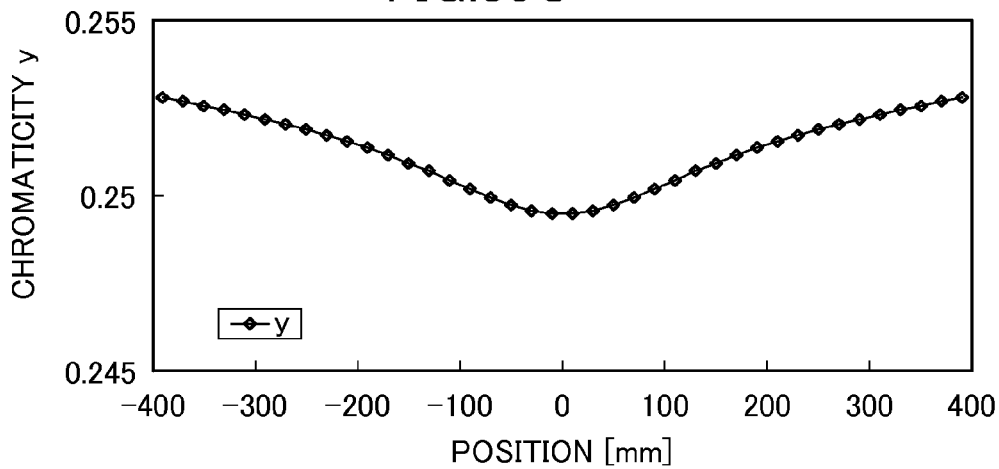

The results are shown in FIGS. 39A to 39C.

The color differences Δx and Δy were 0.0011 and 0.0033, respectively.

In Example 6-2, Example 6-1 was repeated except that the particle groups T4 and T1 were mixed at a ratio of 44.5:55.5 (a=0.445) for scattering particles, thereby determining the intensity distributions of blue light, green light and red light, and the distributions of the chromaticities x and y, and the color differences Δx and Δy.

Figure 40A:
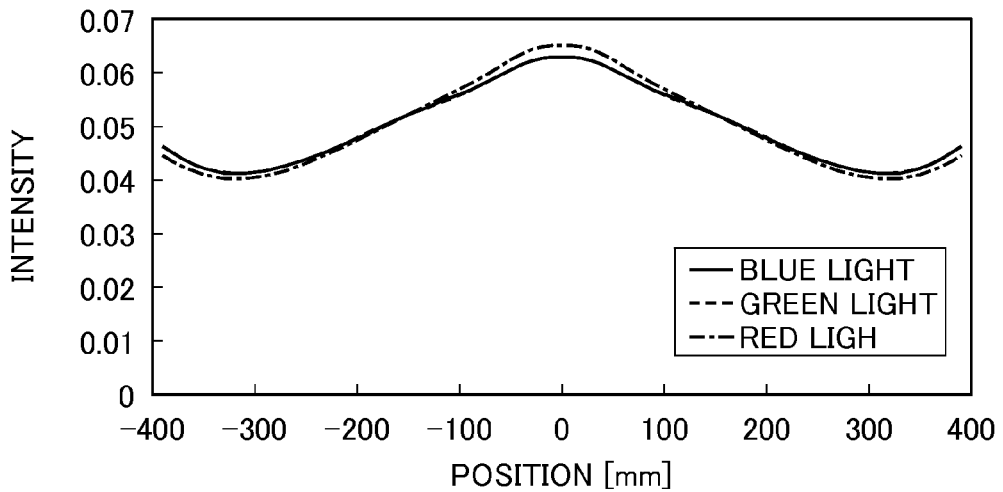
FIG. 40A is a graph showing measurement results of the intensity distributions of outgoing light.
Figure 40B:
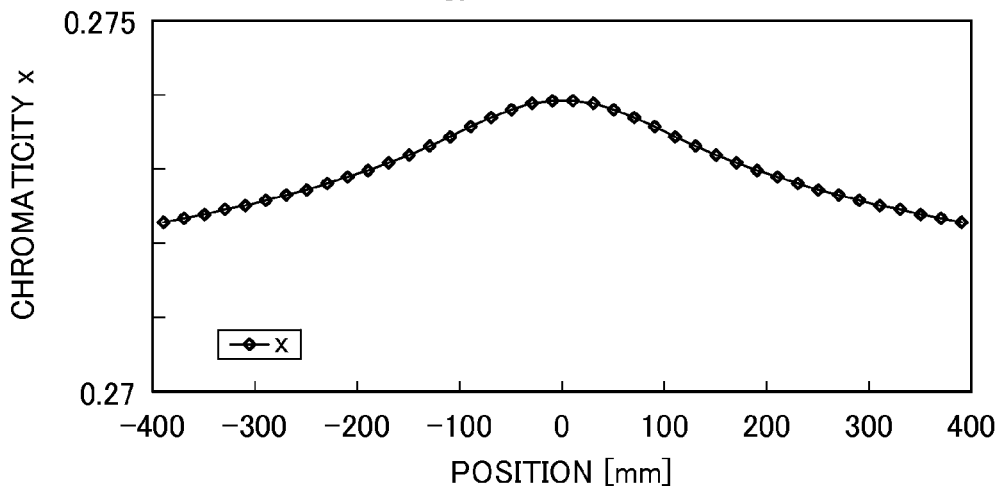
FIGS. 40B and 40C are graphs each showing measurement results of the chromaticity distribution of outgoing light.
Figure 40C:
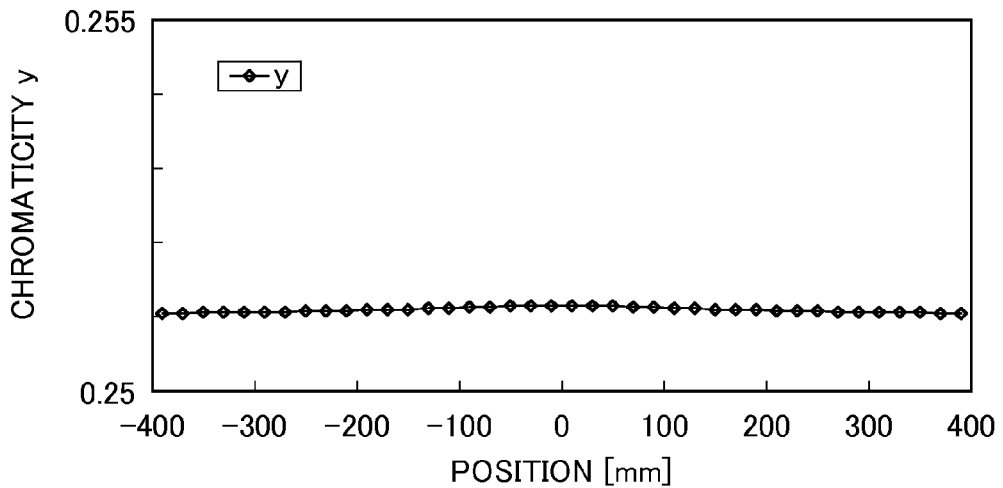

The results are shown in FIGS. 40A to 40C.

The color differences Δx and Δy were 0.0016 and 0.0001, respectively.

In Example 6-3, Example 6-1 was repeated except that the particle groups T4 and T1 were mixed at a ratio of 45:55 (a=0.45) for scattering particles, thereby determining the intensity distributions of blue light, green light and red light, and the distributions of the chromaticities x and y, and the color differences Δx and Δy.

Figure 41A:
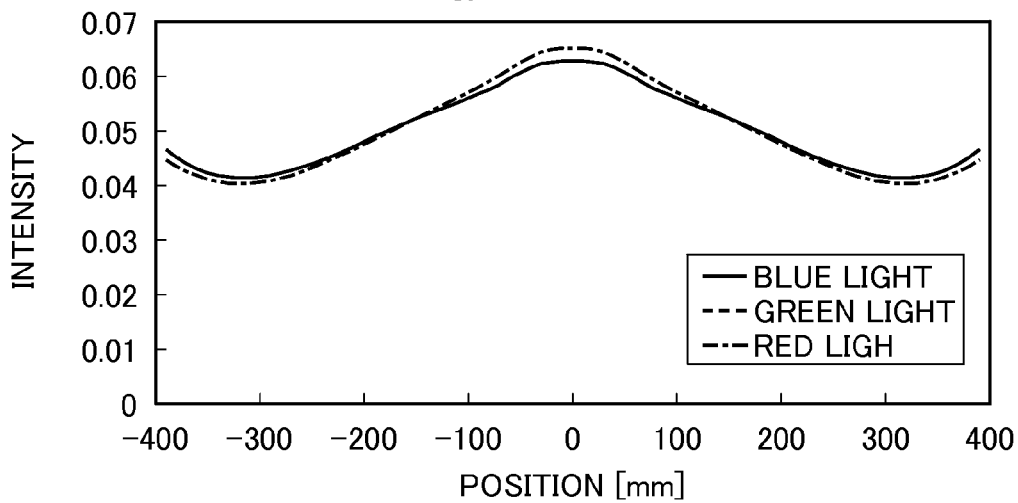
FIG. 41A is a graph showing measurement results of the intensity distributions of outgoing light.
Figure 41B:
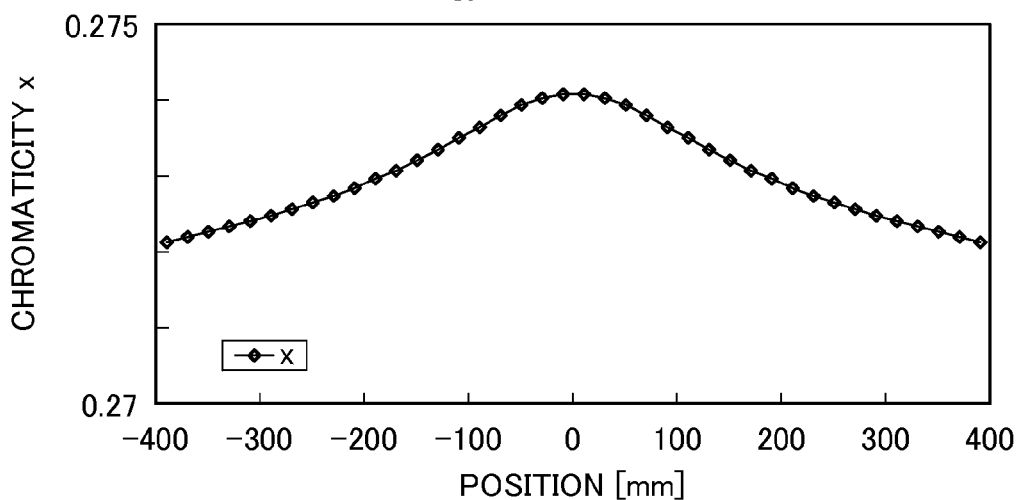
FIGS. 41B and 41C are graphs each showing measurement results of the chromaticity distribution of outgoing light.
Figure 41C:
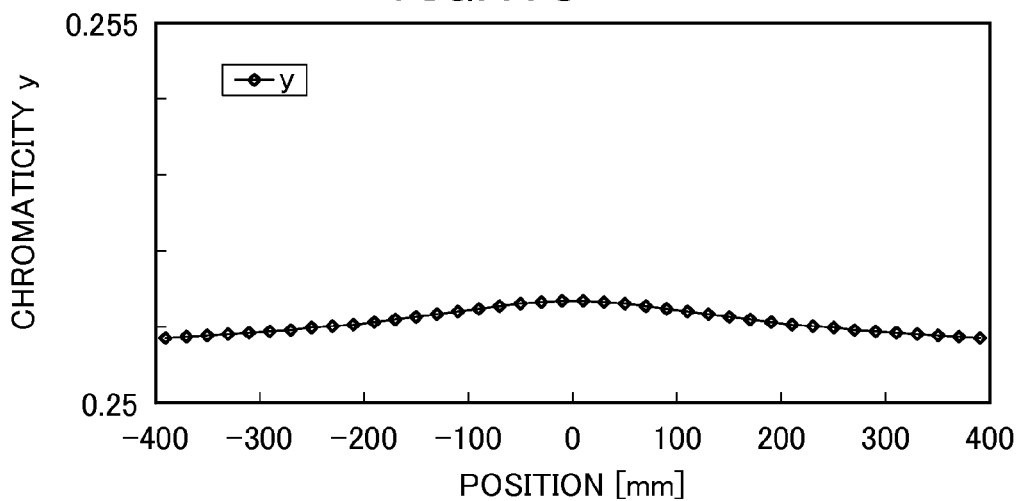

The results are shown in FIGS. 41A to 41C.

The color differences Δx and Δy were 0.0020 and 0.0005, respectively.

In Example 6-4, Example 6-1 was repeated except that the particle groups T4 and T1 were mixed at a ratio of 50:50 (a=0.5) for scattering particles, thereby determining the intensity distributions of blue light, green light and red light, and the distributions of the chromaticities x and y, and the color differences Δx and Δy.

Figure 42A:
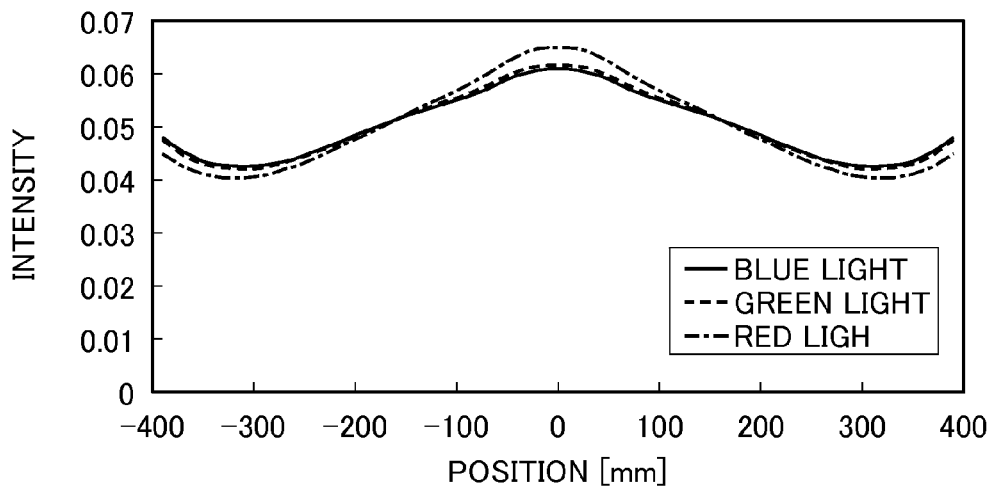
FIG. 42A is a graph showing measurement results of the intensity distributions of outgoing light.
Figure 42B:
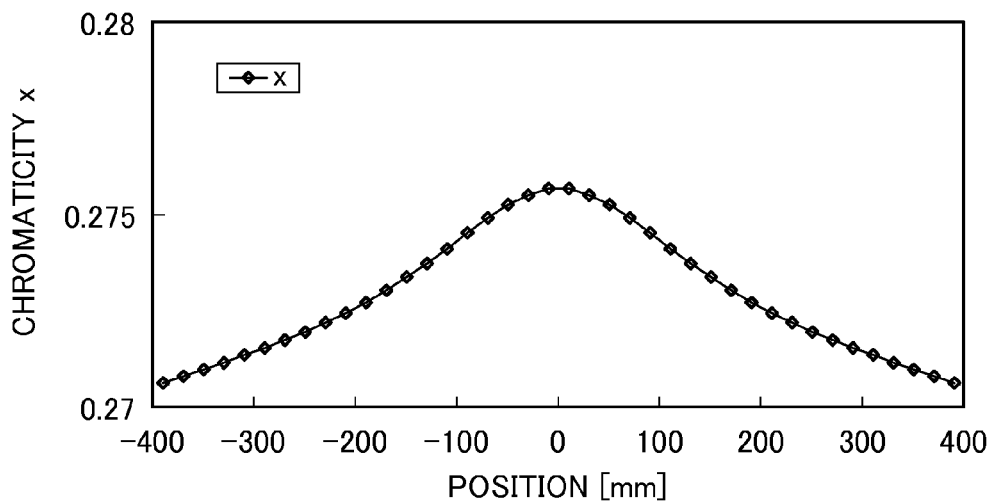
FIGS. 42B and 42C are graphs each showing measurement results of the chromaticity distribution of outgoing light.
Figure 42C:
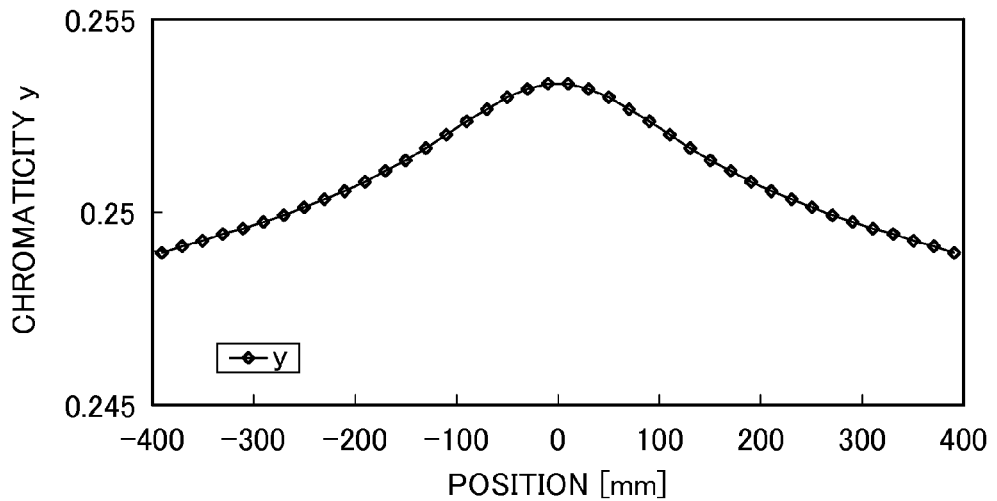

The results are shown in FIGS. 42A to 42C.

The color differences Δx and Δy were 0.0051 and 0.0044, respectively.

Example 7

In Example 7, the particle groups T1 and T3 were mixed and used as scattering particles.

In Example 7-1, Example 5-1 was repeated except that the particle groups T3 and T1 were mixed at a ratio of 30:70 (a=0.3) for scattering particles, thereby determining the intensity distributions of blue light, green light and red light, and the distributions of the chromaticities x and y, and the color differences Δx and Δy.

Figure 43A:
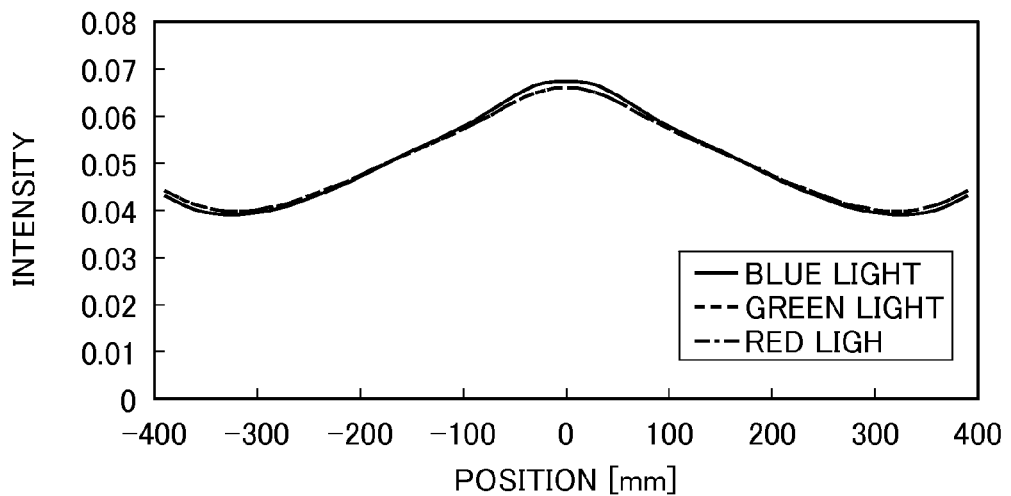
FIG. 43A is a graph showing measurement results of the intensity distributions of outgoing light.
Figure 43B:
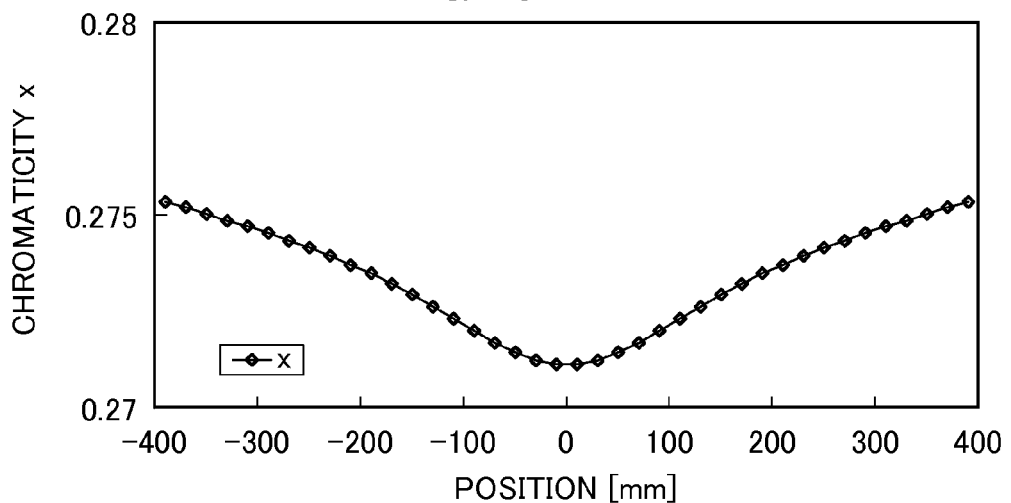
FIGS. 43B and 43C are graphs each showing measurement results of the chromaticity distribution of outgoing light.
Figure 43C:
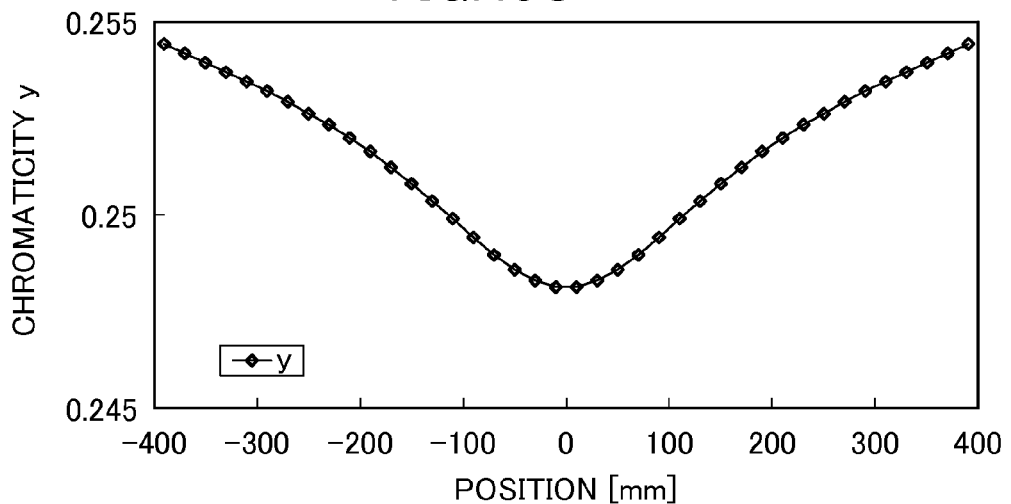

The results are shown in FIGS. 43A to 43C.

The color differences Δx and Δy were 0.0042 and 0.0063, respectively.

In Example 7-2, Example 7-1 was repeated except that the particle groups T3 and T1 were mixed at a ratio of 35:65 (a=0.35) for scattering particles, thereby determining the intensity distributions of blue light, green light and red light, and the distributions of the chromaticities x and y, and the color differences Δx and Δy.

Figure 44A:
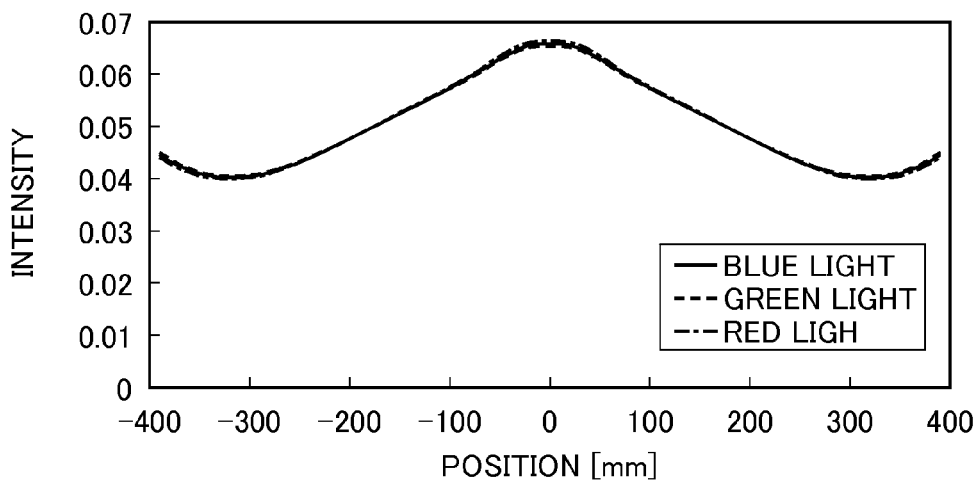
FIG. 44A is a graph showing measurement results of the intensity distributions of outgoing light.
Figure 44B:
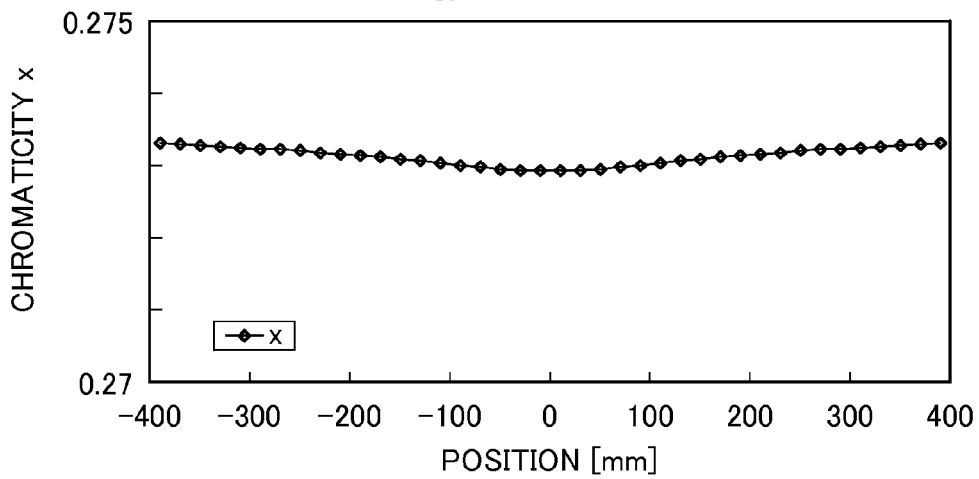
FIGS. 44B and 44C are graphs each showing measurement results of the chromaticity distribution of outgoing light.
Figure 44C:
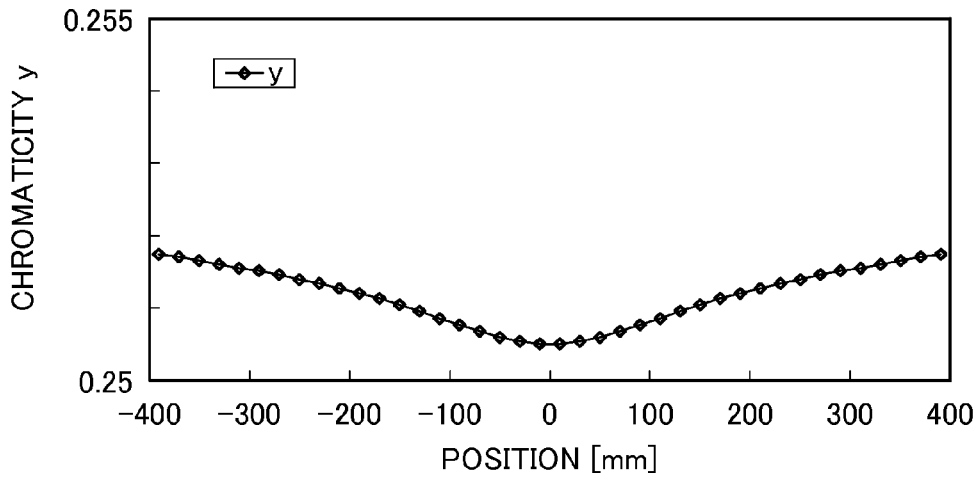

The results are shown in FIGS. 44A to 44C.

The color differences Δx and Δy were 0.0004 and 0.0012, respectively.

In Example 7-3, Example 7-1 was repeated except that the particle groups T3 and T1 were mixed at a ratio of 36.5:63.5 (a=0.365) for scattering particles, thereby determining the intensity distributions of blue light, green light and red light, and the distributions of the chromaticities x and y, and the color differences Δx and Δy.

The results are shown in FIGS. 45A to 45C.

The color differences Δx and Δy were 0.0008 and 0.0003, respectively.

In Example 7-4, Example 7-1 was repeated except that the particle groups T3 and T1 were mixed at a ratio of 40:60 (a=0.4) for scattering particles, thereby determining the intensity distributions of blue light, green light and red light, and the distributions of the chromaticities x and y, and the color differences Δx and Δy.

Figure 46A:
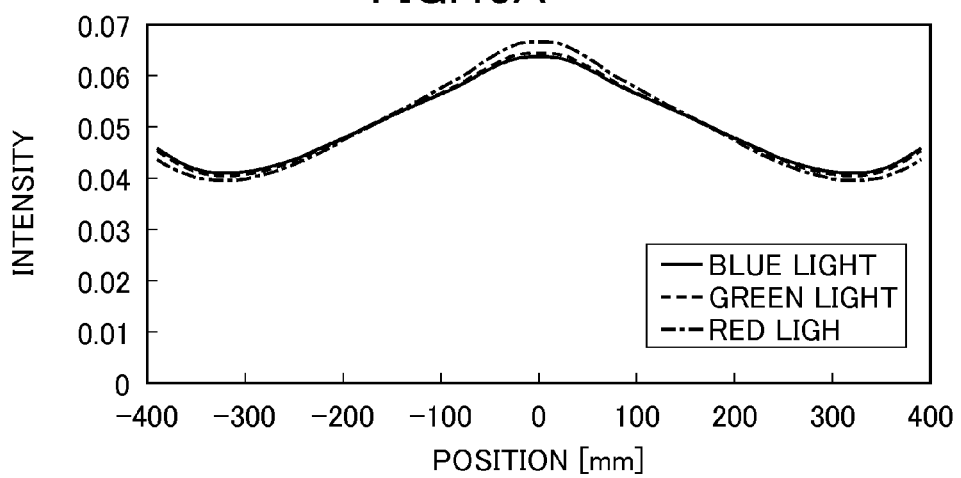
FIG. 46A is a graph showing measurement results of the intensity distributions of outgoing light.
Figure 46B:
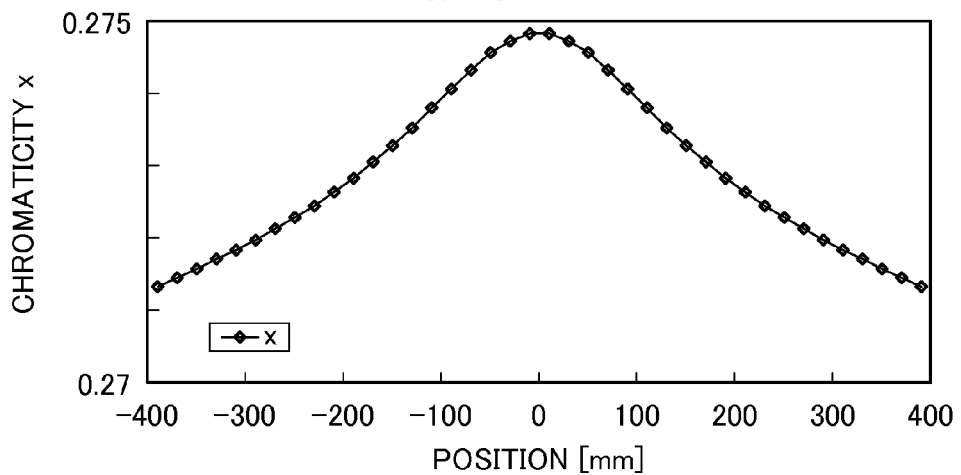
FIGS. 46B and 46C are graphs each showing measurement results of the chromaticity distribution of outgoing light.
Figure 46C:
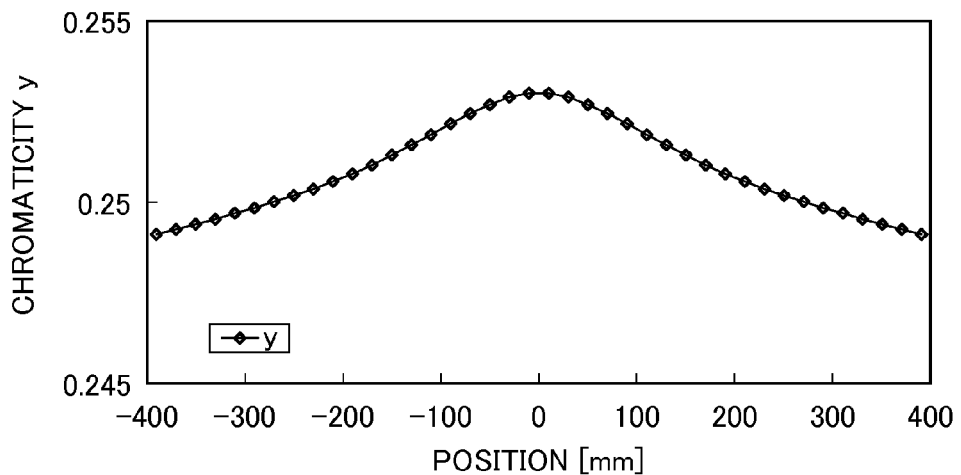

The results are shown in FIGS. 46A to 46C.

The color differences Δx and Δy were 0.0035 and 0.0039, respectively.

Example 8

In Example 8, the particle groups T1 and T2 were mixed and used as scattering particles.

In Example 8-1, Example 5-1 was repeated except that the particle groups T2 and T1 were mixed at a ratio of 30:70 (a=0.3) for scattering particles, thereby determining the intensity distributions of blue light, green light and red light, and the distributions of the chromaticities x and y, and the color differences Δx and Δy.

Figure 47A:
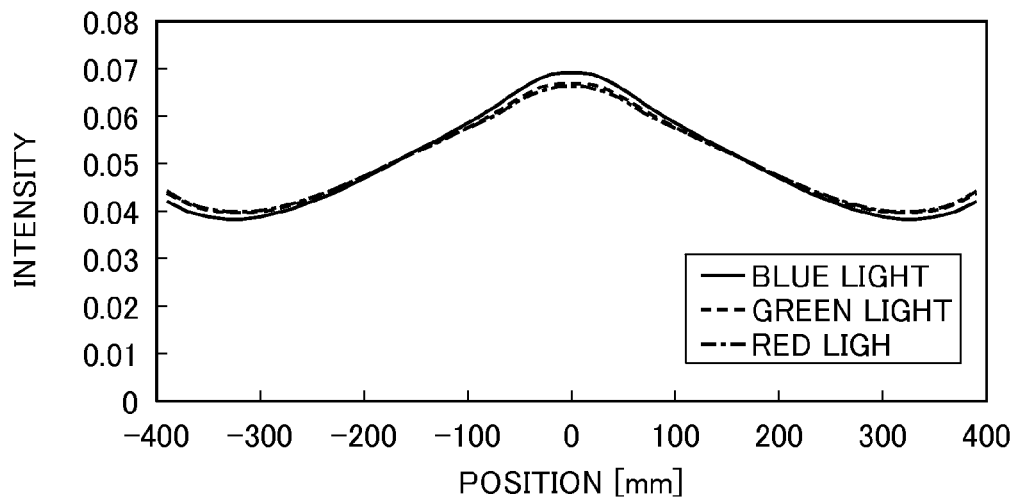
FIG. 47A is a graph showing measurement results of the intensity distributions of outgoing light.
Figure 47B:
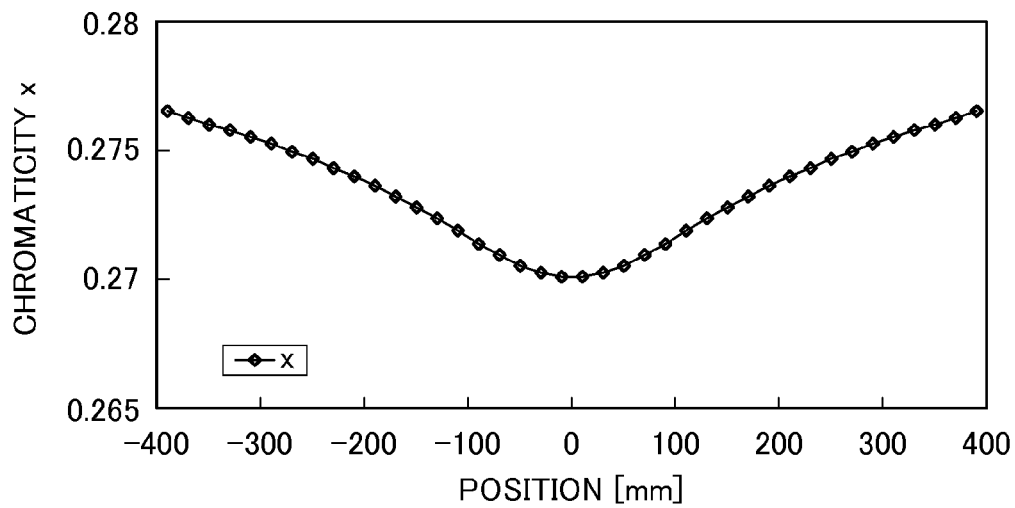
FIGS. 47B and 47C are graphs each showing measurement results of the chromaticity distribution of outgoing light.
Figure 47C:
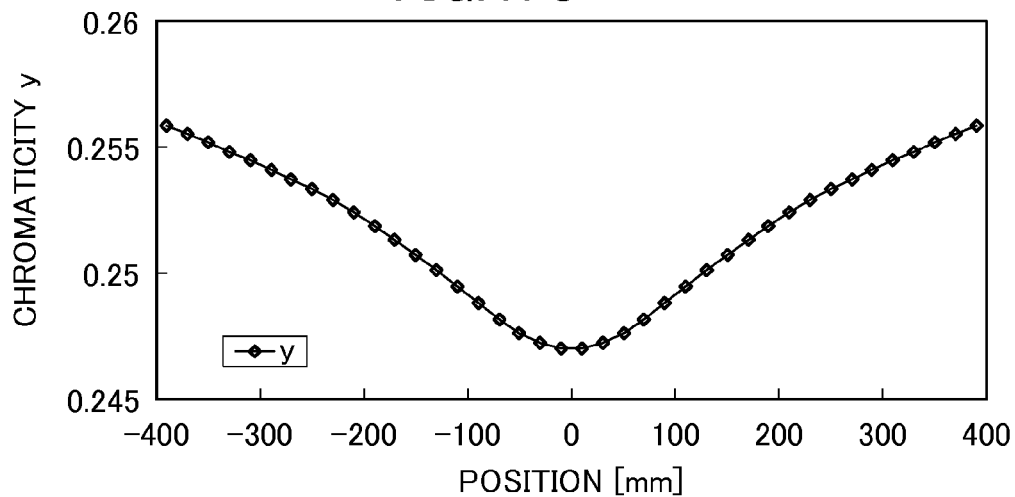

The results are shown in FIGS. 47A to 47C.

The color differences Δx and Δy were 0.0063 and 0.0089, respectively.

In Example 8-2, Example 8-1 was repeated except that the particle groups T2 and T1 were mixed at a ratio of 39:61 (a=0.39) for scattering particles, thereby determining the intensity distributions of blue light, green light and red light, and the distributions of the chromaticities x and y, and the color differences Δx and Δy.

Figure 48A:
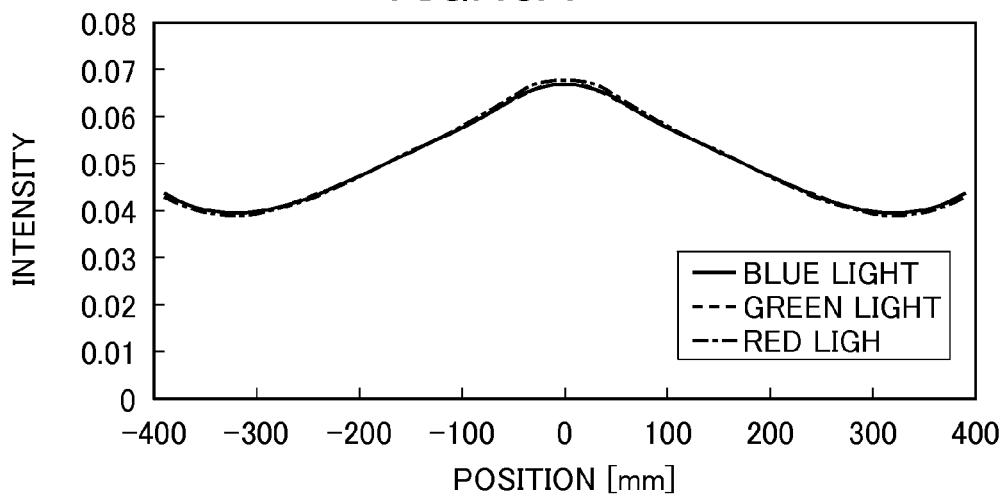
FIG. 48A is a graph showing measurement results of the intensity distributions of outgoing light.
Figure 48B:
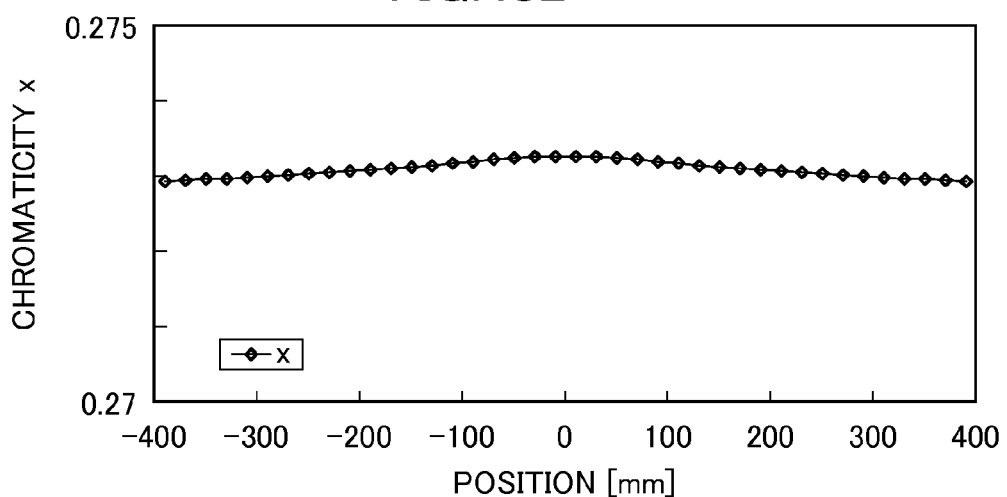
FIGS. 48B and 48C are graphs each showing measurement results of the chromaticity distribution of outgoing light.
Figure 48C:
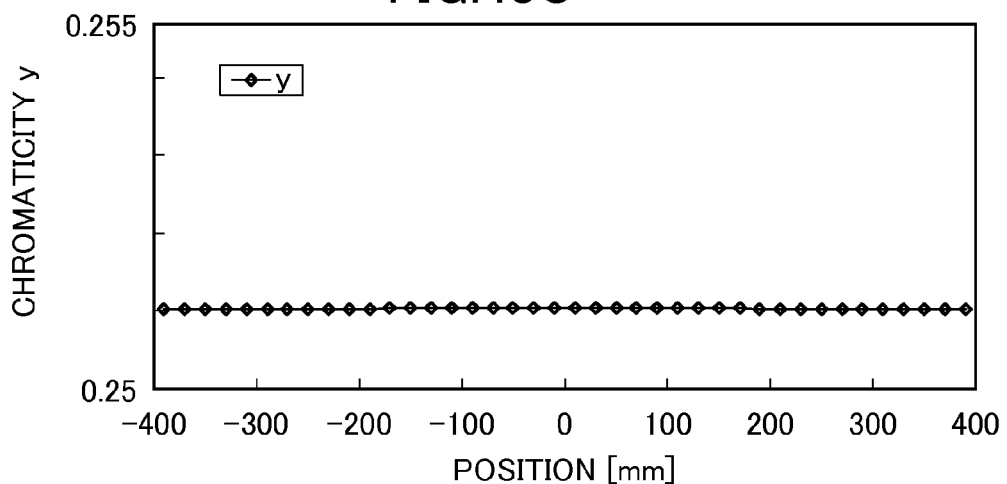

The results are shown in FIGS. 48A to 48C.

The color differences Δx and Δy were 0.0003 and 0.00003, respectively.

In Example 8-3, Example 8-1 was repeated except that the particle groups T2 and T1 were mixed at a ratio of 40:60 (a=0.4) for scattering particles, thereby determining the intensity distributions of blue light, green light and red light, and the distributions of the chromaticities x and y, and the color differences Δx and Δy.

Figure 49A:
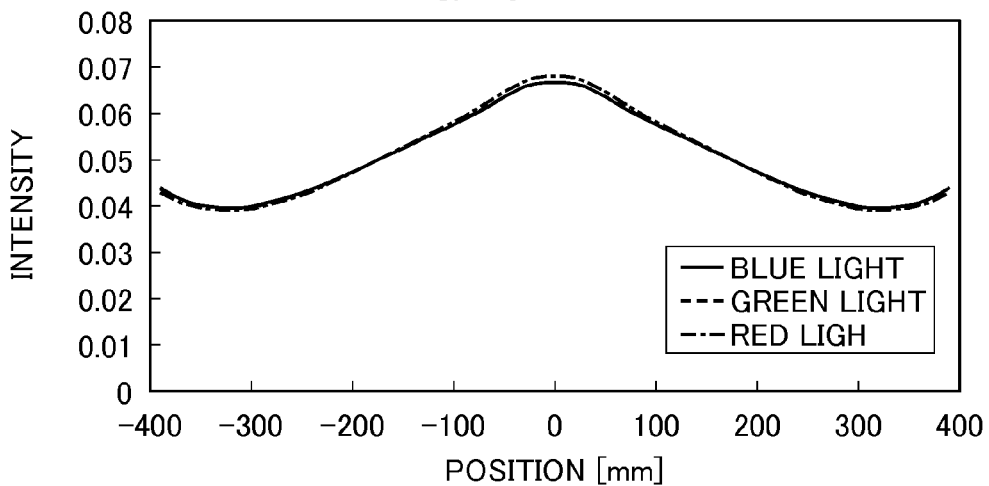
FIG. 49A is a graph showing measurement results of the intensity distributions of outgoing light.
Figure 49B:
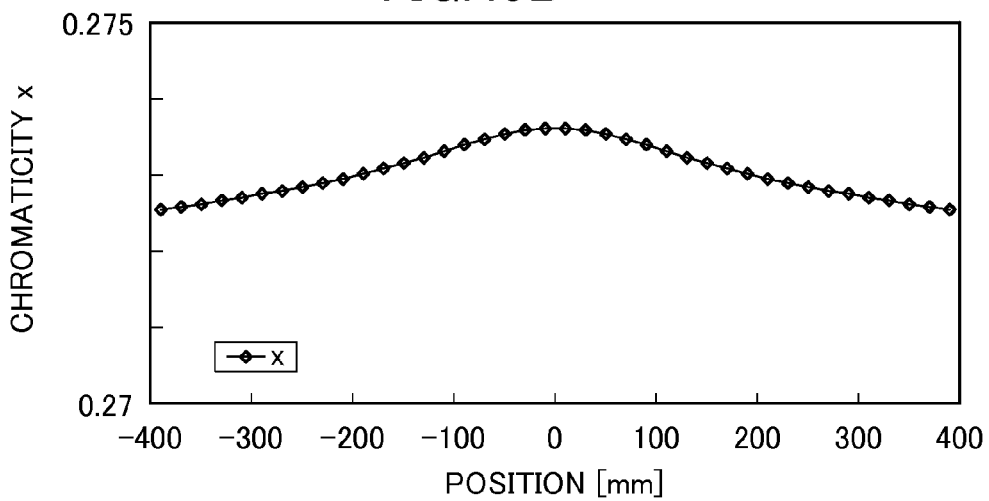
FIGS. 49B and 49C are graphs each showing measurement results of the chromaticity distribution of outgoing light.
Figure 49C:
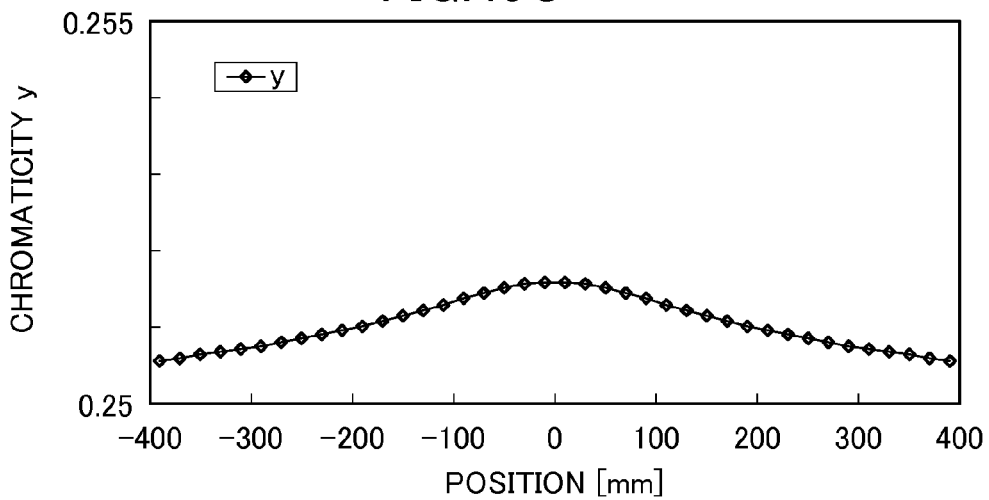

The results are shown in FIGS. 49A to 49C.

The color differences Δx and Δy were 0.0011 and 0.0010, respectively.

Comparative Example 3

Scattering particles with a single particle size were used in Comparative Example 3.

In Comparative Example 3-1, Example 5-1 was repeated except that scattering particles with a single particle size of 7 μm were used, thereby determining the intensity distributions of blue light, green light and red light, and the distributions of the chromaticities x and y, and the color differences Δx and Δy.

Figure 50A:
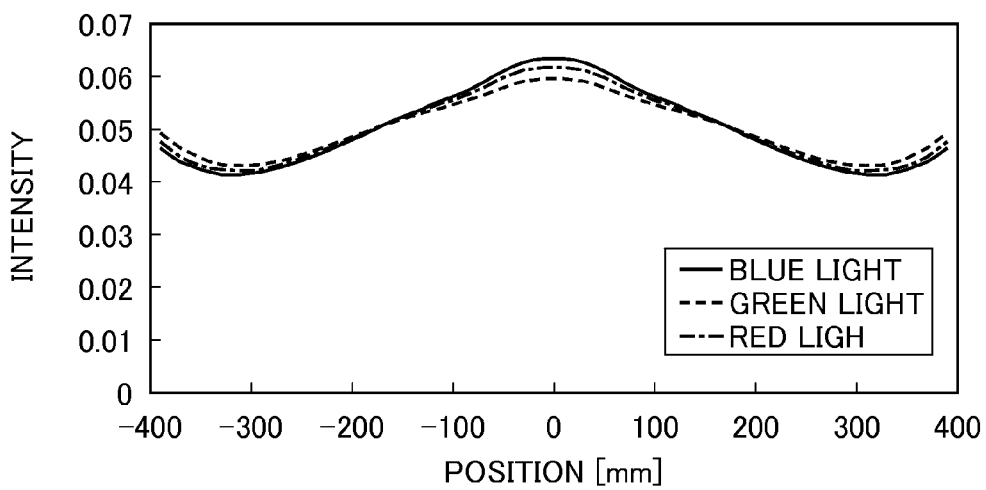
FIG. 50A is a graph showing measurement results of the intensity distributions of outgoing light.
Figure 50B:
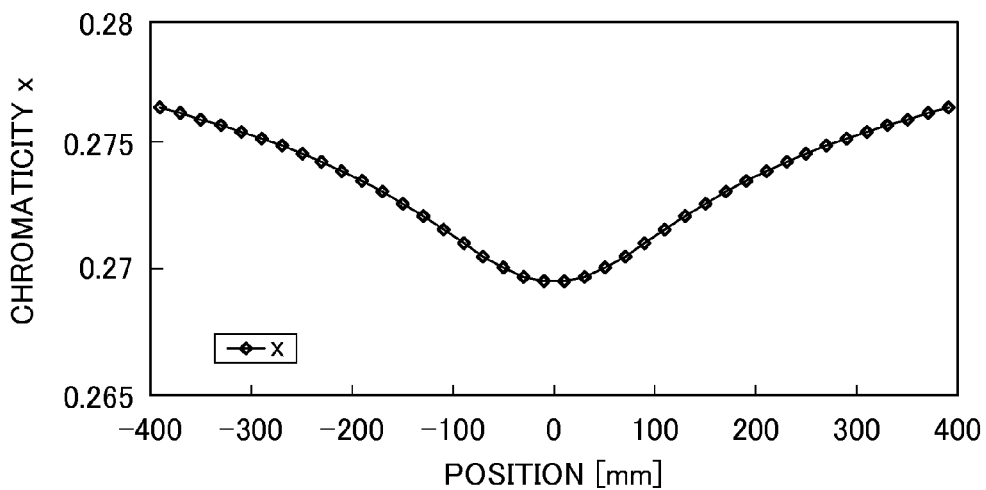
FIGS. 50B and 50C are graphs each showing measurement results of the chromaticity distribution of outgoing light.
Figure 50C:
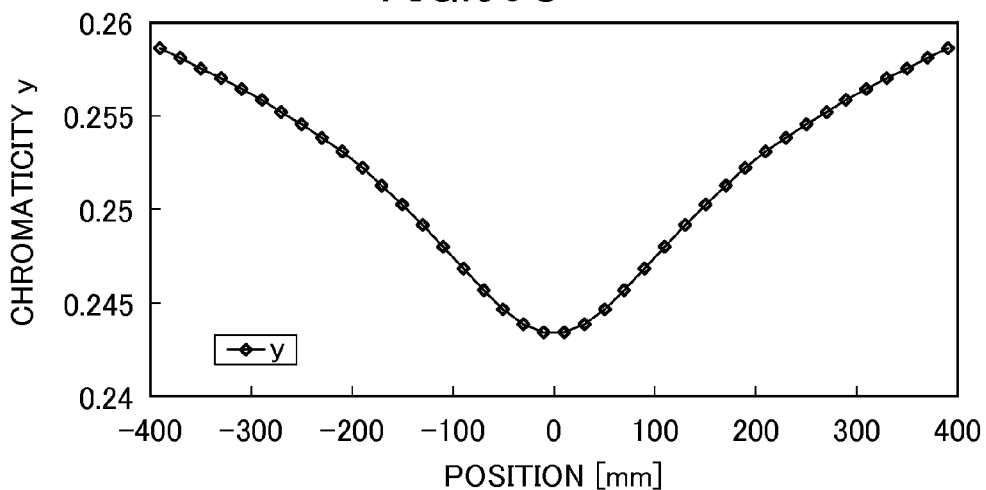

The results are shown in FIGS. 50A to 50C.

The color differences Δx and Δy were 0.0070 and 0.015, respectively.

In Comparative Example 3-2, Comparative Example 3-1 was repeated except that scattering particles with a single particle size of 4.5 μm were used, thereby determining the intensity distributions of blue light, green light and red light, and the distributions of the chromaticities x and y, and the color differences Δx and Δy.

Figure 51A:
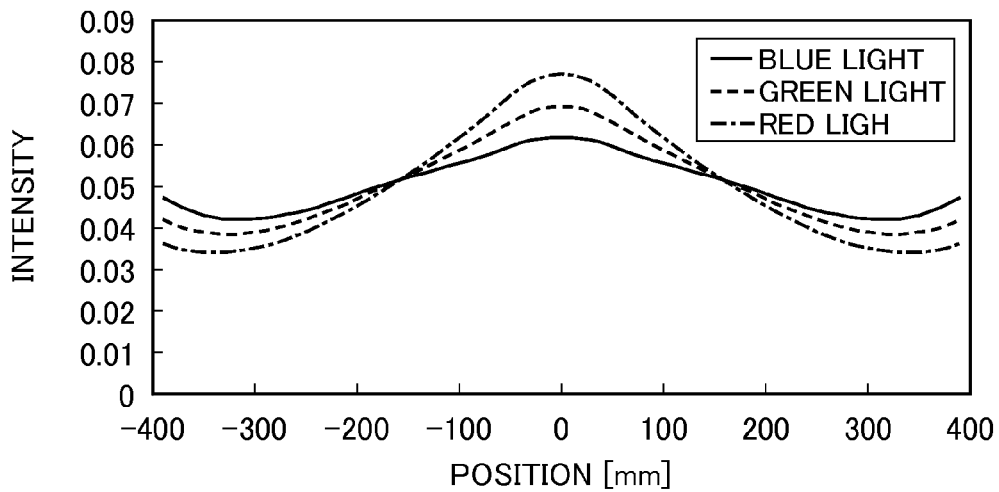
FIG. 51A is a graph showing measurement results of the intensity distributions of outgoing light.
Figure 51B:
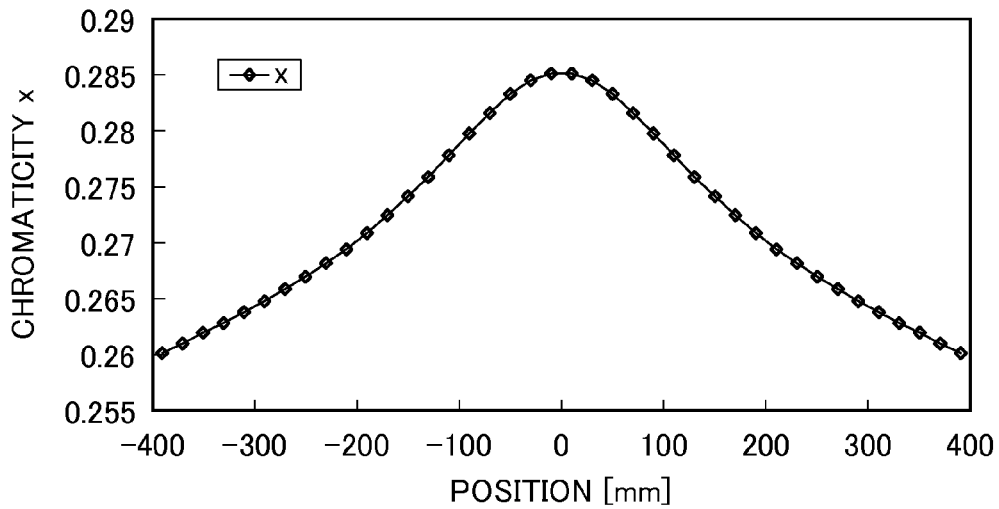
FIGS. 51B and 51C are graphs each showing measurement results of the chromaticity distribution of outgoing light.
Figure 51C:
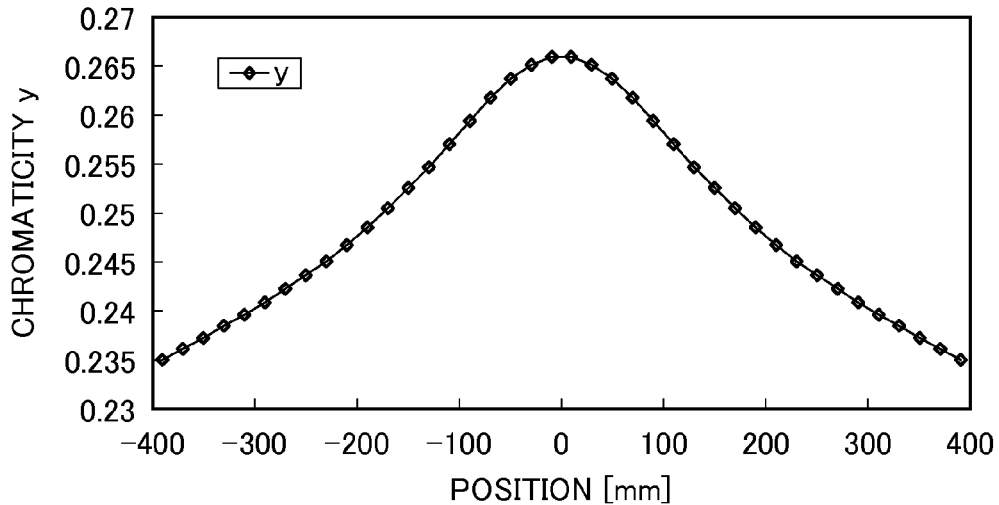

The results are shown in FIGS. 51A to 51C.

The color differences Δx and Δy were 0.025 and 0.031, respectively.

In Comparative Example 3-3, Comparative Example 3-1 was repeated except that scattering particles with a single particle size of 10 μm were used, thereby determining the intensity distributions of blue light, green light and red light, and the distributions of the chromaticities x and y, and the color differences Δx and Δy.

Figure 52A:
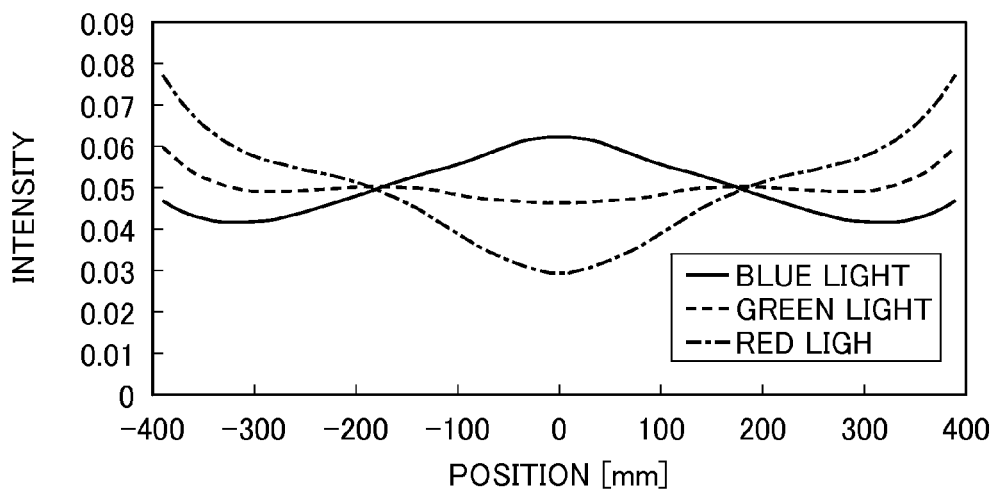
FIG. 52A is a graph showing measurement results of the intensity distributions of outgoing light.
Figure 52B:
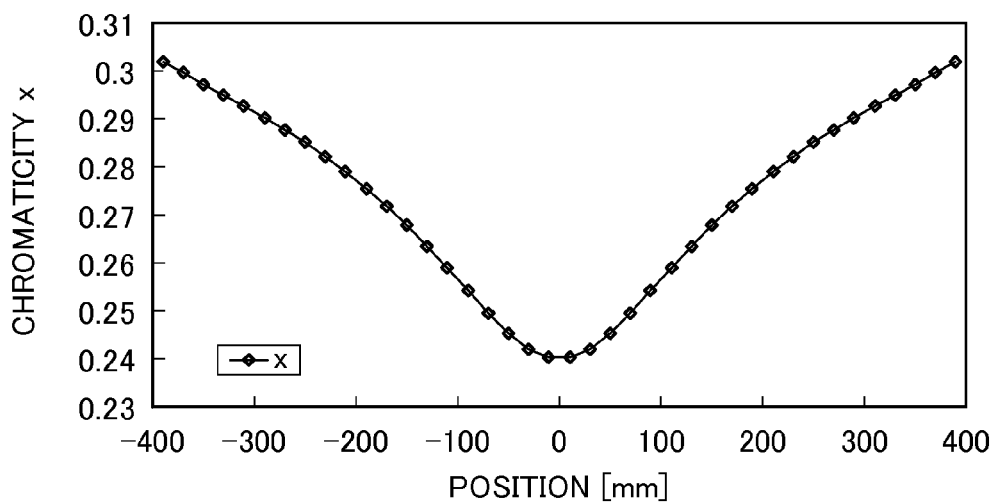
FIGS. 52B and 52C are graphs each showing measurement results of the chromaticity distribution of outgoing light.
Figure 52C:
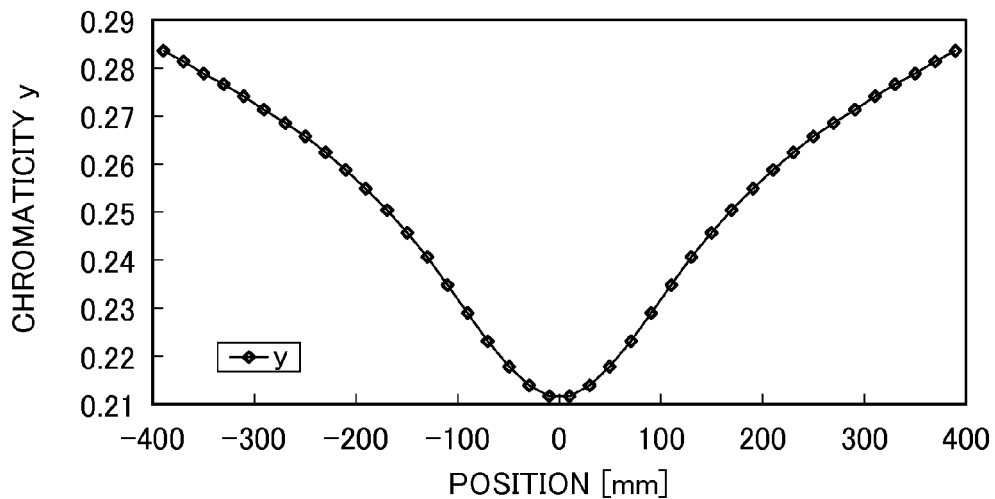

The results are shown in FIGS. 52A to 52C.

The color differences Δx and Δy were 0.062 and 0.072, respectively.

Comparative Example 4

Monodisperse scattering particles were used in Comparative Example 4.

In Comparative Example 4-1, Example 5-1 was repeated except that scattering particles of the particle group T1 were used, thereby determining the intensity distributions of blue light, green light and red light, and the distributions of the chromaticities x and y, and the color differences Δx and Δy.

Figure 53A:
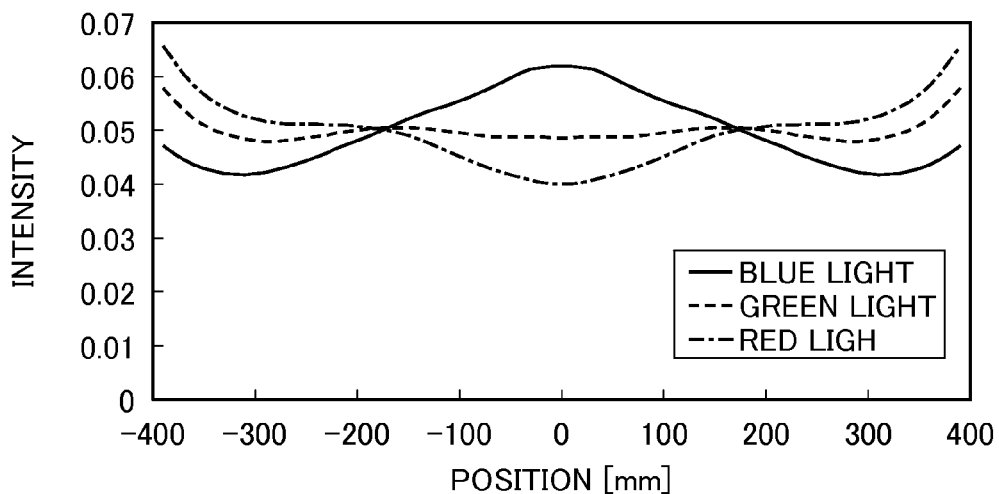
FIG. 53A is a graph showing measurement results of the intensity distributions of outgoing light.
Figure 53B:
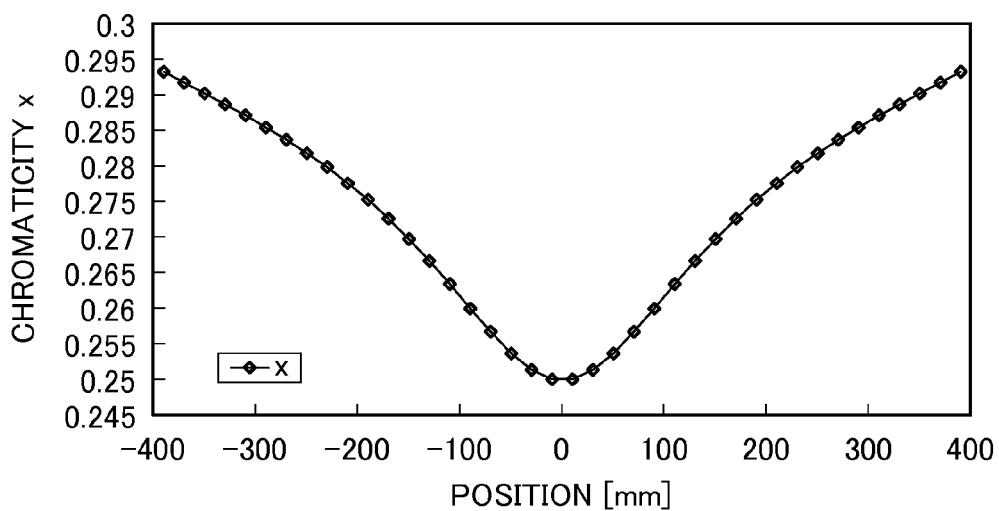
FIGS. 53B and 53C are graphs each showing measurement results of the chromaticity distribution of outgoing light.
Figure 53C:
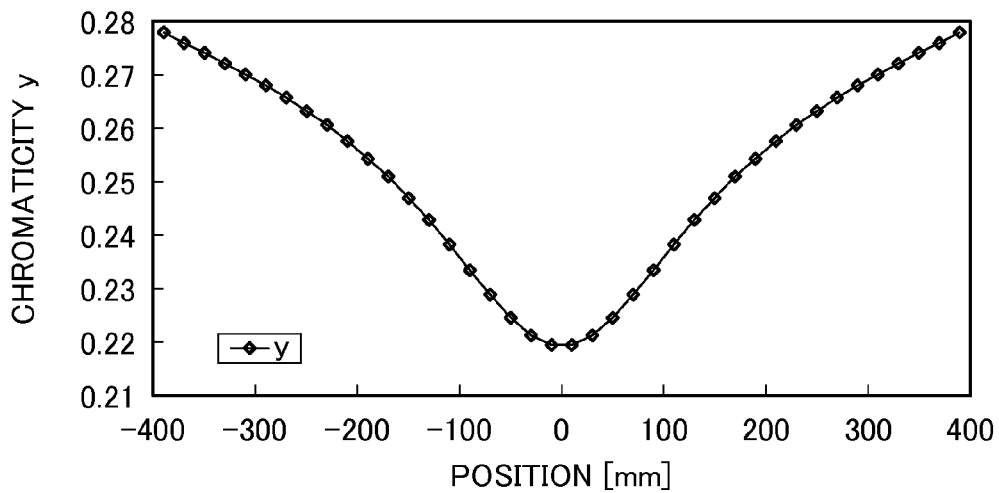

The results are shown in FIGS. 53A to 53C.

The color differences Δx and Δy were 0.043 and 0.058, respectively.

In Comparative Example 4-2, Comparative Example 4-1 was repeated except that scattering particles of the particle group T2 were used, thereby determining the intensity distributions of blue light, green light and red light, and the distributions of the chromaticities x and y, and the color differences Δx and Δy.

Figure 54A:
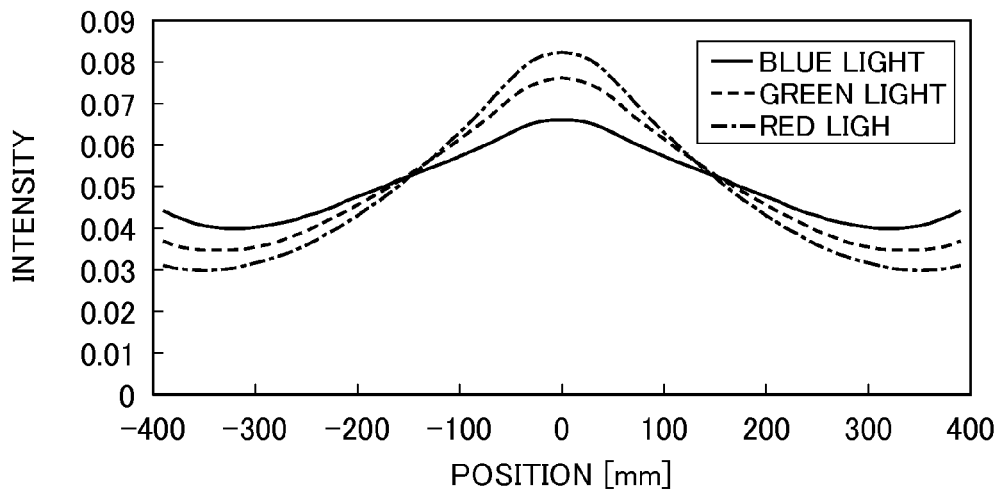
FIG. 54A is a graph showing measurement results of the intensity distributions of outgoing light.
Figure 54B:
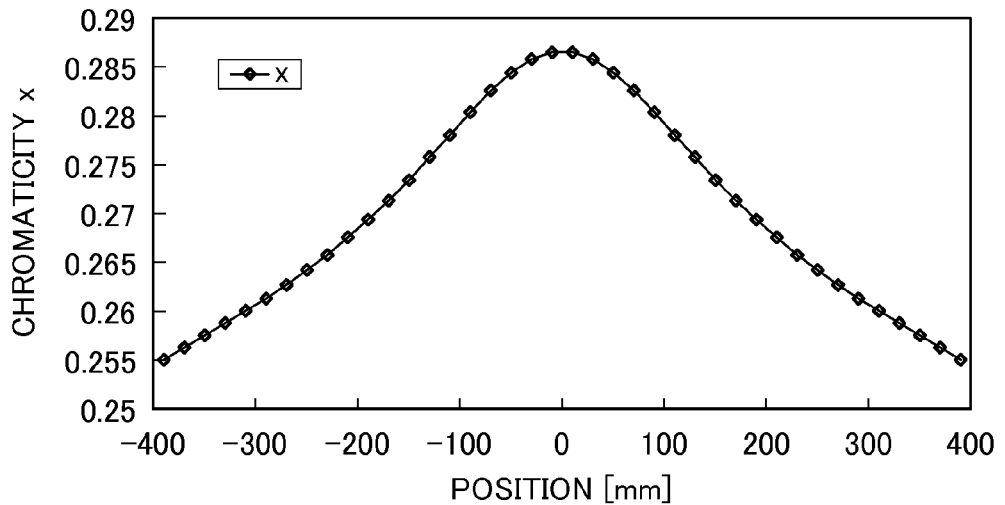
FIGS. 54B and 54C are graphs each showing measurement results of the chromaticity distribution of outgoing light.
Figure 54C:
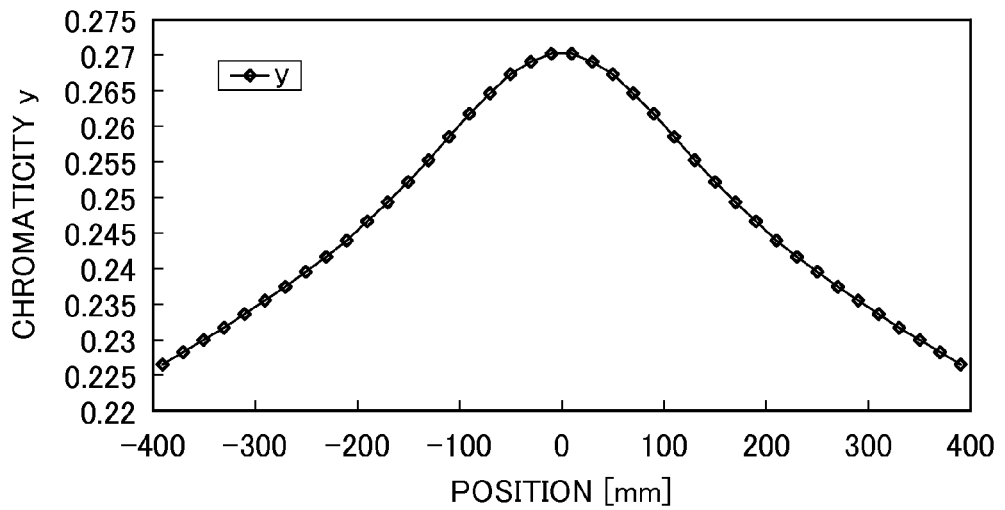

The results are shown in FIGS. 54A to 54C.

The color differences Δx and Δy were 0.032 and 0.044, respectively.

In Comparative Example 4-3, Comparative Example 4-1 was repeated except that scattering particles of the particle group T3 were used, thereby determining the intensity distributions of blue light, green light and red light, and the distributions of the chromaticities x and y, and the color differences Δx and Δy.

Figure 55A:
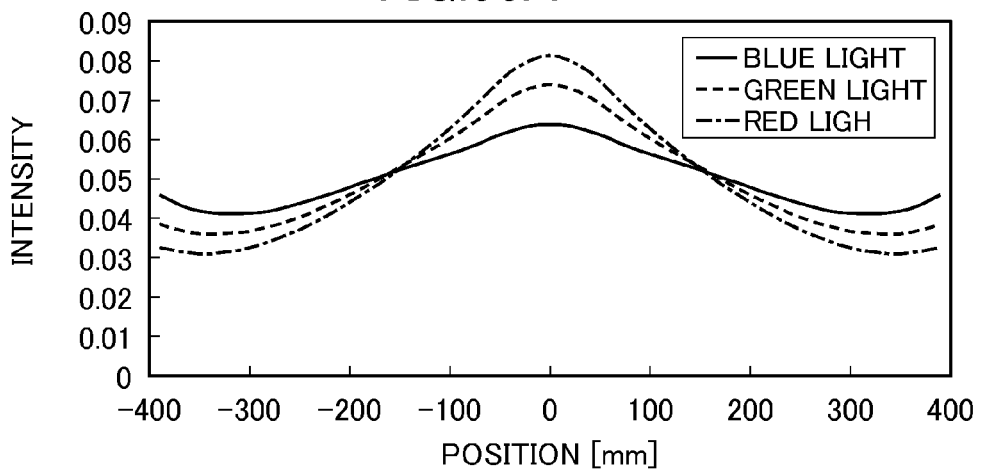
FIG. 55A is a graph showing measurement results of the intensity distributions of outgoing light.
Figure 55B:
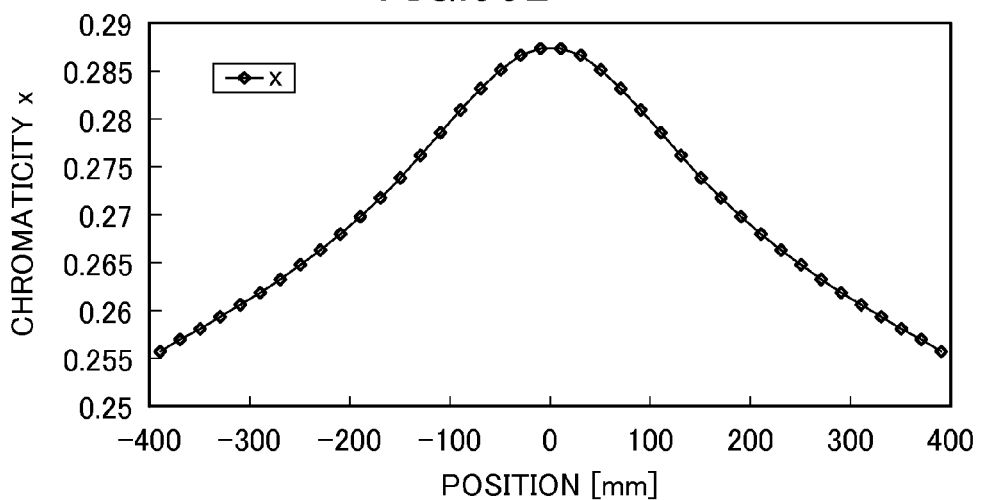
FIGS. 55B and 55C are graphs each showing measurement results of the chromaticity distribution of outgoing light.
Figure 55C:
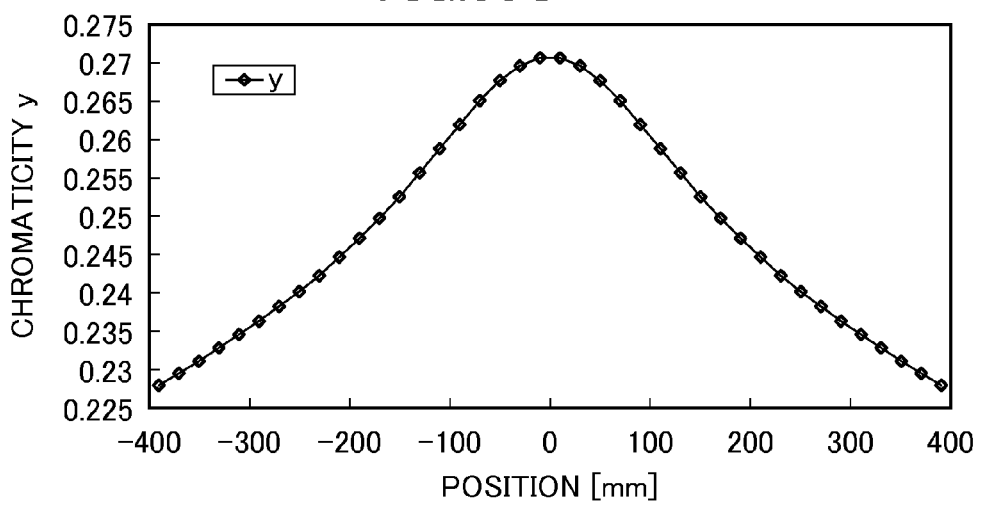

The results are shown in FIGS. 55A to 55C.

The color differences Δx and Δy were 0.032 and 0.043, respectively.

In Comparative Example 4-4, Comparative Example 4-1 was repeated except that scattering particles of the particle group T4 were used, thereby determining the intensity distributions of blue light, green light and red light, and the distributions of the chromaticities x and y, and the color differences Δx and Δy.

Figure 56A:
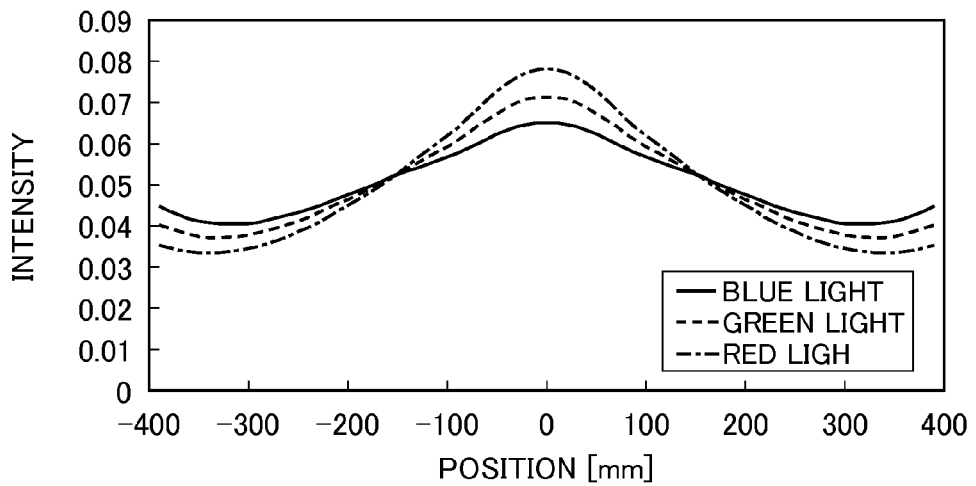
FIG. 56A is a graph showing measurement results of the intensity distributions of outgoing light.
Figure 56B:
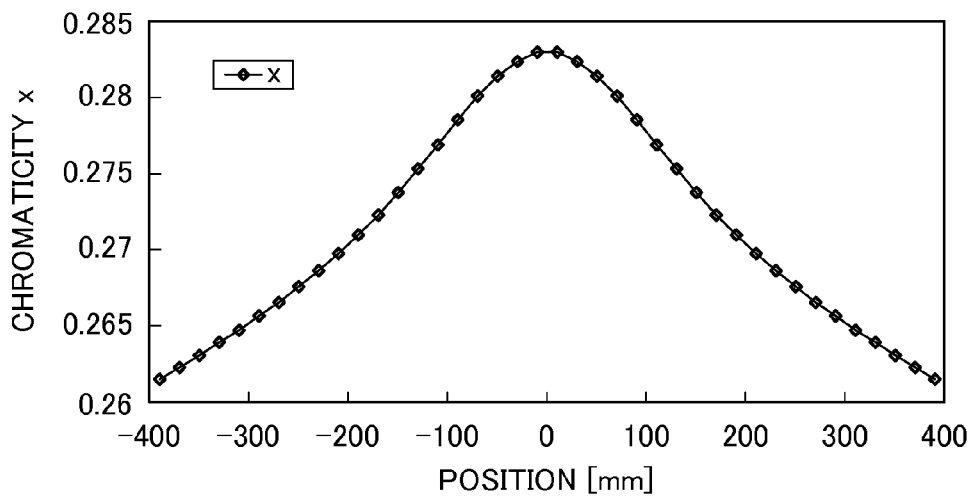
FIGS. 56B and 56C are graphs each showing measurement results of the chromaticity distribution of outgoing light.
Figure 56C:
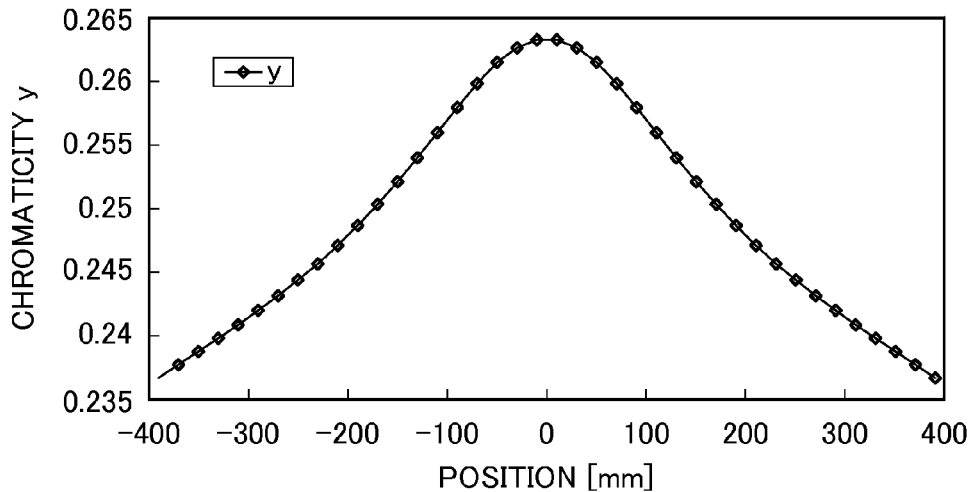

The results are shown in FIGS. 56A to 56C.

The color differences Δx and Δy were 0.022 and 0.027, respectively.

The results in Examples 5 to 8 reveal that, also in the case of light incidence from both sides, by mixing a particle group having an average particle size of less than 7 μm with a particle group having an average particle size of more than 7 μm at a predetermined ratio, scattering particles form a particle size distribution which has a first local maximum value at the particle size of less than 7 μm and a second local maximum value at the particle size of more than 7 μm, and hence the ease of scattering depending on the wavelengths can be made uniform. It is also revealed that even in a large-sized light guide plate, the ratio of the quantities of outgoing light based on the wavelength can be thereby made constant to decrease the color differences Δx and Δy of outgoing light from the light exit surface 30a, thus reducing the color unevenness.

It is particularly revealed that in Examples in which the ratio a of the volume of a particle group having an average particle size of less than 7 μm to the volume of all the scattering particles is in a range of 0.3≤a≤0.5 (except Example 5-5), the color differences Δx and Δy are both suitably as small as 0.02 or less. It is further revealed that in Examples in which the ratio a is in a range of 0.3≤a≤0.45 (except Examples 5-4 and 5-5), the color differences Δx and Δy are both more suitably as significantly small as 0.01 or less.

While the light guide plate according to the invention has been described above in detail, the invention is not limited in any manner to the above embodiments and various improvements and modifications may be made without departing from the spirit of the invention.

What is claimed is:

1. A light guide plate comprising: a rectangular light exit surface; one or more light incidence surfaces which are provided on one or more end sides of the light exit surface and through which light traveling in a direction substantially parallel to the light exit surface enters; a rear surface on an opposite side to the light exit surface; and scattering particles dispersed in the light guide plate, wherein the light guide plate includes two layers including a first layer disposed on a side closer to the light exit surface and a second layer that is disposed on a side closer to the rear surface and that contains the scattering particles at a higher particle concentration than the first layer, the first layer being superposed on the second layer in a direction perpendicular to the light exit surface, wherein thicknesses of the two layers in a direction substantially perpendicular to the light exit surface change in a direction perpendicular to each of the one or more light incidence surfaces to change a combined particle concentration, and wherein the scattering particles are obtained by mixing a particle group with an average particle size of less than 7 μm having one or more local maximum values in its particle size distribution and a particle group with an average particle size of more than 7 μm having one or more local maximum values in its particle size distribution, and satisfy following expressions: 1 μm≤Ds<7 μm; 7 μm<Db≤12 μm; and 0.3≤a≤0.5 (where Ds represents an average particle size of the particle group with the average particle size of less than 7 μm, Db represents an average particle size of the particle group with the average particle size of more than 7 μm, and a represents a ratio of a volume of the particle group with the average particle size of less than 7 μm to a volume of all the scattering particles).

2. The light guide plate according to claim 1, wherein each of the particle group with the average particle size of less than 7 μm and the particle group with the average particle size of more than 7 μm is composed of particles with a single particle size, monodisperse particles, or polydisperse particles.

3. The light guide plate according to claim 2, wherein a particle size distribution of the scattering particles has at least two local maximum values including a first local maximum value at a particle size of less than 7 μm and a second local maximum value at a particle size of more than 7 μm.

4. The light guide plate according to claim 1, wherein the one or more light incidence surfaces comprise a light incidence surface provided on one end side of the light exit surface and the second layer smoothly changes so as to decrease in thickness with increasing distance from the light incidence surface in a direction perpendicular to the light incidence surface to reach a minimum thickness, then increase in thickness to reach a maximum thickness and subsequently decrease in thickness again.

5. The light guide plate according to claim 4, wherein an interface between the first layer and the second layer in a region of the second layer between a position of the minimum thickness and a position of the maximum thickness in the direction perpendicular to the light incidence surface has a curved surface concave toward the light exit surface and a curved surface smoothly connected to the concave curved surface and convex toward the light exit surface.

6. The light guide plate according to claim 1, wherein the one or more light incidence surfaces comprise a light incidence surface provided on one end side of the light exit surface and the second layer continuously changes so as to once increase in thickness with increasing distance from the light incidence surface in a direction perpendicular to the light incidence surface, then decrease in thickness to reach a minimum thickness, then increase in thickness again to reach a maximum thickness and subsequently decrease in thickness.

7. The light guide plate according to claim 6, wherein an interface between the first layer and the second layer in a region of the second layer between a position of the minimum thickness and a position of the maximum thickness in the direction perpendicular to the light incidence surface has a curved surface concave toward the light exit surface and a curved surface smoothly connected to the concave curved surface and convex toward the light exit surface.

8. The light guide plate according to claim 1, wherein the one or more light incidence surfaces comprise two light incidence surfaces provided on two opposite end sides of the light exit surface and the second layer has a maximum thickness at a central portion in a direction perpendicular to the light incidence surfaces, then smoothly changes so as to decrease in thickness from the central portion toward each of the two light incidence surfaces to reach a minimum thickness, and subsequently increase in thickness.

9. The light guide plate according to claim 8, wherein an interface between the first layer and the second layer has a region including concave curved surfaces toward the light exit surface on sides closer to the two light incidence surfaces and a curved surface convex toward the light exit surface which is located between the two concave curved surfaces and is smoothly connected to the two curved surfaces.

10. The light guide plate according to claim 1, wherein the one or more light incidence surfaces comprise two light incidence surfaces provided on two opposite end sides of the light exit surface and the second layer has a maximum thickness at a central portion in a direction perpendicular to the light incidence surfaces, then smoothly changes so as to decrease in thickness from the central portion toward each of the two light incidence surfaces to reach a minimum thickness, then increase in thickness and subsequently decreases in thickness.

11. The light guide plate according to claim 10, wherein an interface between the first layer and the second layer has a region including concave curved surfaces toward the light exit surface on sides closer to the two light incidence surfaces and a curved surface convex toward the light exit surface which is located between the two concave curved surfaces and is smoothly connected to the two curved surfaces.

12. The light guide plate according to claim 1, wherein the particle group with the average particle size of less than 7 μm is composed of particles with a single particle size, monodisperse particles, or polydisperse particles.

13. The light guide plate according to claim 1, wherein the particle group with the average particle size of more than 7 μm is composed of particles with a single particle size, monodisperse particles, or polydisperse particles.

14. The light guide plate according to claim 1, wherein a particle size distribution of the scattering particles has at least two local maximum values including a first local maximum value at a particle size of less than 7 μm and a second local maximum value at a particle size of more than 7 μm.

15. The light guide plate according to claim 1, wherein scattering particles contained in the first layer and scattering particles contained in the second layer have different particle size distributions.

16. The light guide plate according to claim 1, wherein the one or more light incidence surfaces comprise a light incidence surface provided on one end side of the light exit surface and the second layer smoothly changes so as to decrease in thickness with increasing distance from the light incidence surface in a direction perpendicular to the light incidence surface to reach a minimum thickness, then increase in thickness to reach a maximum thickness and subsequently keep the thickness unchanged.

17. The light guide plate according to claim 1, wherein the one or more light incidence surfaces comprise a light incidence surface provided on one end side of the light exit surface and the second layer continuously changes so as to once increase in thickness with increasing distance from the light incidence surface in a direction perpendicular to the light incidence surface, then decrease in thickness to reach a minimum thickness, then increase in thickness again to reach a maximum thickness and subsequently keep the thickness unchanged.

18. The light guide plate according to claim 1, wherein $N_{po}$ and $N_{pr}$ fall within ranges satisfying $0$ wt % $< N_{po} < 0.15$ wt % and $N_{po} < N_{pr} \leq 0.8$ wt % where $N_{po}$ represents a particle concentration of the first layer and $N_{pr}$ represents a particle concentration of the second layer.

* * * * *